(12) United States Patent
Okoniewski et al.

(10) Patent No.: US 11,867,040 B2
(45) Date of Patent: *Jan. 9, 2024

(54) APPARATUS AND METHODS FOR ELECTROMAGNETIC HEATING OF HYDROCARBON FORMATIONS

(71) Applicant: Acceleware Ltd., Calgary (CA)

(72) Inventors: Michal M. Okoniewski, Calgary (CA); Damir Pasalic, Calgary (CA); Pedro Vaca, Calgary (CA); Geoffrey Clark, Calgary (CA)

(73) Assignee: Acceleware Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,196

(22) Filed: May 13, 2022

(65) Prior Publication Data

US 2022/0333470 A1    Oct. 20, 2022

Related U.S. Application Data

(63) Continuation of application No. 16/934,146, filed on Jul. 21, 2020, now Pat. No. 11,359,473, which is a
(Continued)

(51) Int. Cl.
*E21B 43/24*    (2006.01)
*H05B 6/52*    (2006.01)
(Continued)

(52) U.S. Cl.
CPC .......... *E21B 43/2401* (2013.01); *E21B 36/04* (2013.01); *E21B 43/2408* (2013.01);
(Continued)

(58) Field of Classification Search
CPC .. E21B 43/2401; E21B 36/04; E21B 43/2408; H05B 6/46; H05B 6/50; H05B 6/52; H05B 6/62; H05B 2214/03
See application file for complete search history.

(56) References Cited

U.S. PATENT DOCUMENTS

| | | |
|---|---|---|
| 2,035,274 A | 3/1936 | Mougey |
| 2,556,244 A | 6/1951 | Weston |

(Continued)

FOREIGN PATENT DOCUMENTS

| | | |
|---|---|---|
| CA | 2346546 C | 11/2004 |
| CA | 2609762 A1 | 12/2006 |

(Continued)

OTHER PUBLICATIONS

European Search Report dated Jan. 4, 2019 issued in corresponding European Patent Application No. 17781672.5. (4 pages).

(Continued)

*Primary Examiner* — Brad Harcourt
(74) *Attorney, Agent, or Firm* — BERESKIN & PARR LLP/ S.E.N.C.R.L. s.r.l; Isis E. Caulder; Maria Wei

(57) ABSTRACT

An apparatus and method for electromagnetic heating of a hydrocarbon formation. The method involves providing electrical power to at least one electromagnetic wave generator for generating high frequency alternating current; using the electromagnetic wave generator to generate high frequency alternating current; using at least one pipe to define at least one of at least two transmission line conductors; coupling the transmission line conductors to the electromagnetic wave generator; and applying the high frequency alternating current to excite the transmission line conductors. The excitation of the transmission line conductors can propagate an electromagnetic wave within the hydrocarbon formation. In some embodiments, the method further comprises determining that a hydrocarbon formation between the transmission line conductors is at least substantially desiccated; and applying a radiofrequency electromagnetic current to excite the transmission line conductors. The radiofrequency electromagnetic current radiates to a hydro- (Continued)

carbon formation surrounding the transmission line conductors.

23 Claims, 53 Drawing Sheets

Related U.S. Application Data continuation of application No. 16/092,335, filed as application No. PCT/CA2017/050437 on Apr. 10, 2017, now Pat. No. 10,760,392.

(60) Provisional application No. 62/409,079, filed on Oct. 17, 2016, provisional application No. 62/321,880, filed on Apr. 13, 2016.

(51) Int. Cl.
 H05B 6/46 (2006.01)
 E21B 36/04 (2006.01)
 H05B 6/50 (2006.01)
 H05B 6/62 (2006.01)

(52) U.S. Cl.
 CPC .............. *H05B 6/46* (2013.01); *H05B 6/50* (2013.01); *H05B 6/52* (2013.01); *H05B 6/62* (2013.01); *H05B 2214/03* (2013.01)

(56) References Cited

U.S. PATENT DOCUMENTS

| | | |
|---|---|---|
| 2,757,738 A | 8/1956 | Ritchey |
| 3,103,975 A | 9/1963 | Hanson |
| 3,126,438 A | 3/1964 | Lorrin |
| 3,188,587 A | 6/1965 | Huber et al. |
| 3,227,800 A | 1/1966 | Bondon |
| 3,249,901 A | 5/1966 | Spinner |
| 3,271,506 A | 9/1966 | Martin et al. |
| 3,286,015 A | 11/1966 | Hildebrand et al. |
| 3,514,523 A | 5/1970 | Hildebrand et al. |
| 3,748,373 A | 7/1973 | Remy |
| 3,750,058 A | 7/1973 | Bankert, Jr. et al. |
| 3,757,860 A | 9/1973 | Pritchett |
| 3,758,700 A | 9/1973 | Ditscheid |
| 3,813,481 A | 5/1974 | Adams |
| 4,018,977 A | 4/1977 | Herrmann, Jr. et al. |
| 4,092,485 A | 5/1978 | Wanser |
| 4,132,855 A | 1/1979 | Clark et al. |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,145,565 A | 3/1979 | Donon |
| 4,193,451 A | 3/1980 | Dauphine |
| 4,247,136 A | 1/1981 | Fouss et al. |
| 4,281,209 A | 7/1981 | Yoshioka et al. |
| RE30,738 E | 9/1981 | Bridges et al. |
| 4,301,865 A | 11/1981 | Kasevich et al. |
| 4,319,632 A | 3/1982 | Marr, Jr. |
| 4,320,801 A | 3/1982 | Rowland et al. |
| 4,449,585 A | 5/1984 | Bridges et al. |
| 4,470,459 A | 9/1984 | Copland |
| 4,487,257 A | 12/1984 | Dauphine |
| 4,508,168 A | 4/1985 | Heeren |
| 4,513,815 A | 4/1985 | Rundell et al. |
| 4,554,399 A | 11/1985 | Cookson |
| 4,629,222 A | 12/1986 | Dearden et al. |
| 4,705,914 A | 11/1987 | Bondon |
| 4,821,798 A | 4/1989 | Bridges et al. |
| 4,927,189 A | 5/1990 | Burkit |
| 5,099,918 A | 3/1992 | Bridges et al. |
| 5,131,465 A | 7/1992 | Langston |
| 5,236,039 A | 8/1993 | Edelstein et al. |
| 5,262,593 A | 11/1993 | Madry et al. |
| 5,293,936 A | 3/1994 | Bridges |
| 5,402,851 A | 4/1995 | Baiton |
| 5,467,420 A | 11/1995 | Rohrmann et al. |
| 5,742,002 A | 4/1998 | Arredondo et al. |
| 6,022,054 A | 2/2000 | Hemphill et al. |
| 6,189,611 B1 | 2/2001 | Kasevich |
| 6,208,529 B1 | 3/2001 | Davidson |
| 6,246,006 B1 | 6/2001 | Hardin et al. |
| 6,346,671 B1 | 2/2002 | Ahrens et al. |
| 6,521,874 B2 | 2/2003 | Thompson et al. |
| 6,712,644 B1 | 3/2004 | Decormier |
| 6,932,155 B2 | 8/2005 | Vinegar et al. |
| 6,956,164 B2 | 10/2005 | Brown |
| 6,981,546 B2 | 1/2006 | Hall et al. |
| 7,009,471 B2 | 3/2006 | Elmore |
| 7,091,460 B2 | 8/2006 | Kinzer |
| 7,359,223 B2 | 4/2008 | Datta et al. |
| 7,484,561 B2 | 2/2009 | Bridges |
| 7,567,154 B2 | 7/2009 | Elmore |
| 7,626,836 B2 | 12/2009 | Leggate et al. |
| 7,674,981 B2 | 3/2010 | Hesselbarth et al. |
| 7,891,421 B2 | 2/2011 | Kasevich |
| 7,897,874 B2 | 3/2011 | Park et al. |
| 8,118,093 B2 | 2/2012 | Hassell et al. |
| 8,196,658 B2 | 6/2012 | Miller et al. |
| 8,408,294 B2 | 4/2013 | Bridges |
| 8,453,739 B2 | 6/2013 | Parsche |
| 8,511,378 B2 | 8/2013 | Parsche et al. |
| 8,519,268 B2 | 8/2013 | Leipold et al. |
| 8,536,497 B2 | 9/2013 | Kim |
| 8,537,912 B2 | 9/2013 | Long et al. |
| 8,648,760 B2 | 2/2014 | Parsche |
| 8,763,691 B2 | 7/2014 | Parsche |
| 8,763,692 B2 | 7/2014 | Parsche |
| 8,772,683 B2 | 7/2014 | Parsche |
| 8,789,599 B2 | 7/2014 | Parsche |
| 8,796,552 B2 | 8/2014 | Faulkner et al. |
| 8,847,711 B2 | 9/2014 | Wright et al. |
| 9,151,146 B2 | 10/2015 | Rey-Bethbeder et al. |
| 9,222,343 B2 | 12/2015 | Menard et al. |
| 9,377,553 B2 | 6/2016 | Wright et al. |
| 9,603,656 B1 | 3/2017 | Germain et al. |
| 9,664,021 B2 | 5/2017 | Hyde et al. |
| 9,722,400 B2 | 8/2017 | Koppe et al. |
| 9,765,606 B2 | 9/2017 | Snow et al. |
| 10,337,259 B2 | 7/2019 | Benedict et al. |
| 10,443,364 B2 | 10/2019 | Parrella et al. |
| 11,359,473 B2 * | 6/2022 | Okoniewski ............. H05B 6/50 |
| 2005/0199386 A1 | 9/2005 | Kinzer |
| 2006/0146944 A1 | 7/2006 | Chiu |
| 2007/0215613 A1 | 9/2007 | Kinzer |
| 2009/0178827 A1 | 7/2009 | Mahlandt et al. |
| 2009/0189617 A1 | 7/2009 | Burns et al. |
| 2009/0242196 A1 | 10/2009 | Pao |
| 2010/0294488 A1 | 11/2010 | Wheeler et al. |
| 2011/0042063 A1 | 2/2011 | Diehl et al. |
| 2011/0146968 A1 | 6/2011 | Diehl |
| 2011/0146981 A1 * | 6/2011 | Diehl .................. E21B 43/2401 166/60 |
| 2011/0303423 A1 | 12/2011 | Kaminsky et al. |
| 2012/0040841 A1 | 2/2012 | Soika et al. |
| 2012/0067580 A1 | 3/2012 | Parsche |
| 2012/0073798 A1 | 3/2012 | Parsche et al. |
| 2012/0085537 A1 | 4/2012 | Banerjee et al. |
| 2012/0118565 A1 | 5/2012 | Trautman et al. |
| 2012/0125607 A1 | 5/2012 | Parsche |
| 2012/0234537 A1 | 9/2012 | Sultenfuss et al. |
| 2012/0252677 A1 | 10/2012 | Soika et al. |
| 2012/0318498 A1 | 12/2012 | Parsche |
| 2013/0192825 A1 | 8/2013 | Parsche |
| 2014/0102692 A1 | 4/2014 | Parsche |
| 2014/0131032 A1 | 5/2014 | Dittmer |
| 2014/0224472 A1 | 8/2014 | Parsche |
| 2014/0262222 A1 | 9/2014 | Wright et al. |
| 2014/0284102 A1 | 9/2014 | Ichikawa et al. |
| 2014/0290934 A1 | 10/2014 | Parsche |
| 2014/0345904 A1 | 11/2014 | Nagahashi |
| 2015/0192004 A1 | 7/2015 | Saeedfar |
| 2015/0211336 A1 | 7/2015 | Wright et al. |

(56) References Cited

U.S. PATENT DOCUMENTS

| | | |
|---|---|---|
| 2015/0276113 A1 | 10/2015 | Bass et al. |
| 2015/0381401 A1 | 12/2015 | Butterfield et al. |
| 2016/0047213 A1 | 2/2016 | Grounds, III et al. |
| 2016/0168977 A1 | 6/2016 | Donderici et al. |
| 2016/0356136 A1 | 12/2016 | Whitney et al. |
| 2017/0175505 A1 | 6/2017 | Curlett |
| 2018/0053587 A1 | 2/2018 | Weiss et al. |
| 2019/0249531 A1 | 8/2019 | Wright et al. |

FOREIGN PATENT DOCUMENTS

| | | |
|---|---|---|
| CA | 2612731 A1 | 1/2007 |
| CA | 2816101 A1 | 5/2012 |
| CA | 2811552 C | 12/2014 |
| CA | 2895595 A1 | 12/2015 |
| CA | 2955280 A1 | 1/2016 |
| CA | 2816297 C | 5/2017 |
| EP | 0284402 B1 | 1/1995 |
| EP | 1779938 A2 | 5/2007 |
| JP | 2015100188 A | 5/2015 |
| WO | 2009/049358 A1 | 4/2009 |
| WO | 2012/067769 A2 | 5/2012 |
| WO | 2012/067770 A1 | 5/2012 |
| WO | 2015/128497 A1 | 9/2015 |
| WO | 2016/024197 A2 | 2/2016 |

OTHER PUBLICATIONS

International Search Report and Written Opinion dated Jul. 21, 2017 in corresponding International Patent Application No. PCT/CA2017/050437. (9 pages).

"Available power", International Electrotechnical Commission, 1992 <http://www.electropedia.org/iev/iev.nsf/display?ppenform&ievref=702-07-10>. (2 pages).

Sresty et al., "Recovery of Bitumen from Tar Sand Deposits with the Radio Frequency Process," SPE 10229, Reservor Engineering, 1986, p. 85-94.

Sutinjo et al., "Radiation from Fast and Slow Traveling Waves", IEEE Antennas Propag., 2008, 50(4): 175-181.

Non-final Office Action and Notice of References Cited dated Nov. 21, 2019 in U.S. Appl. No. 16/092,335 (9 pages).

Koolman et al., "Electromagnetic Heating Method to Improve Steam Assisted Gravity Drainage", Paper presented at the International Thermal Operations and Heavy Oil Symposium, Calgary, Alberta, Canada, Oct. 2008, pp. 1-12 <https://doi.org/10.2118/117481-MS>.

Non-final Office Action and Notice of References Cited dated Oct. 1, 2021 in U.S. Appl. No. 16/934,146 (10 pages).

Ellison, et al. Dielectric characterization of bentonite clay at various moisture contents and with mixtures of biomass in the microwave spectrum, Journal of Microwave Power and Electromagnetic Energy, 52:1, 3-15, DOI: 10.1080/08327823.2017.1421407 (Year: 2018).

Ellison, et al. Comparative evaluation of microwave and conventional gasification of different coal types: Experimental reaction studies. Fuel, 321, p. 124055. DOI: https://doi.org/10.1016/j.fuel.2022.124055 (Year: 2022).

\* cited by examiner

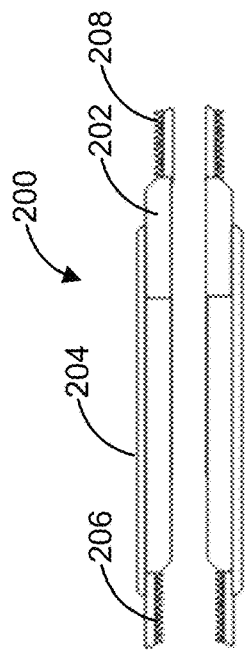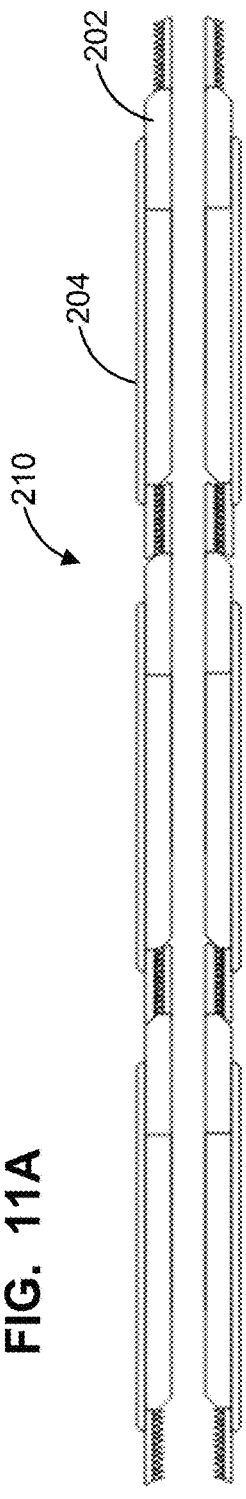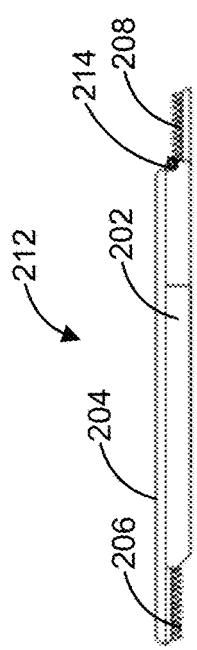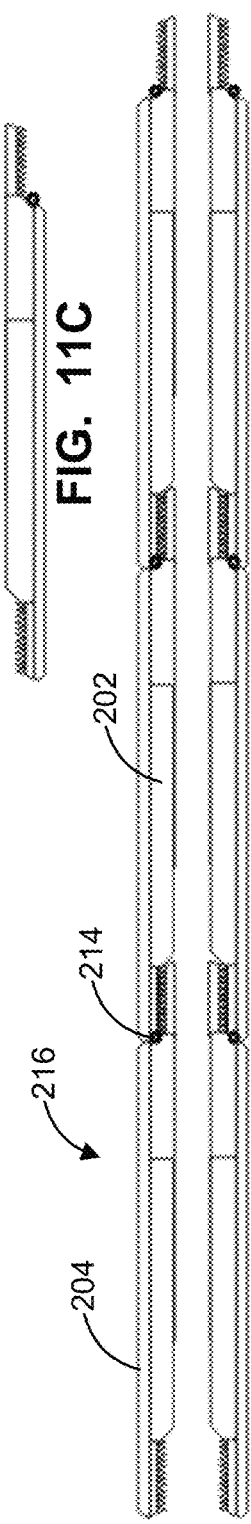
FIG. 11A
FIG. 11B
FIG. 11C
FIG. 11D

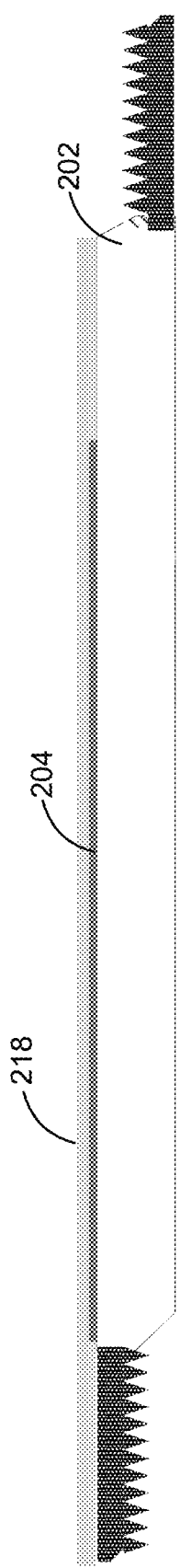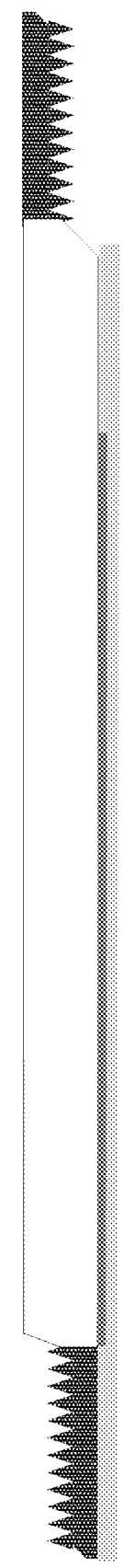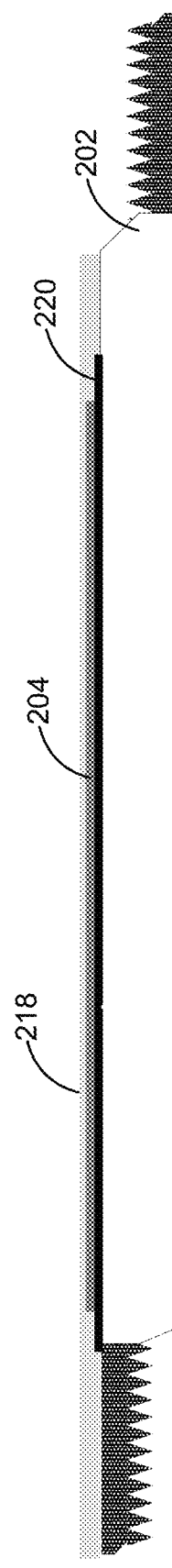
FIG. 12A
FIG. 12B

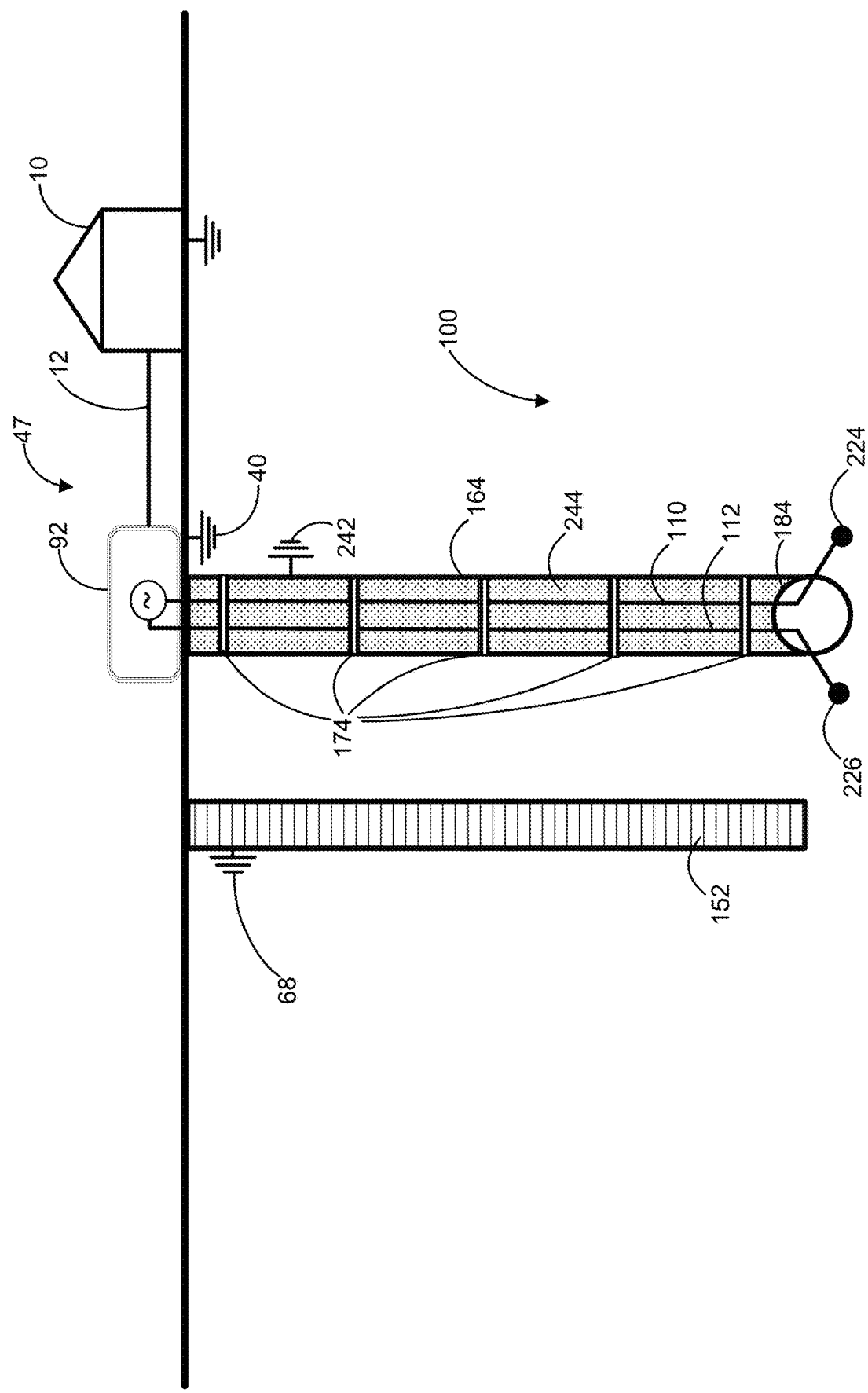

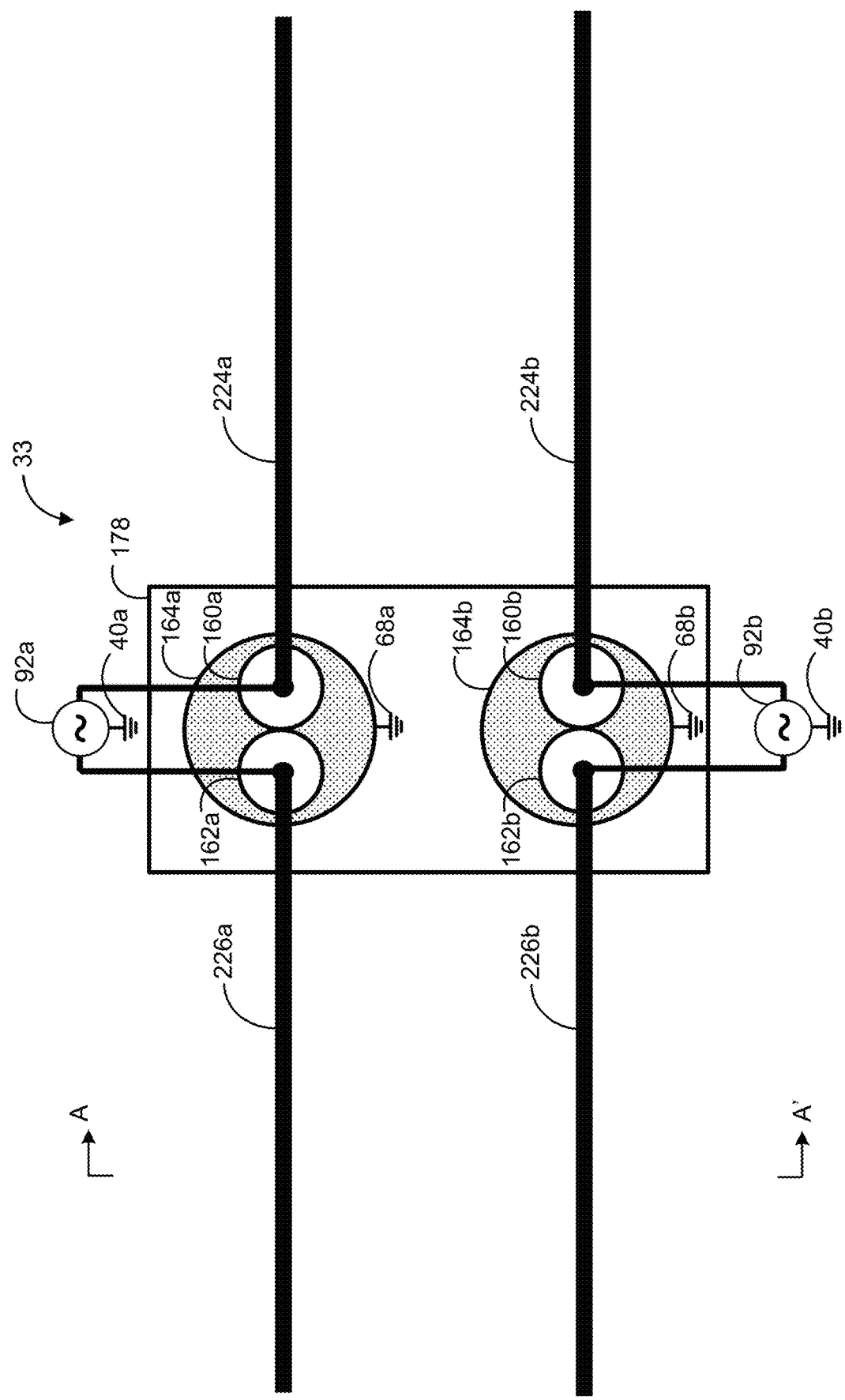

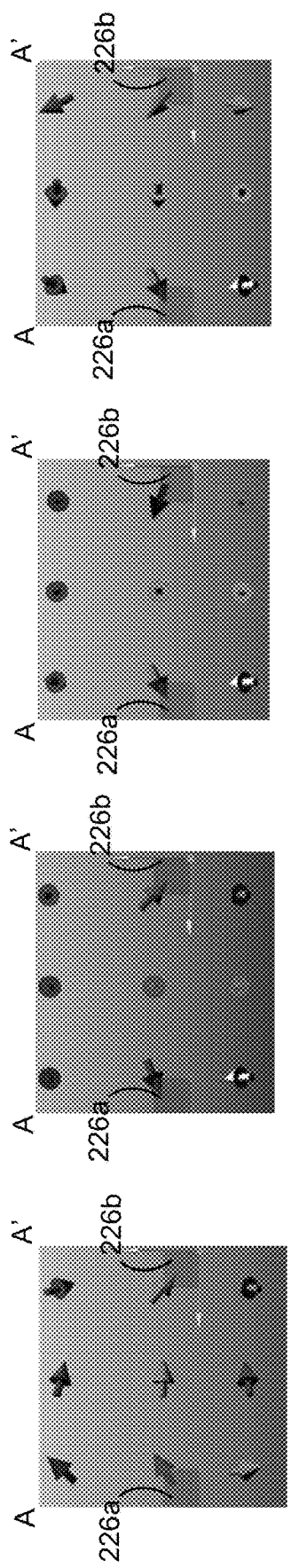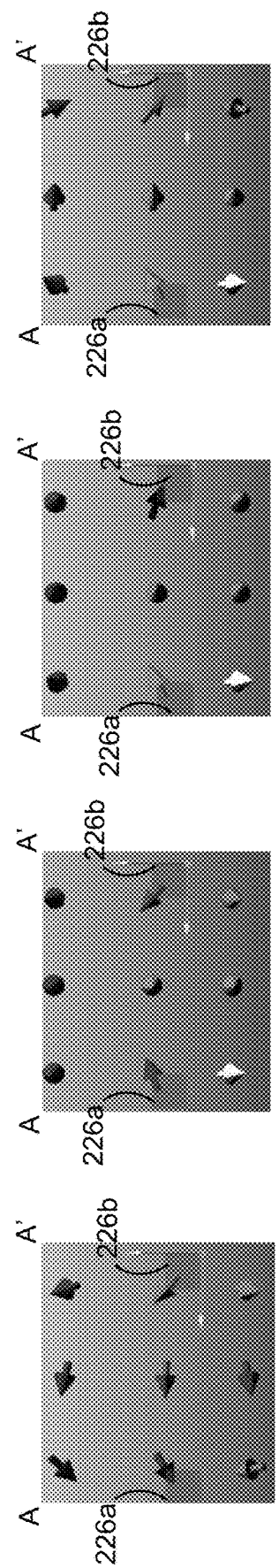
FIG. 40A FIG. 40B FIG. 40C FIG. 40D
FIG. 40E FIG. 40F FIG. 40G FIG. 40H

APPARATUS AND METHODS FOR ELECTROMAGNETIC HEATING OF HYDROCARBON FORMATIONS

CROSS-REFERENCE TO RELATED APPLICATIONS

This application is a continuation of U.S. patent application Ser. No. 16/934,146 filed on Jul. 21, 2020, which is a continuation of U.S. patent application Ser. No. 16/092,335 filed on Oct. 9, 2018 and issued as U.S. Pat. No. 10,760,392 on Sep. 1, 2020, which is a 35 U.S.C. § 371 national stage entry of International Application No. PCT/CA2017/050437 filed on Apr. 10, 2017, which claims the benefit of U.S. Provisional Patent Application No. 62/409,079 filed on Oct. 17, 2016 and U.S. Provisional Patent Application No. 62/321,880 filed on Apr. 13, 2016. The complete disclosures of U.S. application Ser. No. 16/934,146, U.S. Pat. No. 10,760,392, PCT App. No. PCT/CA2017/050437, U.S. App. No. 62/409,079, and U.S. App. No. 62/321,880 are hereby incorporated by reference for all purposes.

FIELD

The embodiments described herein relate to the field of heating hydrocarbon formations, and in particular to apparatus and methods for electromagnetically heating hydrocarbon formations.

BACKGROUND

Electromagnetic (EM) heating can be used for enhanced recovery of hydrocarbons from underground reservoirs. Similar to traditional steam-based technologies, the application of EM energy to heat hydrocarbon formations can reduce viscosity and mobilize bitumen and heavy oil within the hydrocarbon formation for production. However, the use of EM heating can require less fresh water than traditional steam-based technologies. As well, the heat transfer with EM heating can be more efficient than that of traditional steam-based technologies, leading to lower capital and operational expenses. The lower cost of EM heating provides the potential to unlock oil reservoirs that would otherwise be unviable or uneconomical for production with steam-based technologies such as shallow formations, thin formations, formations with thick shale layers, and mineface accessible hydrocarbon formations for example. Hydrocarbon formations can include heavy oil formations, oil sands, tar sands, carbonate formations, sale oil formations, and other hydrocarbon bearing formations.

EM heating of hydrocarbon formations can be achieved by using an EM radiator, or antenna, or applicator, positioned inside an underground reservoir to radiate EM energy to the hydrocarbon formation. The antenna is typically operated resonantly. The antenna can receive EM power generated by an EM wave generator, or radio frequency (RF) generator, located above ground. The EM wave generator typically generates power in the radio frequency range of 300 kHz to 300 MHz.

As the hydrocarbon formation is heated, the characteristics of the hydrocarbon formation, and in particular, the impedance, change. In order to maintain efficient power transfer to the hydrocarbon formation, dynamic or static impedance matching networks can be used between the antenna and the RF generator to limit the reflection of EM power from the antenna back to the RF generator. As well, the RF generator can be adjusted to limit the reflection of EM power from the antenna back to the RF generator. Such operational adjustments and impedance matching networks increase operational, equipment, and design costs.

To carry EM power from an RF generator to the antenna, RF transmission lines capable of delivering high EM power over long distances and capable of withstanding harsh environments (e.g., such as high pressure and temperature) usually found within oil wells are required. However, most commercially available low diameter RF transmission lines are currently limited to delivering low or medium EM power over long distances and rated for lower pressure and temperature than that usually found within oil wells. High power transmission lines such as rectangular waveguides are too large for practical deployment at the frequency range of interest. The cost of currently available RF generators is also high when measured on a cost per RF watt generated basis.

Antennas are typically dipole antennas, which require an electrically lossless or at least low loss region around the two dipole arms. Methods to provide such a lossless region, such as providing electrically lossless material, providing electrically lossless coatings, or forming a lossless region within the hydrocarbon formation, can be complex, expensive, or time-consuming. Furthermore, antenna components typically require electrical isolation, which adds complexity to maintaining mechanical integrity.

Underground antennas generally have short penetration range and hence most of their electromagnetic power is dissipated within a short distance from the antenna. That is, antennas generally heat formations in the range of less than a wavelength, or a few wavelengths of the operating frequency of the antenna.

SUMMARY

According to some embodiments, there is an apparatus for electromagnetic heating of a hydrocarbon formation. The apparatus comprises an electrical power source, at least one electromagnetic wave generator for generating high frequency alternating current, and at least two transmission line conductors coupled to the at least one electromagnetic wave generator. The at least one electromagnetic wave generator is powered by the electrical power source. The at least two transmission line conductors can be excited by the high frequency alternating current to propagate an electromagnetic wave within the hydrocarbon formation. At least one transmission line conductor is defined by a pipe.

The apparatus may further comprise at least one waveguide for carrying high frequency alternating current from the at least one electromagnetic wave generator to the at least two transmission line conductors. Each of the at least one waveguide has a proximal end and a distal end. The proximal end of the at least one waveguide is connected to the at least one electromagnetic wave generator. The distal end of the at least one waveguide is connected to one of the at least two transmission line conductors.

The at least one waveguide may comprise at least one of a power cable, a coaxial transmission line, a wire, a pipe, and at least one conductor.

The high frequency alternating current may have a frequency between about 1 kilohertz (kHz) to about 10 megahertz (MHz).

The pipe defining a transmission line conductor may comprise an interior cavity usable for conveying fluids.

The pipe defining a transmission line conductor may comprise coiled tubing.

Each of the at least one transmission line conductor defined by a pipe may comprise an external surface of the pipe.

The pipe may have a pipe opening for connecting a distal end of the at least one waveguide to the external surface of that pipe. The pipe opening may be formed by removing a segment of that pipe.

The pipe opening may be plugged with insulating material for blocking substances from entering the pipe.

In some embodiments when the at least one waveguide is a first coaxial transmission line, the first coaxial transmission line may include a first outer conductor and a first inner conductor, the first inner conductor being concentrically surrounded by the first outer conductor.

In some embodiments, the first coaxial transmission line may further include dielectric gas between the first inner conductor and the first outer conductor.

In some embodiments, the first coaxial transmission line may further include at least one of a circulation system and a pressurization system, the circulation system for circulating the dielectric gas within the first coaxial transmission line, and the pressurization system for maintaining pressure of the dielectric gas within the first coaxial transmission line.

The at least one waveguide may further comprise a second coaxial transmission line. The second coaxial transmission line may comprise a second outer conductor. The first outer conductor may be in electrical contact with the second outer conductor for blocking a substantial portion of the high frequency alternating current from travelling on external surfaces of at least one of the first outer conductor and the second outer conductor in a direction away from the at least two transmission line conductors.

In some embodiments, the first coaxial transmission line may further include at least one dielectric layer disposed between the first inner conductor and the first outer conductor for electromagnetically isolating the first inner conductor.

In some embodiments, the first coaxial transmission line may further include a centralizer connecting the first inner conductor and the first outer conductor for cooling the first inner conductor.

In some embodiments, the first outer conductor may comprise at least one casing pipe and the first inner conductor may comprise at least one of a producer pipe and an injector pipe.

The at least one casing pipe may be electrically grounded for blocking a substantial portion of the high frequency alternating current from travelling on an external surface of the at least one casing pipe in a direction away from the at least two transmission line conductors.

The apparatus may further comprise a separation medium for electrically isolating the at least one casing pipe. The separation medium may concentrically surround at least part of a length of the at least one casing pipe.

The apparatus may further comprise at least one choke, the at least one choke for blocking a substantial portion of the high frequency alternating current from travelling on external surfaces of the at least one waveguide in a direction away from the at least two transmission line conductors.

The apparatus may further comprise electrical insulation disposed along at least part of a length of a transmission line conductor for electrically insulating the transmission line conductor.

The at least one electromagnetic wave generator may comprise a first electromagnetic wave generator and a second electromagnetic wave generator. The at least two transmission line conductors may comprise a first pair of transmission line conductors and a second pair of transmission line conductors. The first pair of transmission line conductors may be excitable by high frequency alternating current generated by the first electromagnetic wave generator and the second pair of transmission line conductors may be excitable by high frequency alternating current generated by the second electromagnetic wave generator. In some embodiments, the high frequency alternating current generated by the first electromagnetic wave generator may be about 180° out of phase with the high frequency alternating current generated by the second electromagnetic wave generator. In other embodiments, the high frequency alternating current generated by the first electromagnetic wave generator may be substantially in phase with the high frequency alternating current generated by the second electromagnetic wave generator.

According to some embodiments, there is a method for electromagnetic heating of a hydrocarbon formation. The method comprises providing electrical power to at least one electromagnetic wave generator for generating high frequency alternating current; using the electromagnetic wave generator to generate high frequency alternating current; using at least one pipe to define at least one of at least two transmission line conductors; coupling the transmission line conductors to the electromagnetic wave generator; and applying the high frequency alternating current to excite the transmission line conductors. The excitation of the transmission line conductors can propagate an electromagnetic wave within the hydrocarbon formation.

The method may further comprise determining that a hydrocarbon formation between the transmission line conductors is at least substantially desiccated; and applying a radiofrequency electromagnetic current to excite the transmission line conductors. Electromagnetic waves from the radiofrequency electromagnetic current can radiate to a hydrocarbon formation surrounding the transmission line conductors.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIGS. 11A to 11D are cross-sectional view of transmission line conductors and outer waveguide conductors according to at least one example embodiment;

FIGS. 12A to 12B are cross-sectional view of transmission line conductors according to at least one example embodiment;

FIG. 24B is a cross-sectional view of an apparatus for electromagnetic heating of formations according to another embodiment;

FIG. 39 is a schematic view of an apparatus for electromagnetic heating of formations according to another embodiment;

FIGS. 40A to 40H are cross-sectional views of the electric fields of an apparatus for electromagnetic heating of formations according to the embodiment shown in FIG. 39;

Figure 1:
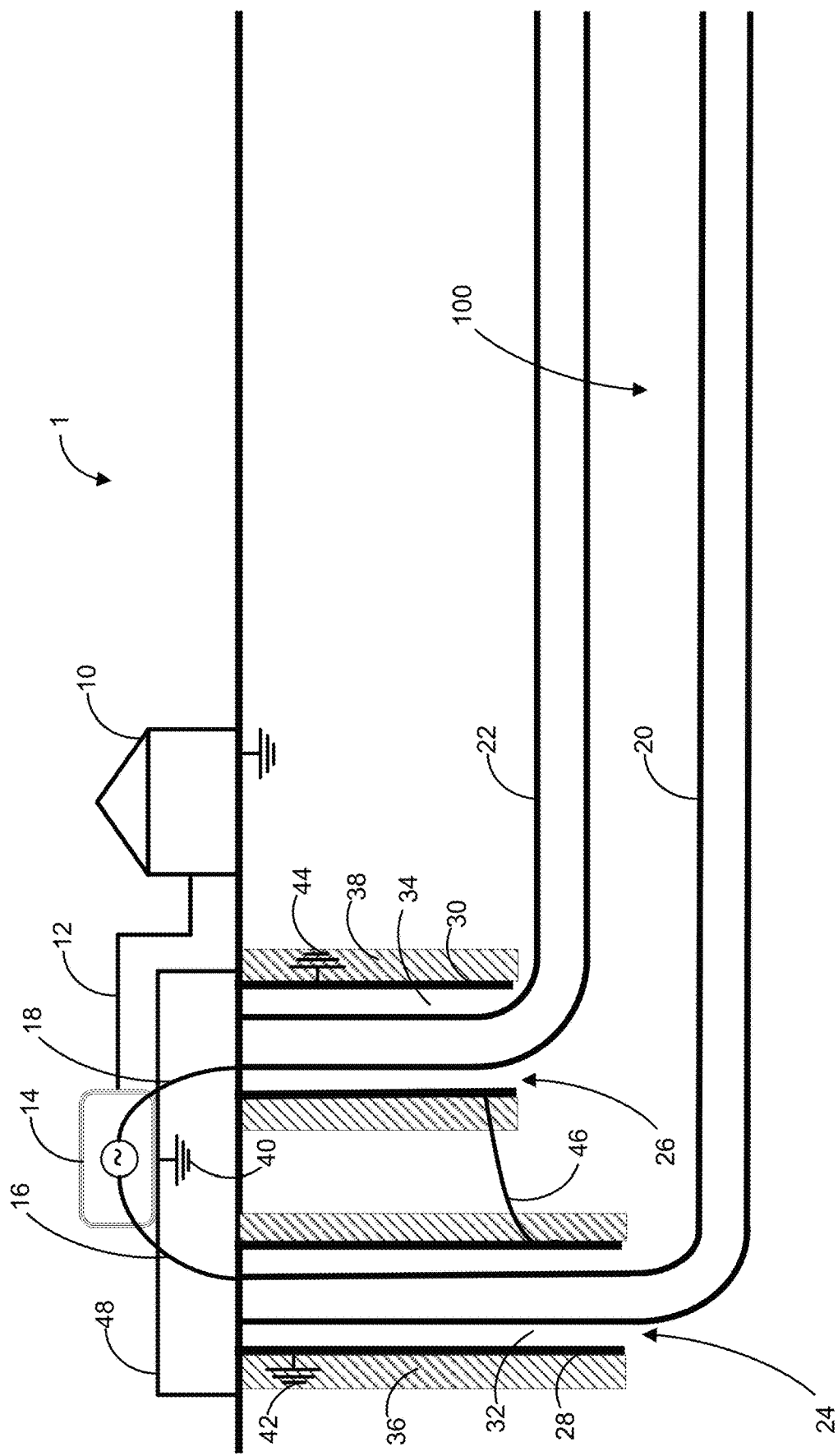
FIG. 1 is profile view of an apparatus for electromagnetic heating of formations according to one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

It should be noted that phase shifts or phase differences between time-harmonic (e.g. a single frequency sinusoidal) signals can also be expressed as a time delay. For time harmonic signals, time delay and phase difference convey the same physical effect. For example, a 180° phase difference between two time-harmonic signals of the same frequency can also be referred to as a half-period delay. As a further example, a 90° phase difference can also be referred to as a quarter-period delay. Time delay is typically a more general concept for comparing periodic signals. For instance, if the periodic signals contain multiple frequencies (e.g. a series of rectangular or triangular pulses), then the time lag between two such signals having the same fundamental harmonic is referred to as a time delay. For simplicity, in the case of single frequency sinusoidal signals the term "phase shift" shall be used. In the case of multi-frequency periodic signals, the term "phase shift" shall refer to the time delay equal to the corresponding time delay of the fundamental harmonic of the two signals.

Referring to FIG. 1, there is a profile view of an apparatus 1 according to at least one embodiment. The apparatus 1 may be used for electromagnetic heating of a hydrocarbon formation 100. The apparatus 1 includes an electrical power source 10, an electromagnetic (EM) wave generator 14, and two transmission line conductors 20 and 22.

The electrical power source 10 generates electrical power. The electrical power may be one of alternating current (AC) or direct current (DC). Power cables 12 carry the electrical power from the electrical power source 10 to the EM wave generator 14.

The EM wave generator 14 generates EM power. It will be understood that EM power can be high frequency alternating current, alternating voltage, current waves, or voltage waves. The EM power can be a periodic high frequency signal having a fundamental frequency ($f_0$). The high frequency signal can have a sinusoidal waveform, square waveform, or any other appropriate shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 14 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

The frequency of the EM power may be lower than that used by conventional RF antennas. In particular, the frequency of the EM power generated by EM wave generator 14 may be between 1 kilohertz (kHz) to 10 megahertz (MHz). Any appropriate frequency between 1 kHz to 10 MHz may be used. In some embodiments, the frequency of the EM power generated by EM wave generator 14 may be between 1 kHz to 1 MHz. In some embodiments, the frequency of the EM power generated by EM wave generator 14 may be between 1 kHz to 200 kHz.

Use of lower frequency EM power provides more efficient and cost effective options for EM wave generators. For example, low frequency EM wave generators can be built utilizing Silicon Carbide (SiC) transistors, which offer high power (e.g., approximately 100 kW to 300 kW per transistor or pair of transistors) and high efficiency (e.g., approximately 98% efficiency). SiC transistors cannot operate effectively in high frequency ranges in the order of megahertz (MHz). Furthermore, SiC transistors can operate at high temperatures (e.g., over 200° C.). EM wave generator 14 can include an inverter, a pulse synthesizer, a transformer, one or more switches, a low-to-high frequency converter, an oscillator, an amplifier, or any combination of one or more thereof.

The transmission line conductors 20 and 22 are coupled to the EM wave generator 14. Each of the transmission line conductors 20 and 22 can be defined by a pipe. In some embodiments, the apparatus may include more than two transmission line conductors. In some embodiments, only one or none of the transmission line conductors may be defined by a pipe. In some embodiments, the transmission line conductors 20 and 22 may be conductor rods, coiled tubing, or coaxial cables, or any other pipe to transmit EM energy from EM wave generator 14.

In FIG. 1, each pipe is a pipe string of a conventional steam-assisted gravity drainage (SAGD) system. Conventional SAGD systems typically comprise a pair of pipe strings, that is, an injector pipe and a producer pipe for conveying fluids. A producer pipe typically conveys fluids from an underground formation to the surface, or above ground. Meanwhile, an injector pipe typically conveys fluids from the surface to an underground formation. A pair of pipe strings is substantially horizontal (i.e., parallel to the surface) (as shown in FIG. 1), When a pair of pipe strings are substantially horizontal, the producer pipe is generally located at a lower depth from the surface than the injector pipe. Under circumstances in which there are more than one injector pipes, the producer pipe can similarly be located a lower depth from the surface than the injector pipes In some embodiments, a pipe string of a conventional SAGD system can be used as a transmission line conductor 20 and 22 without interfering with the use of the pipe string for conveying fluids. That is, the interior cavity of the pipe string can remain usable for conveying fluids.

The pipe can generally be a contiguous, metallic pipe. Conventional SAGD pipe strings are typically carbon steel having relatively low conductivity and high magnetic permeability. However, the large diameter of SAGD pipe strings and low operational frequency can provide sufficiently low electrical resistivity such that little heat is generated on the pipe surface at the frequency of the EM power. In some embodiments, highly conductive metals having low magnetic permeability can be cladded to the pipe strings. In some embodiments, no cladding is provided and the metallic pipe is in direct contact with the hydrocarbon formation. In some embodiments, the metallic pipe is partially or fully covered with electrical insulation.

When the interior cavity of the pipe string remains usable for conveying fluids, the transmission line conductors 20 and 22 are more specifically defined by the external surface of the pipe. That is, the exterior surface of the pipe can be used for transmitting high frequency current. In some embodiments, transmission line conductors 20 and 22 only transmit EM energy from EM wave generator 14 and do not convey fluids.

In some embodiments, one or more injector pipes and/or one or more producer pipes from different pipe strings can be used as transmission line conductors. For example, an injector pipe from a first pipe string can be used as a first transmission line conductor and a producer pipe from a second pipe string can be used as a second transmission line conductor. Furthermore, an injector pipe from the second pipe string can also be used as a third transmission line conductor. In some other embodiments, two or more injector pipes are used as transmission line conductors, while producer pipes are not used as transmission line conductors. In other words the producer pipes in this case are left just to produce.

The transmission line conductors 20 and 22 are coupled to the EM wave generator 14. The transmission line conductors 20 and 22 can have a proximal end and a distal end. The proximal end of the transmission line conductors 20 and 22 can be coupled to the EM wave generator 14. The transmission line conductors 20 and 22 can be excited by the high frequency alternating current generated by the EM wave generator 14. When excited, the transmission line conductors 20 and 22 form an open transmission line between transmission line conductors 20 and 22. The open transmission line carries EM energy in a cross-section of a radius comparable to a wavelength of the excitation. The open transmission line propagates an electromagnetic wave from the proximal end of the transmission line conductors 20 and 22 to the distal end of the transmission line conductors 20 and 22. In some embodiments, the electromagnetic wave may propagate as a standing wave. In other embodiments, the electromagnetic wave may propagate as a partially standing wave. In yet other embodiments, the electromagnetic wave may propagate as a travelling wave.

The hydrocarbon formation between the transmission line conductors 20 and 22 can act as a dielectric medium for the open transmission line. The open transmission line can carry and dissipate energy within the dielectric medium, that is, the hydrocarbon formation. The open transmission line formed by transmission line conductors and carrying EM energy within the hydrocarbon formation may be considered a "dynamic transmission line". By propagating an electromagnetic wave from the proximal end of the transmission line conductors 20 and 22 to the distal end of the transmission line conductors 20 and 22, the dynamic transmission line may carry EM energy within long wells. Wells spanning a length of 500 meters (m) to 1500 meters (m) can be considered long wells.

The impedance of the dynamic transmission line may depend weakly on frequency. In a lossy medium, the impedance will be complex. However, the apparatus may be designed such that the real value of complex impedance is significant. In some embodiments, the real value of complex impedance may be designed to be between 1 Ohm ($\Omega$) and 1000 Ohms ($\Omega$). In some embodiments, the real value of complex impedance may be designed to be between 10 Ohms ($\Omega$) to 100 Ohms ($\Omega$). In some embodiments, the real value of complex impedance may be designed to be between 1 Ohm ($\Omega$) and 30 Ohms ($\Omega$). The coupling of the EM wave generator to the transmission line conductors is simplified when the real value of complex impedance is significant.

As the hydrocarbon formation is heated, the characteristics of the hydrocarbon formation, and in particular, the impedance, change. To minimize the impact of such impedance changes, the dynamic transmission line is operated at much lower frequencies than that of conventional RF antennas. Operation of the dynamic transmission line at lower frequencies further simplifies the coupling of the EM wave generator to the transmission line conductors.

In some embodiments, the dynamic transmission line may be operated to achieve a temperature between 150° C. to 250° C. The dynamic transmission line can be operated to achieve temperatures that result in steam generation. Depending on the depth of and the pressure in the hydrocarbon formation, steam generation can typically occur between 100° C. and 300° C.

Each of the transmission line conductors 20 and 22 can be coupled to the EM wave generator 14 via a waveguide 24 and 26 for carrying high frequency alternating current from the EM wave generator 14 to the transmission line conductors 20 and 22. Each of the waveguides 24 and 26 can have a proximal end and a distal end. The proximal ends of the waveguides can be connected to the EM wave generator 14. The distal ends of the waveguides 24 and 26 can be connected to the transmission line conductors 20 and 22.

Waveguides 24 and 26 are shown in FIG. 1 as being substantially vertical (i.e., perpendicular to the surface). In some embodiments, one or both of waveguides 24 and 26, metal casing pipe 28 and 30, or sections thereof can be angled or curved with respect to the surface.

Each waveguide 24 and 26 can include a pipe and metal casing pipe 28 and 30 concentrically surrounding the pipe. The pipe can form an inner conductor and the metal casing pipe 28 and 30 can form an outer conductor of the waveguide 24 and 26. Together, the pipe and metal casing 28 and 30 form a two-conductor waveguide, or coaxial transmission line. In some embodiments, the two-conductor waveguide can be provided by a power cable or a coaxial transmission line.

In some embodiments, an inner conductor can be provided by at least one of a wire and a conductor rod. In FIG. 1, the inner conductors of the waveguides are provided by the injector pipe and the producer pipe of a conventional SAGD system. In particular, the inner conductors are provided by the vertical portions of the injector and producer pipes. Each inner conductor can be coupled to the EM wave generator 14 via high frequency connectors 16 and 18. The high frequency connectors 16 and 18 may pass through conventional SAGD system infrastructure 48.

The two-conductor waveguide structure can further include a dielectric layer 32 and 34 disposed between the pipe and metal casing pipe 28 and 30 for electromagnetically isolating the pipe. The dielectric layer 32 and 34 can fill the space between the pipe and metal casing pipe 28 and 30. The dielectric layer 32 and 34 can have a low loss at high frequencies. The dielectric layer can allow for high efficiency power transfer at high frequencies.

In FIG. 1, the dielectric layer 32 and 34 is air. Any appropriate dielectric layer 32 and 34 may be used. In some embodiments, the dielectric layer 32 and 34 can be formed of a solid dielectric material such as ceramics, structural ceramics, polyether ether ketone (PEEK), or polytetrafluoroethylene (PTFE) (i.e., Teflon®). In some embodiments, the dielectric layer 32 and 34 can include at least one dielectric centralizer. In some embodiments, the dielectric layer can be formed of a fluid, such as pressurized gas.

The dielectric layer 32 and 34 can have a dielectric constant between 1 to 100. Any appropriate dielectric layer 32 and 34 having a dielectric constant between 1 to 100 may be used. In some embodiments, a dielectric layer 32 and 34 having a dielectric constant between 1 to 25 can be used. In some embodiments, a dielectric layer 32 and 34 having a dielectric constant between 1 to 4 can be used. In some embodiments, dielectric layer 32 and 34 can have a high dielectric breakdown voltage to allow the two-conductor waveguide structure to operate at higher voltages, thus increasing the power capacity of the waveguide.

The outer conductors of the waveguides can be electrically grounded at 42 and 44 to block a substantial portion of high frequency alternating current from travelling along the exterior surfaces of the waveguides 24 and 26, and in particular, the outer conductors 28 and 30. High frequency alternating current travelling along the exterior surfaces of the waveguides 28 and 30 may travel in a direction that is different from the direction of the electromagnetic wave propagating along the transmission line conductors 20 and 22. That is, high frequency alternating current travelling along the exterior surfaces of the waveguides 28 and 30 may travel in a direction away from the transmission line conductors 20 and 22 and return to the surface, or above ground.

The EM wave generator 14 and the metal casing pipes 28 and 30 of the waveguides 24 and 26 can be electrically grounded to a common ground 40, 42, and 44. As shown in FIG. 1, an optional electrical short 46 between the metal casing pipes 28 and 30 may be used to electrically ground the metal casing pipes 28 and 30 to a common ground.

At least part of a length of the outer conductors of the waveguides can be concentrically surrounded by a separation medium 36 and 38 for electrically isolating the outer conductors 28 and 30 and preserving the structural integrity of the borehole. In FIG. 1, the separation medium 36 and 38 is formed of cement.

Each of the high frequency connectors 16 and 18 carry high frequency alternating current from the EM wave generator 14 to the inner conductors. In some embodiments, the high frequency alternating current being transmitted to the first waveguide 24 via high frequency connector 16 is substantially identical to the high frequency alternating current being transmitted to the second waveguide 26 via high frequency connector 18. The expression substantially identical is considered here to mean sharing the same waveform shape, frequency, amplitude, and being synchronized. In some embodiments, the high frequency alternating current being transmitted to the first waveguide 24 via high frequency connector 16 is a phase-shifted version of the high frequency alternating current being transmitted to the second waveguide 26 via high frequency connector 18. The expression phase-shifted version is considered here to mean sharing the same waveform, shape, frequency, and amplitude but not being synchronized. In some embodiments, the phase-shift may be a 180° phase shift. In some embodiments, the phase-shift may be an arbitrary phase shift so as to produce an arbitrary phase difference.

As shown in FIG. 1, the EM wave generator 14 is located above ground, or at the surface. In some embodiments, the EM wave generator may be located underground. An apparatus with the EM wave generator located above ground rather than underground may be easier to deploy. However, when the EM wave generator is located underground, transmission losses are reduced because EM energy is not dissipated in the areas that do not produce hydrocarbons (i.e., distance between the EM wave generator and the transmission line conductors). When the EM wave generator is located above ground, transmission losses between the EM wave generator and the transmission line conductors may be reduced by positioning such vertical pipe sections close together and filling the space with low loss materials to reduce power loss.

An apparatus with the EM wave generator located above ground may also be used for SAGD preheating applications. That is, EM energy may be used to temporarily preheat areas between the injector and producer to increase the hydraulic communication between the wells before the onset of steam flooding. SAGD preheating can significantly accelerate production out of a new SAGD pair.

Figure 2:
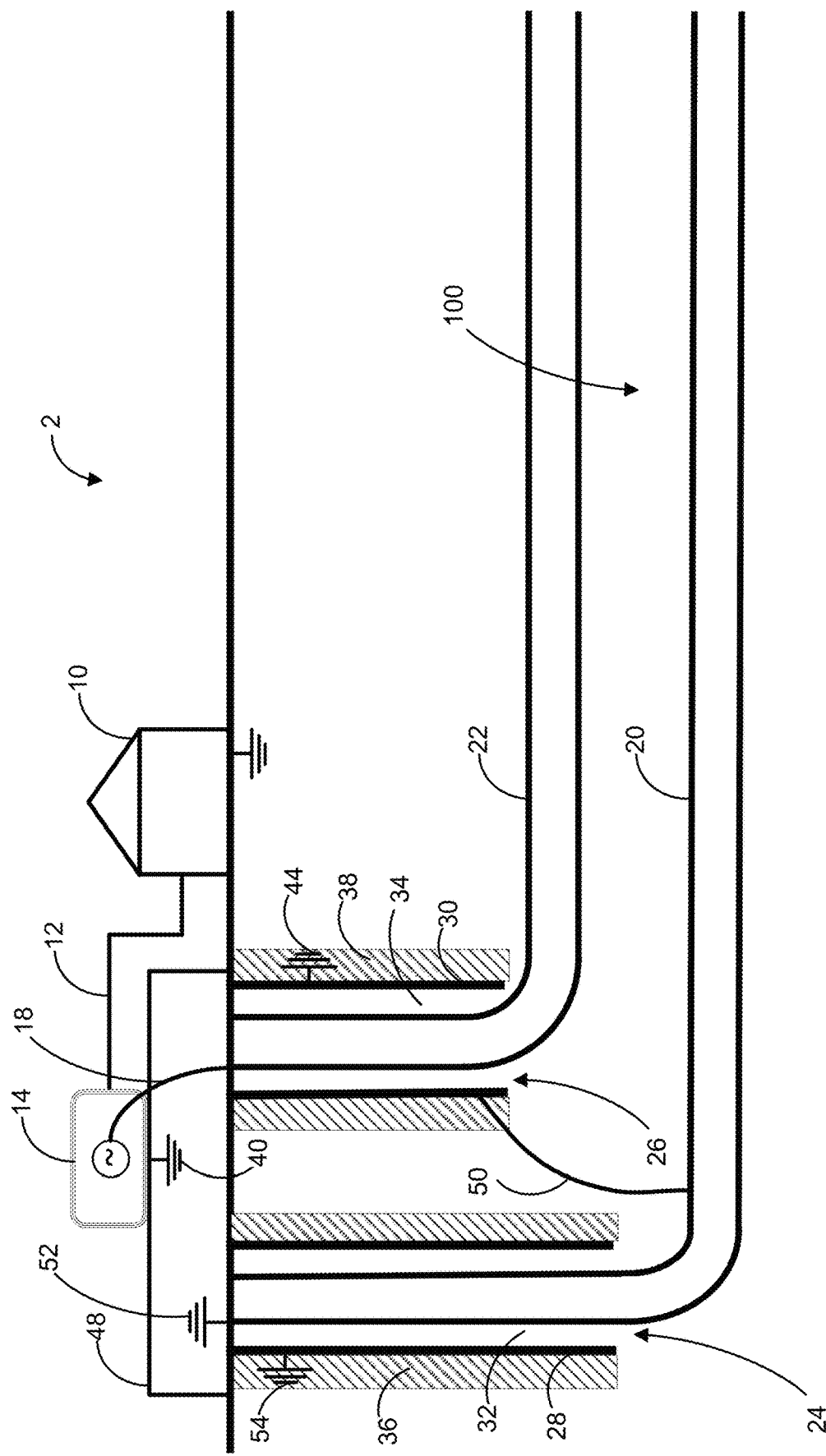
FIG. 2 is a profile view of an apparatus for electromagnetic heating of formations according to another embodiment.

Referring to FIG. 2, there is a profile view of an apparatus 2 according to at least one example embodiment. Features common to apparatus 1 and 2 are shown using the same reference numbers. In apparatus 2, a high frequency connector 18 carries high frequency alternating current from the EM wave generator 14 to the inner conductor of a second waveguide 26. The EM wave generator 14, the outer conductor 30 of the second waveguide 26, and the inner conductor of the first waveguide 24 are connected to a common ground 40, 44, and 52. The outer conductor 28 of the first waveguide 24 is also electrically grounded at 54. However, electrical grounding 54 of the outer conductor 28 of the first waveguide 24 is achieved separately from grounding through the common ground 40, 44, and 52 to avoid short-circuiting the transmission line conductor 20. As shown in FIG. 2, an optional electrical short 50 may be provided between the metal casing pipe 30 and the inner conductor of the first waveguide 24.

Figure 3:
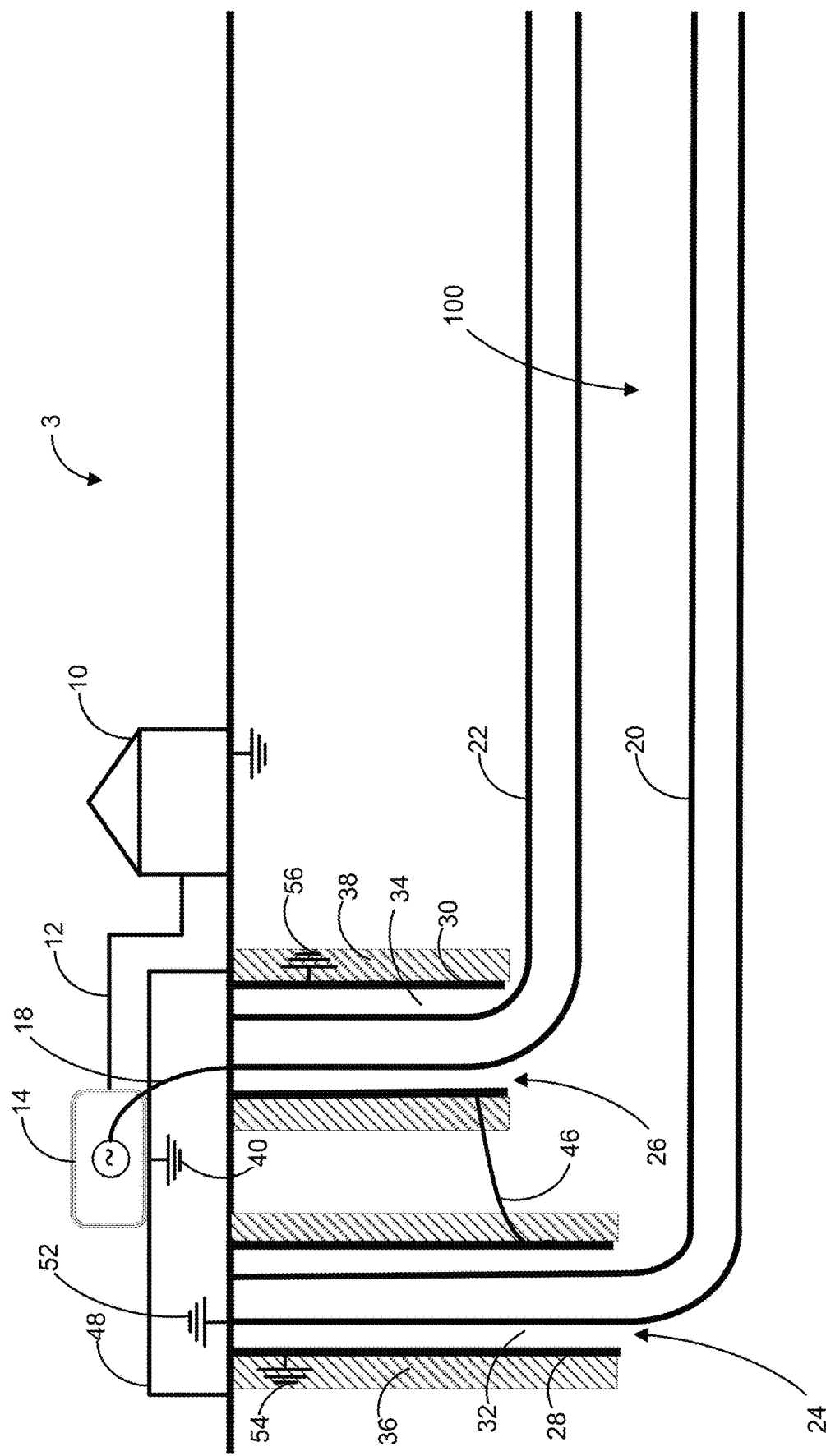
FIG. 3 is a profile view of an apparatus for electromagnetic heating of formations according to another embodiment.

Referring to FIG. 3, there is a profile view of an apparatus 3 according to at least one example embodiment. Features common to apparatus 1, 2 and 3 are shown using the same reference numbers. In apparatus 3, a high frequency connector 18 carries high frequency alternating current from the EM wave generator 14 to the inner conductor of a second waveguide 26. The EM wave generator 14 and the inner conductor of the first waveguide 24 are connected to a common ground 40 and 52. The outer conductors 28 and 30 of the first and second waveguides 24 and 26 are also electrically grounded at 54 and 56. However, electrical grounding of the outer conductors 28 and 30 at 54 and 56 is achieved separately from grounding through the electrical ground 40 and 52 to avoid short-circuiting the transmission line conductors 20 and 22.

Figure 4:
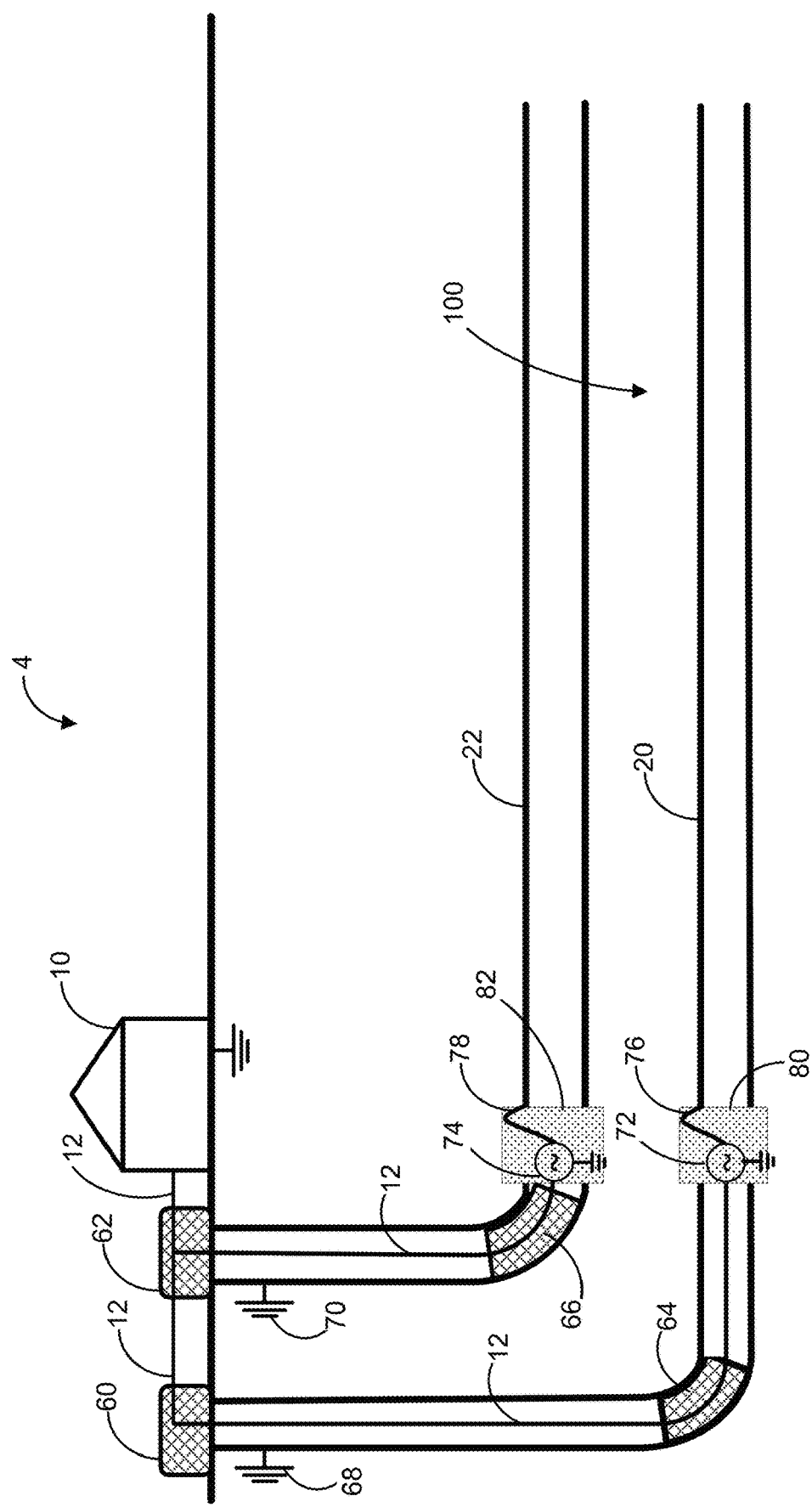
FIG. 4 is a profile view of an apparatus for electromagnetic heating of formations according to another embodiment.

Referring to FIG. 4, there is a profile view of an apparatus 4 according to at least one example embodiment. The apparatus 4 includes an electrical power source 10, EM wave generators 72 and 74, and two transmission line conductors 20 and 22. Power cables 12 carry the electrical power from the electrical power source 10 to the EM wave generators 72 and 74. Power cables 12 can be routed through the pipes to connect to the EM wave generators 72 and 74. In some embodiments, power cables 12 can be routed along the outside of the pipes (not shown), or along conduits (not shown).

As shown in FIG. 4, the EM wave generators 72 and 74 may be located underground and disposed along the pipes. Each of the EM wave generators 72 and 74 can include an inverter, a pulse synthesizer, a transformer, one or more switches, a low-to-high frequency converter, an oscillator, an amplifier, or any combination of one or more thereof. In some embodiments, chokes 60 and 62 may be located at the surface and disposed along power cable 12 to block high frequency alternating current from returning to the surface. In some embodiments, additional chokes 64 and 66 may be located underground. Chokes 60, 62, 64, and 66 may be implemented using any appropriate technique known to those skilled in the art.

In some embodiments, chokes are not used at all. An apparatus without chokes can allow for simpler deployment. Furthermore, chokes can be lossy and the elimination of chokes can increase the power efficiency of the apparatus. As well, chokes can be frequency dependent. That is, chokes can have a limited operational frequency range. The operational frequency range of chokes can in turn limit the selection of the frequency of EM power generated by the EM wave generators 72 and 74. Hence, the elimination of chokes can allow for a greater range of EM power to be used. In some embodiments, the pipes upstream of the EM wave generators 72 and 74 can be electrically grounded at 68 and 70 to prevent or limit high frequency alternating current from returning to the surface, as shown in FIG. 4.

The EM wave generators 72 and 74 generate the high frequency alternating current. Each of the EM wave generators 72 and 74 can be connected through a common ground. In some embodiments, the high frequency alternating current generated by EM wave generator 72 is substantially identical to the high frequency alternating current generated by EM wave generator 74. In some embodiments, the high frequency alternating current generated by EM wave generator 72 is a phase-shifted version of the high frequency alternating current generated by EM wave generator 74. For example, the high frequency alternating current generated by EM wave generator 72 can be a sinusoidal signal and the high frequency alternating current generated by EM wave generator 74 can be a 180° phase-shifted version of the sinusoidal signal generated by EM wave generator 72. Alternatively, the high frequency alternating current generated by EM wave generator 74 can be a phase-shifted version of the sinusoidal EM wave generated by EM wave generator 72 in which the phase shift is an arbitrary phase shift.

Each of the high frequency connectors 76 and 78 carry high frequency alternating current from the EM wave generators 72 and 74 to transmission line conductors 20 and 22. In this embodiment, the high frequency connectors 76 and 78 can be a power cable. Each of the high frequency connectors 76 and 78 provide a first conductor of the two-conductor waveguide. The electrical grounding of the EM wave generators 72 and 74 provide a second conductor of the two-conductor waveguide.

Each of the high frequency connectors 76 and 78 can have a proximal end and a distal end. The proximal ends of the high frequency connectors can be connected to the EM wave generators 72 and 74. The distal ends of the high frequency connectors can be connected one of the transmission line conductors 20 and 22.

To connect the distal ends of the high frequency connectors 76 and 78 to the exterior surface of pipes, a lengthwise segment of the pipes can be removed to form a pipe opening. In some embodiments, the high frequency connectors 76 and 78 are positioned to contact the exterior surface of the pipes. In some embodiments, the high frequency connectors 76 and 78 may pass through the pipe opening in order to contact the exterior surface of the pipe.

Insulating material 80 and 82 can be provided to plug the pipe opening. Insulating material 80 and 82 can block substances from entering the pipes. More specifically, insulating material 80 and 82 can block solids, liquids, and gases from the hydrocarbon formation surrounding the pipe opening from entering pipes via the pipe opening. Insulating material 80 and 82 can be inert, or not chemically reactive, to such solids, liquids and gases from the hydrocarbon formation. If insulating material is chemically reactive to solids, liquids and gases from the hydrocarbon formation, the insulating material may disintegrate over time. Insulating material 80 and 82 can also provide structural continuity and integrity for pipes. Insulating material 80 and 82 can be mechanically strong enough to withstand pressure within pipes from pushing into the hydrocarbon formation.

Insulating material 80 and 82 can have a low dissipation factor (tan δ) to reduce electrical losses at the frequency of operation. In particular, any appropriate insulating material having dissipation factor less than 0.01 may be used. In some embodiments, the insulating material may have a dissipation factor less than 0.005. Insulating material 80 and 82 may be exposed to high temperatures. Any appropriate insulating material 80 and 82 capable of withstanding temperatures greater than 250° C. may be used. Insulating material 80 and 82 can be any appropriate dielectric material. For example, insulating material can include ceramics, synthetic polymers, plastics, and less preferably, fiberglass and cement, or a combination thereof. The properties of insulating material 80 and 82 are less stringent than the properties required for providing an electrically lossless material around dipole arms of conventional RF antennas.

Figure 5:
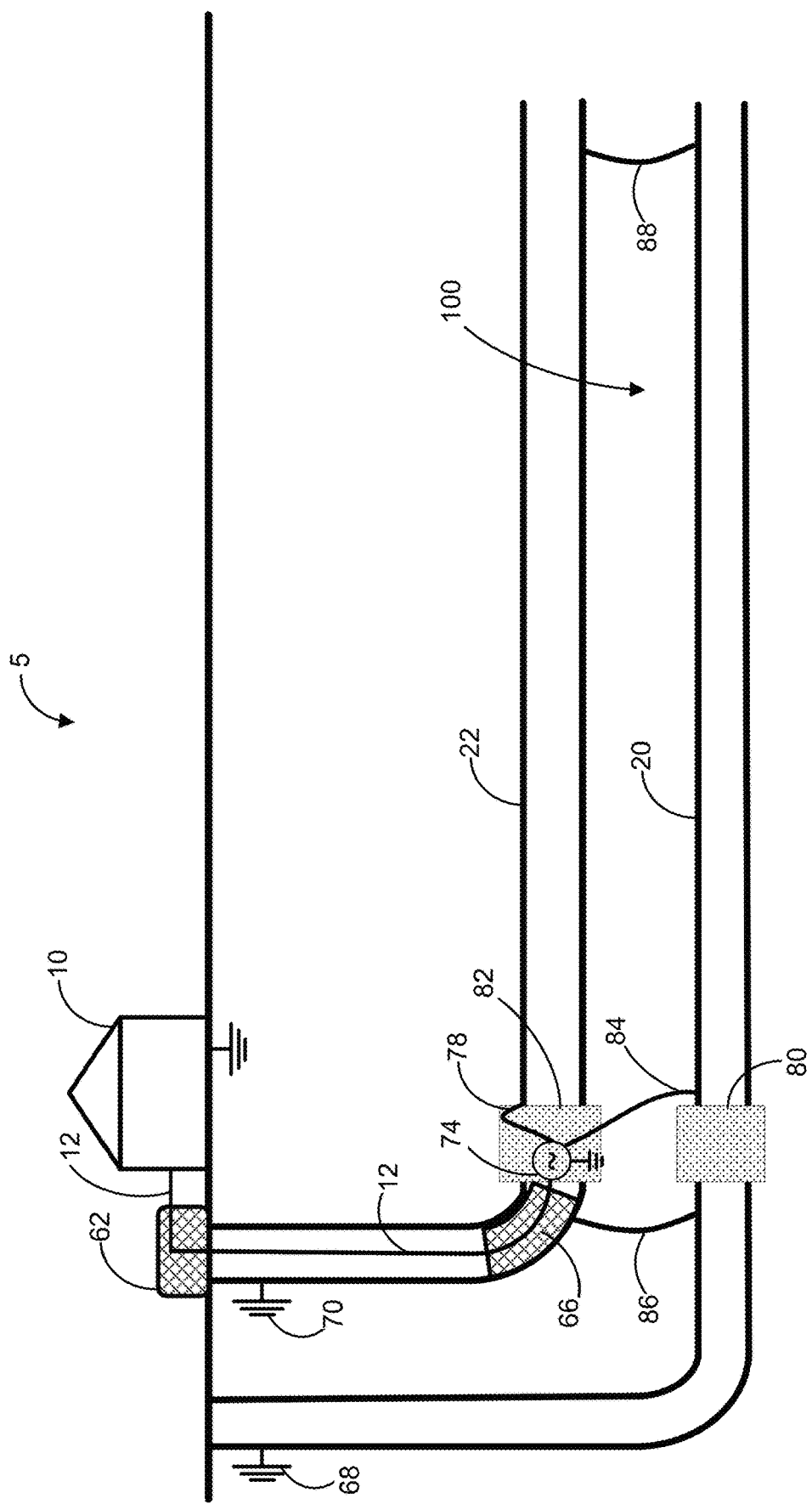
FIG. 5 is a profile view of an apparatus for electromagnetic heating of formations according to another embodiment.

Referring to FIG. 5, there is a profile view of an apparatus 5 according to at least one example embodiment. Features common to apparatus 4 and 5 are shown using the same reference numbers. In contrast to apparatus 4 which includes two EM wave generators 72 and 74, apparatus 5 includes only one EM wave generator 74 disposed along the pipe. A first high frequency connector 78 carries high frequency alternating current from the EM wave generator 74 to transmission line conductor 22 and a second high frequency connector 84 carries high frequency alternating current from the EM wave generator 74 to transmission line conductor 20. Although apparatus 5 does not include an EM wave generator disposed along the second pipe, insulating material 80 can be provided along the second pipe to electrically isolate the transmission line conductor 20 from the vertical portion of the second pipe.

In some embodiments, an electrical short 86 between the pipes upstream of, or prior to pipe openings can be provided to block high frequency alternating current from returning above ground, or to the surface. More specifically, electrical short 86 blocks high frequency alternating current from flowing on the external surface of the vertical portion of pipes. In some embodiments, an electrical short 88 between pipes at the distal end of the transmission line conductors 20 and 22 can be provided to adjust the impedance seen by the EM wave generator 74.

Figure 6:
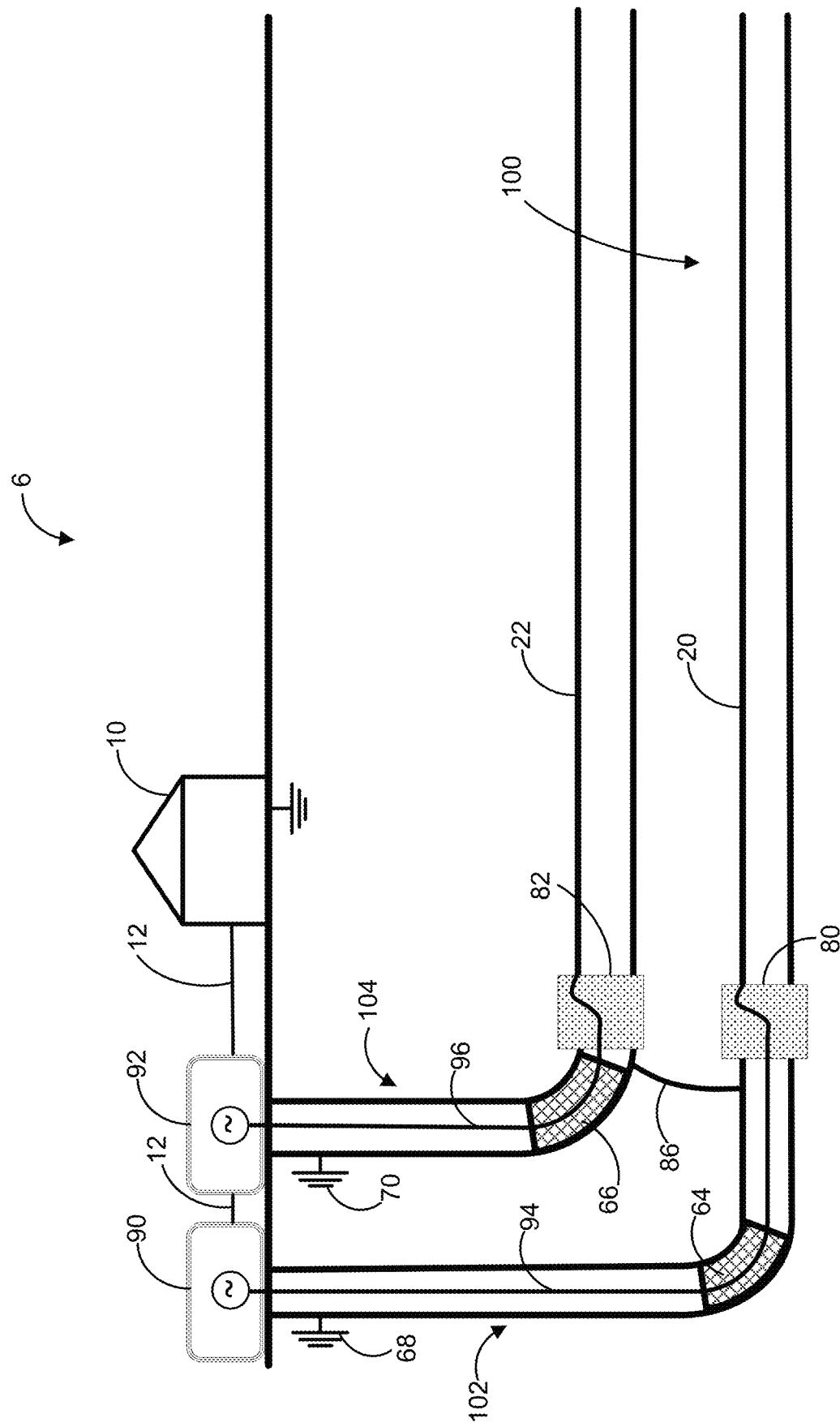
FIG. 6 is a profile view of an apparatus for electromagnetic heating of formations according to another embodiment.

Referring to FIG. 6, there is a profile view of an apparatus 6 according to at least one example embodiment. Features common to apparatus 4, 5, and 6 are shown using the same reference numbers. Similar to apparatus 4, apparatus 6 includes two EM wave generators 90 and 92. However, in contrast to the EM wave generators 72 and 74 which are disposed along the pipe and located underground, the EM wave generators 90 and 92 are located above ground, at the surface. Each of the EM wave generators 90 and 92 can include an inverter, a pulse synthesizer, a transformer, one or more switches, a low-to-high frequency converter, an oscillator, an amplifier, or any combination of one or more thereof.

A first high frequency connector 94 carries high frequency alternating current from the EM wave generator 90 to transmission line conductor 20 and a second high frequency connector 96 carries high frequency alternating current from the EM wave generator 92 to transmission line conductor 22. Although apparatus 6 does not include an EM wave generators disposed along the pipes, insulating material 80 and 82 are provided along the pipes to electrically isolate the transmission line conductors 20 and 22 from waveguides 102 and 104.

Each of the transmission line conductors 20 and 22 can be coupled to the EM wave generator 14 via waveguide 102 and 104 for carrying high frequency alternating current from the EM wave generators 90 and 92 to the transmission line conductors 20 and 22. Each of the waveguides 102 and 104 can have a proximal end and a distal end. The proximal ends of the waveguides can be connected to the EM wave generators 90 and 92. The distal ends of the waveguides can be connected one of the transmission line conductors 20 and 22.

Each waveguide 102 and 104 can include a pipe and high frequency connector 94 and 96 located within the pipe. The pipe can form an outer conductor and the high frequency connectors 94 and 96 can form the inner conductors of the waveguides 102 and 104. Together, the pipe and high frequency connector 94 and 96 form a two-conductor waveguide, or coaxial transmission line.

Figure 7:
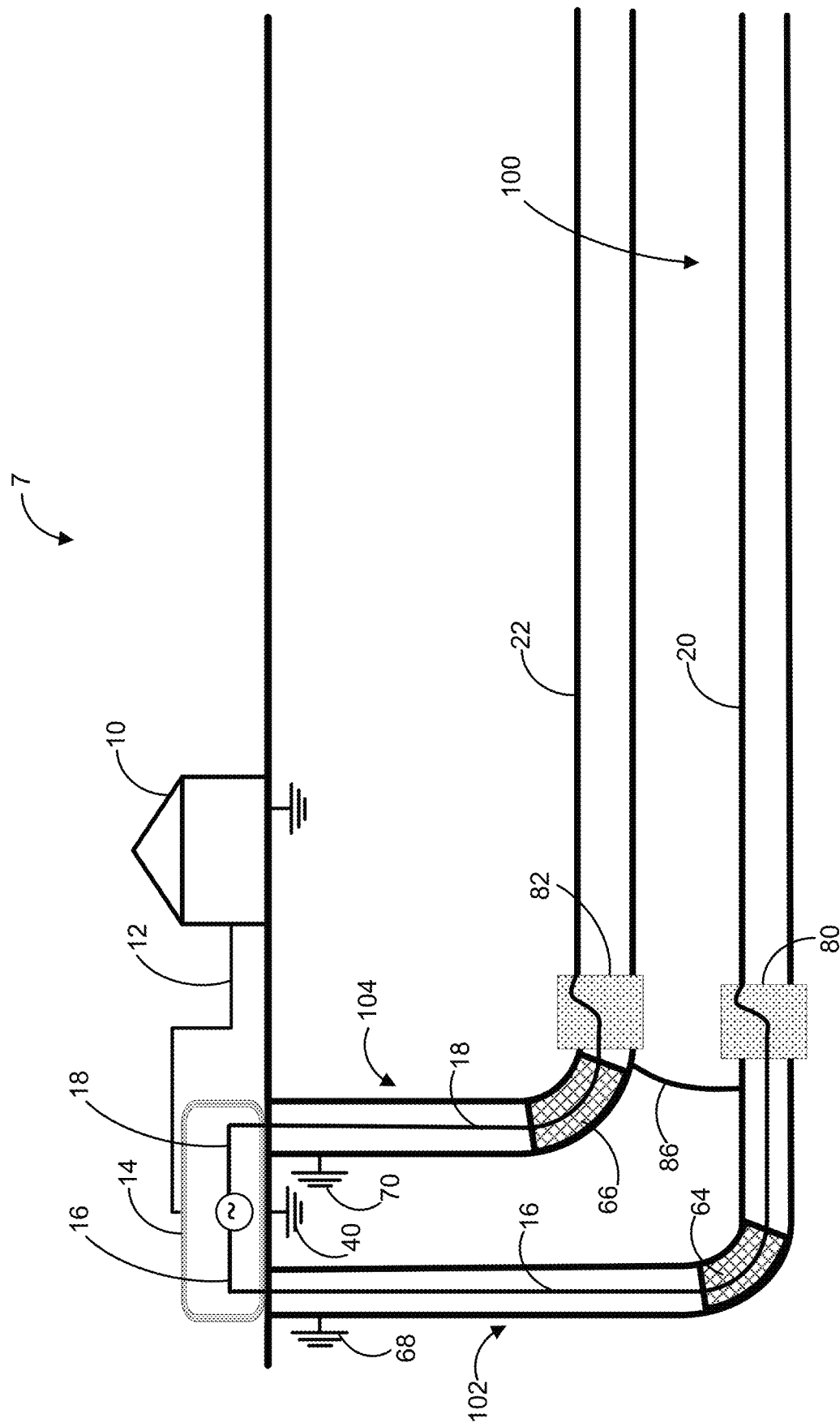
FIG. 7 is a profile view of an apparatus for electromagnetic heating of formations according to another embodiment.

Referring to FIG. 7, there is a profile view of an apparatus 7 according to at least one example embodiment. Features common to apparatus 1, 6 and 7 are shown using the same reference numbers. Similar to apparatus 1, apparatus 7 includes an EM wave generator 14 located above ground, at the surface. Similar to apparatus 6, apparatus 7 includes two-conductor waveguides 102 and 104 formed by pipes and high frequency connectors 16 and 18 located within the pipes. The pipes can form an outer conductor and the high frequency connectors 16 and 18 can form an inner conductor of waveguides 102 and 104 as shown.

Figure 8:
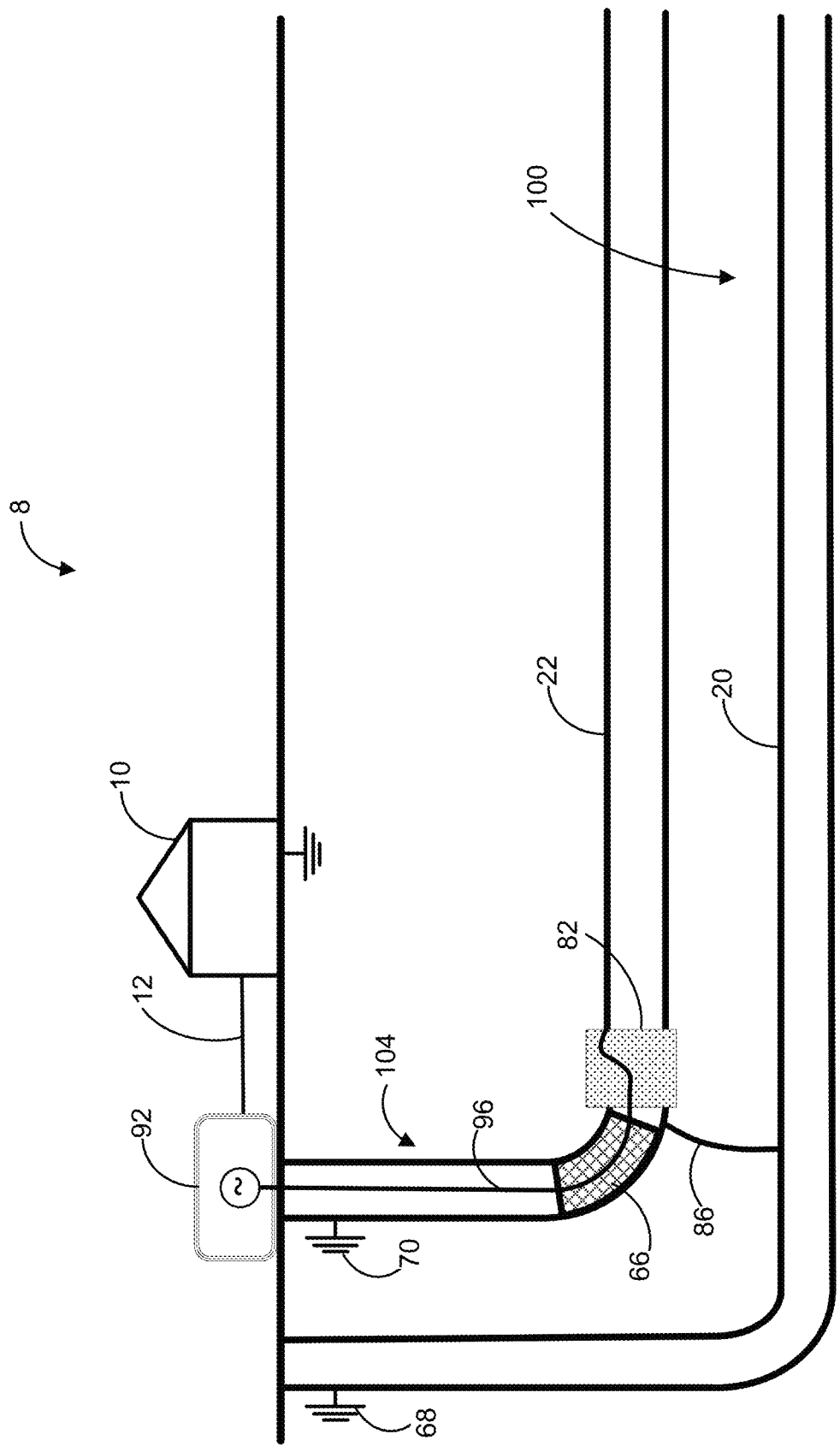
FIG. 8 is a profile view of an apparatus for electromagnetic heating of formations according to another embodiment.

Referring to FIG. 8, there is a profile view of an apparatus 8 according to at least one example embodiment. Features common to apparatus 5, 6 and 8 are shown using the same reference numbers. In contrast to apparatus 6, which includes two EM wave generators 90 and 92, apparatus 8 includes only one EM wave generator 92.

A high frequency connector 96 carries high frequency alternating current from the EM wave generator 92 to transmission line conductor 22. Although the EM wave generator 92 is located above ground and not disposed along the pipe, insulating material 82 can be provided along the pipe to electrically isolate transmission line conductor 22 from the two-conductor waveguide 104. The two-conductor waveguide 104 includes the high frequency connector 96 located within the pipe. The high frequency connector 96 provides an inner conductor for waveguide 104 and the pipe provides an outer conductor for waveguide 104. The second pipe, or transmission line conductor 20, and the EM wave generator 92 are electrically grounded to a common ground at 68 and 79 to form the dynamic transmission line.

Similar to apparatus 5, an electrical short 86 is provided between the pipes upstream of, or prior to, pipe opening 82 and transmission line conductors 20 and 22 to block high frequency alternating current from returning above ground, or to the surface. More specifically, electrical short 86 blocks high frequency alternating current from flowing on the external surface of the vertical portion of pipes.

Figure 9:
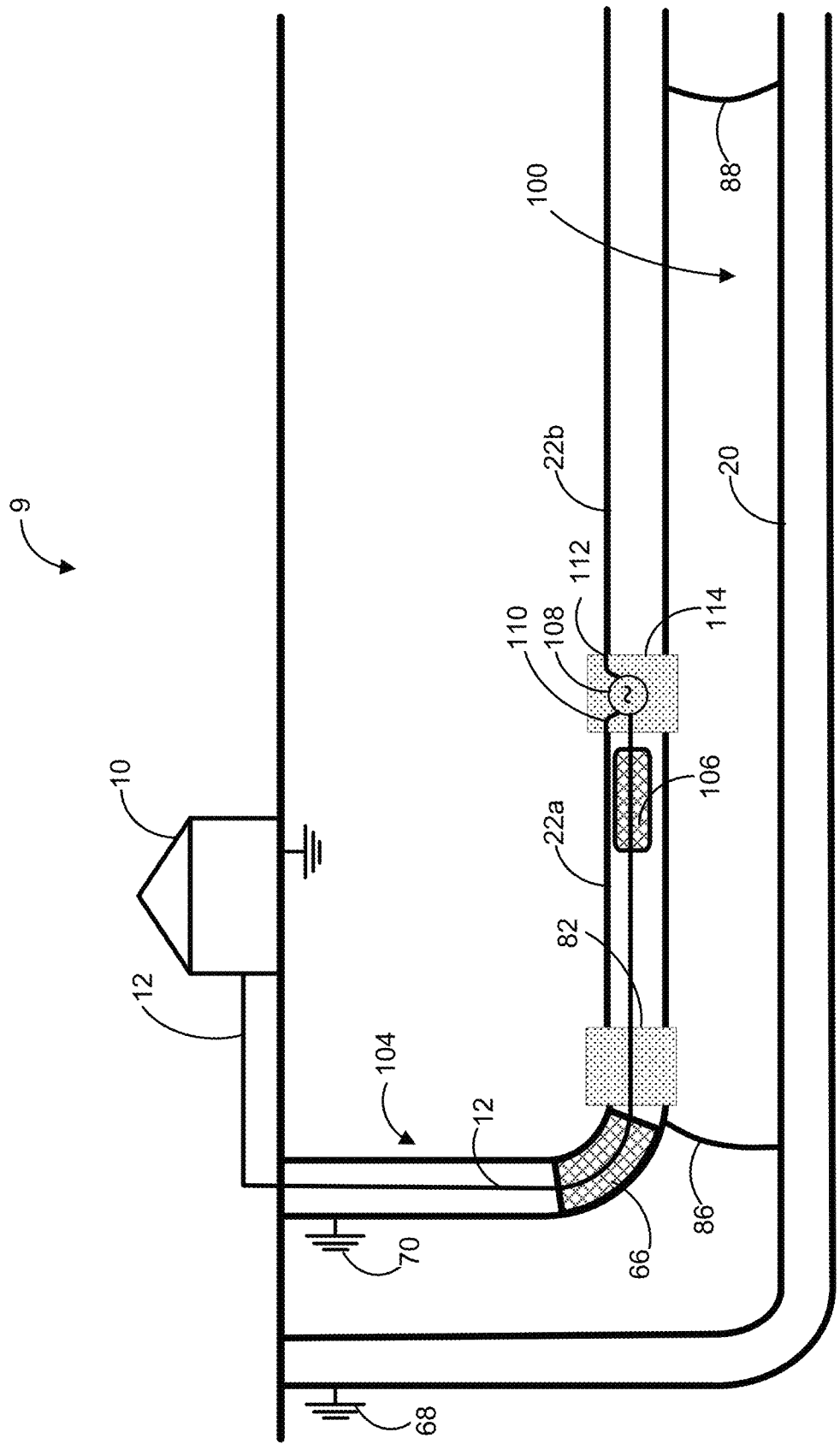
FIG. 9 is a profile view of an apparatus for electromagnetic heating of formations according to another embodiment.

Referring to FIG. 9, there is a profile view of an apparatus 9 according to at least one example embodiment. Features common to apparatus 5 and 9 are shown using the same reference numbers. Similar to apparatus 5, apparatus 9 includes only one EM wave generator 108 located underground. However, as shown, EM wave generator 108 of apparatus 9 is located further along the pipe string. EM wave generator 108 can include an inverter, a pulse synthesizer, a transformer, one or more switches, a low-to-high frequency converter, an oscillator, an amplifier, or any combination of one or more thereof. Similar to insulating material 80 and 82, insulating material 114 can be provided to plug the pipe opening.

In this example embodiment, transmission line conductor 22 is split into two portions: a first portion 22a located between insulating materials 82 and 114, and a second portion 22b located after insulating material 114; that is, between insulating material 114 and the distal end of transmission line conductor 22. A first high frequency connector 110 can be used as the waveguide for carrying high frequency alternating current from the EM wave generator 108 to transmission line conductor 22a. A second high frequency connector 112 can also be used as the waveguide for carrying high frequency alternating current from the EM wave generator 108 to transmission line conductor 22b.

Similar to apparatus 8, apparatus 9 can include choke 66 disposed along the pipe to block high frequency alternating current from returning above ground. Apparatus 9 can also include additional choke 106 located further along the pipe string, namely, within transmission line conductor 22a. As shown in FIG. 9, an electrical short 88 between pipes at the distal end of the transmission line conductors 20 and 22 can be provided to adjust the impedance seen by the EM wave generator 108. Electrical short 88 can also delineate a limit to the active portion of the transmission line conductors 20 and 22. That is, electrical short 88 can delineate the portion of the transmission line conductors 20 and 22 that delivers EM energy to the hydrocarbon formation.

In the example embodiment shown in FIG. 9, the apparatus 9 can simultaneously operate as an open transmission line and an antenna. That is, apparatus 9 has a similar structure to a folded dipole. However, in contrast to conventional folded dipoles, apparatus 9 is located in a lossy medium and therefore the resonant nature of the dipole is not required. Furthermore, the impedance transforming capacity of apparatus 9 may be reduced with the provision of an additional electrical short 88 at the distal end of the transmission line conductors.

Figure 10:
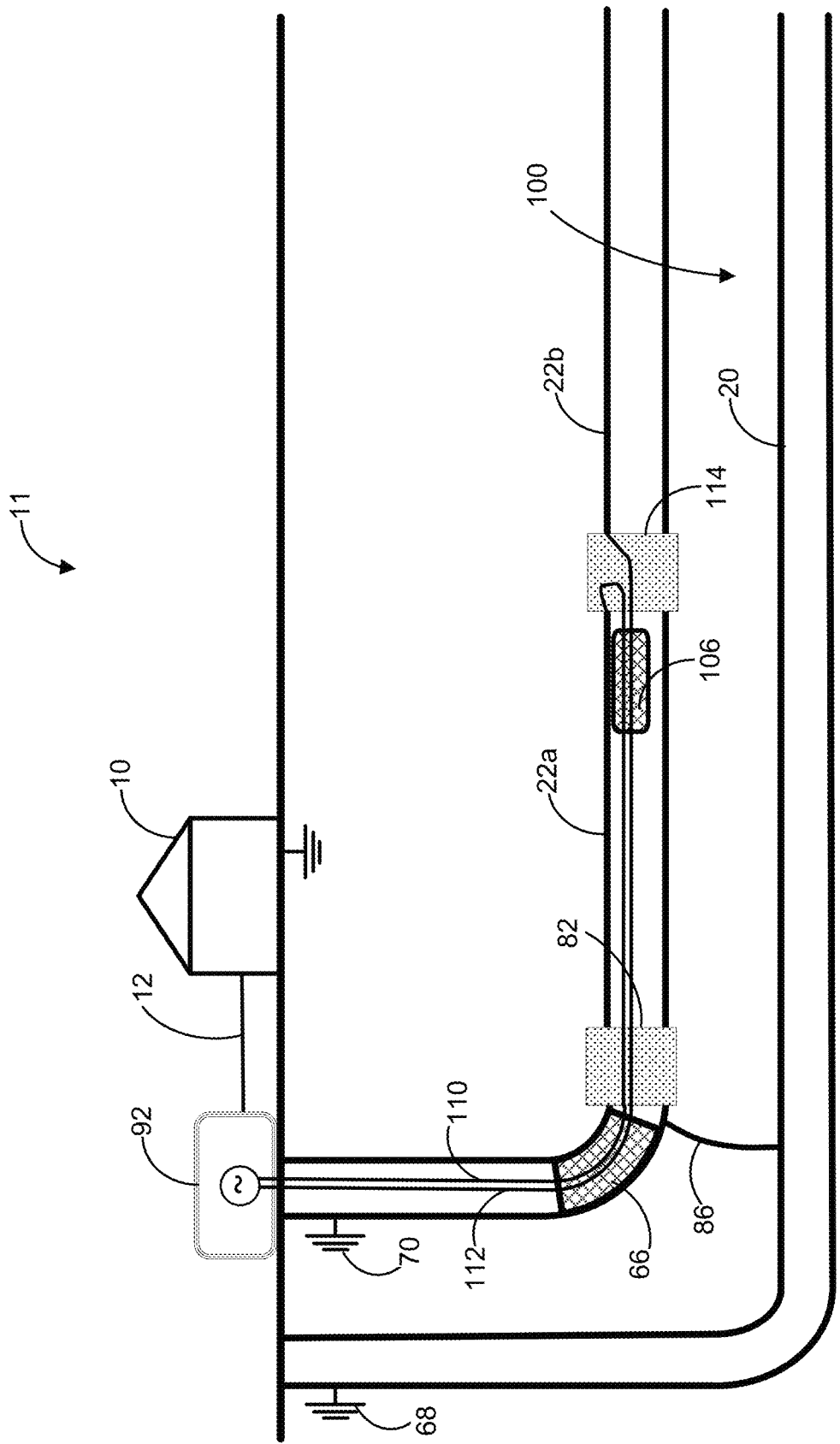
FIG. 10 is a profile view of an apparatus for electromagnetic heating of formations according to another embodiment.

Referring to FIG. 10, there is a profile view of an apparatus 11 according to at least one example embodiment. Features common to apparatus 8, 9 and 11 are shown using the same reference numbers. Similar to apparatus 8, apparatus 10 includes only one EM wave generator 92 located above ground, or at the surface. Similar to apparatus 9, transmission line conductor 22 is split into two portions: a first portion 22a located between insulating materials 82 and 114, and a second portion 22b located after insulating material 114; that is, between insulating material 114 and the distal end of transmission line conductor 22. A first high frequency connector 110 can be used as a waveguide for carrying high frequency alternating current from the EM wave generator 92 to transmission line conductor 22a and a second high frequency connector 112 can be used as a waveguide for carrying high frequency alternating current from the EM wave generator 92 to transmission line conductor 22b.

Referring to FIGS. 11A to 11D, there is cross-sectional views of transmission line conductors 20 and 22 and outer waveguide conductors according to at least one example embodiment. Transmission line conductors 20 and 22 and outer waveguide conductors can be formed of a plurality of pipe sections. FIG. 11A illustrates a single pipe section 200. Each pipe section can include connecting ends. The connecting ends may provide a female member 206 or a male member 208. The female member 206 and male member 208 can be mateable with a corresponding male member 208 or female member 206 of another pipe section respectively. The connecting ends are not limited to threaded pipe sections. In some embodiments, the connecting ends may include clamps, other fastening means, or a combination of fastening means. As shown in FIG. 11B, multiple pipe sections can be connected together into a multiple pipe sections 210.

In some embodiments, pipe sections can be electrically insulated by providing electrical insulation 204 adjacent to, or covering the metallic pipe section 202. In some embodiments, pipe sections can be partially insulated as in the case of pipe section 200 shown in FIG. 11A or completely insulated as in the case of the pipe section 212 in FIG. 11C. As shown by the multiple pipe sections 210 of FIG. 11B, when pipe sections are partially insulated and connected together, portions of metallic pipe sections remain exposed. When installed in an underground reservoir, the exposed metallic pipe sections may come in direct contact with the hydrocarbon formation. Partially insulated pipe sections such as pipe sections 210 shown in FIG. 11B can be easier to assemble, particularly at rigs.

As shown in FIG. 11D, when pipe sections are completely insulated and connected together in multiple pipe sections 216, the metallic pipe sections are not exposed. With completely insulated pipe sections 212, a seal 214 can be provided at the connecting end to insulate the junction between female members 206 and male members 208. The seal 214 may be formed of any high temperature, oil and gas compatible insulating material. For example, the seal 214 may be Vitron® O-rings.

Any appropriate electrical insulation 204 may be used. In some embodiments, the electrical insulation 204 may be insulating, high temperature paint. Examples of insulating, high temperature paint include aluminum oxide, or titanium oxide filled enamel paints, or ceramic paints. In some embodiments, the electrical insulation 204 may be a dielectric material.

Referring to FIGS. 12A and 12B, there are cross-sectional views of transmission line conductors 20 and 22 according to at least one example embodiment. In some embodiments, additional layers 218 of electrical insulation may be provided (shown in FIGS. 12A and 12B). Additional layers 218 may be provided over top of the electrical insulation 204, particularly when the electrical insulation 204 covering the metallic pipe 200 is mechanically fragile. Additional layers 218 may be designed to be sacrificial. That is, additional layers 218 may be provided to protect the electrical insulation layer 204 during deployment. Additional layers 218 may be designed to be destroyed during deployment, or at the onset of heat exposure. Any appropriate material may be used to provide additional layers 218. For example, additional layers 218 can be a powder coating based on epoxy.

As shown in FIG. 12B, in some embodiments, cladding 220 may be provided between the electrical insulation 204 and metallic pipe 200 to improve the electrical conductivity of metallic pipe 200 and to provide better adhesion of the electrical insulation 204 to the metallic pipe 200. Cladding 220 may be highly conductive metal with low magnetic permeability. Any appropriate material may be used to provide cladding 220. For example, cladding 220 may be copper or aluminum. If aluminum cladding is used, the aluminum can be anodized. Any appropriate anodizing process may be used. For example, plasma anodizing can be used to eliminate pores in the metallic pipe. Alternatively, less sophisticated anodizing processes may be followed by pore elimination processes. Cladding 220 may cover an entire pipe section or a portion of a pipe section.

Figure 13:
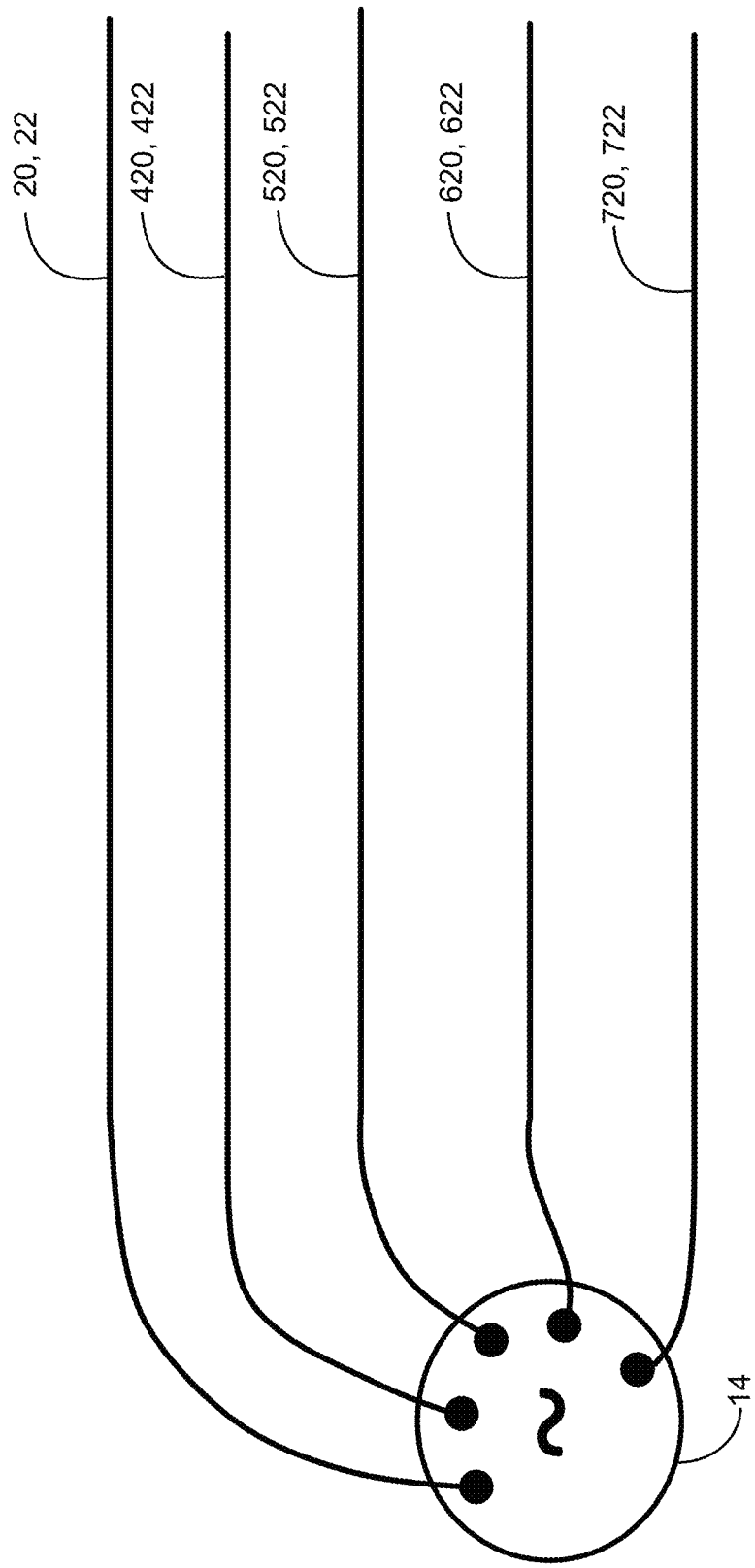
FIG. 13 is a schematic view of an apparatus having five transmission line conductor pairs and one EM wave generator.

Referring to FIG. 13, there is a schematic top view of an apparatus having five transmission line conductor pairs and one EM wave generator 14. Although only one EM wave generator 14 is shown, in some embodiments, a plurality of EM wave generators may be used. Since conventional SAGD systems typically include well pairs of injector and producer pipes, such well pairs may be utilized to provide an open transmission line. That is, each well pair can provide a pair of transmission line conductors for one open transmission line. Each of the transmission line conductor pairs is excitable by the high frequency alternating current in one of the manners described above. Additionally, phase shifts can be provided for high frequency alternating current provided to neighboring well pairs. More specifically, the high frequency alternating current provided to producer pipe 20 of well pair 20 and 22 can be 180° out of phase from the high frequency alternating current provided to producer pipe 420 of well pair 420 and 422. As well, the high frequency alternating current provided to injector pipe 22 of well pair 20 and 22 can be 180° out of phase from the high frequency alternating current provided to injector pipe 422 of well pair 420 and 422. Furthermore, the high frequency alternating current provided to producer pipe 420 of well pair 420 and 422 can be 180° out of phase from the high frequency alternating current provided to producer pipe 520 of well pair 520 and 522. In this way, additional transmission line pairs between the neighboring producer pipes (20 and 420; 420 and 520; 520 and 620; 620 and 720) and between the neighboring injector pipes (22 and 422; 422 and 522; 522 and 622; 622 and 722) are formed, enhancing the heating process and production efficiency. It should be understood that, in some embodiments, phase shifts other than 180° can also be used.

In addition to pipe strings of a well pair, additional transmission line conductors (not shown in FIG. 13) can be provided by conductor rods, pipes or wires to further enhance hydrocarbon recovery. Additional transmission line conductors can be perforated tubings that can supply fluid to the hydrocarbon formation. The fluids can, for example, comprise steam or gas such as methane ($CH_4$), carbon dioxide ($CO_2$). Carbon dioxide can be supplied for $CO_2$ sequestration in the hydrocarbon formation after hydrocarbon production.

Figure 14:
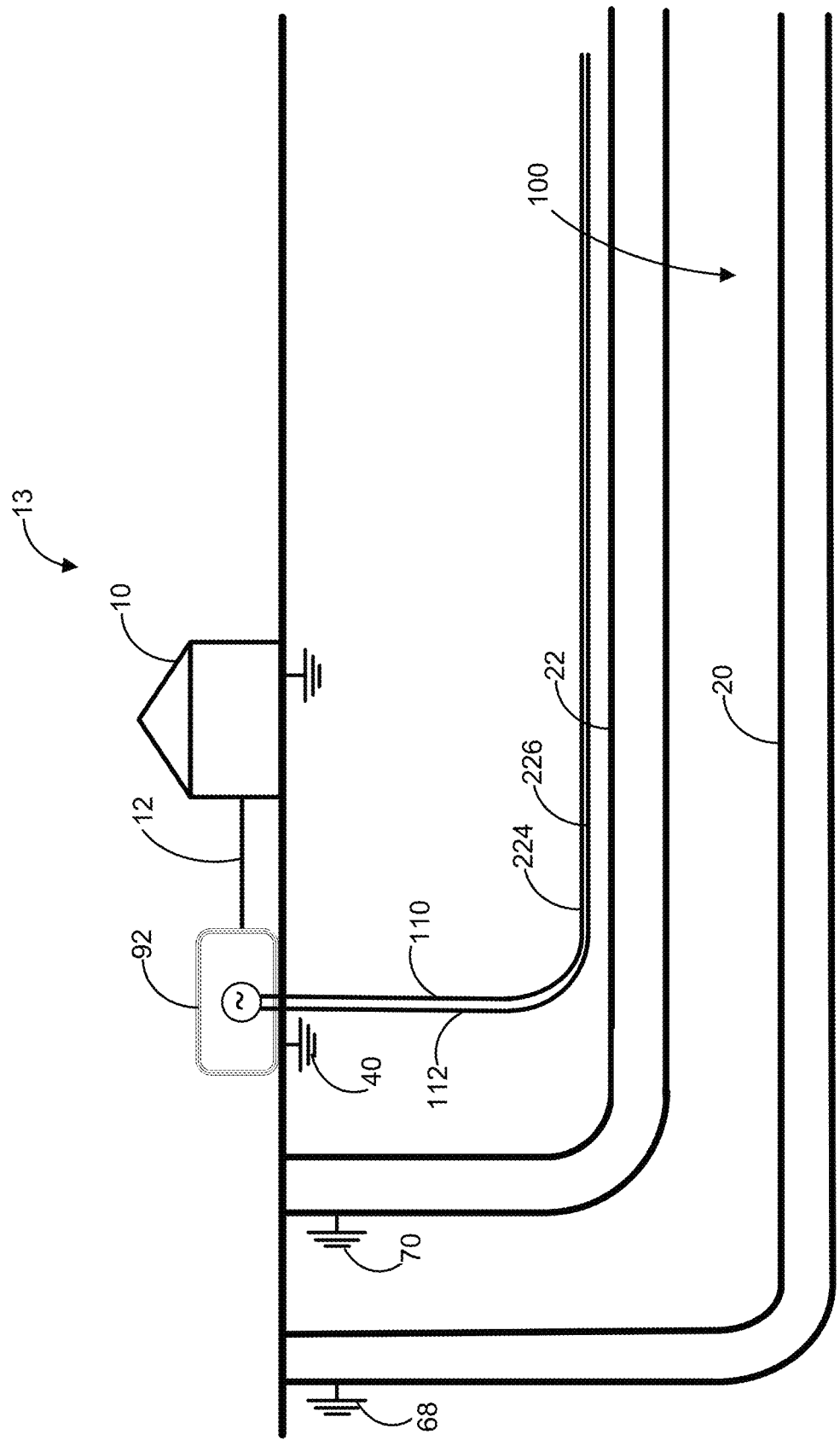
FIGS. 14 and 15 are profile and cross-sectional views of an apparatus for electromagnetic heating of formations according to another embodiment.
Figure 15:
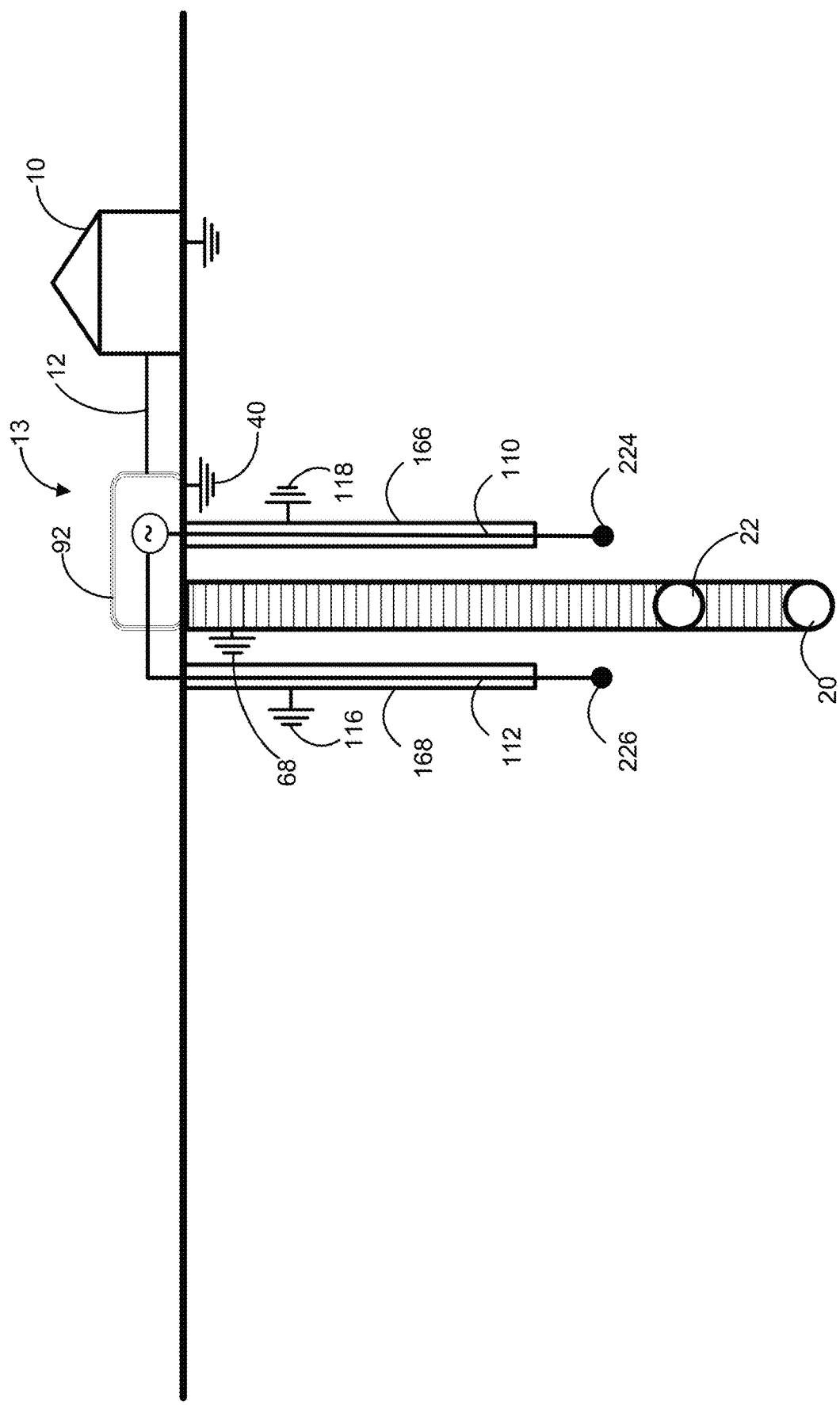

Referring to FIGS. 14 and 15, there is a profile view and a cross-sectional view of an apparatus 13 according to at least one example embodiment. Features common to apparatus 11 and 13 are shown using the same reference numbers. Similar to apparatus 11, apparatus 13 includes only one EM wave generator 92 located above ground, or at the surface. While apparatus 13 is shown as having one EM wave generator 92 located above ground, it will be understood that in some embodiments, apparatus 13 can have two EM wave generators 90 and 92, similar to apparatus 6.

Also similar to apparatus 9, a first high frequency connector 110 can be used as a waveguide for carrying high frequency alternating current from the EM wave generator 92 to transmission line conductor 224 and a second high frequency connector 112 can be used as a waveguide for carrying high frequency alternating current from the EM wave generator 92 to transmission line conductor 226. However, high frequency connectors 110 and 112 are not located within pipes 20 and 22. Each of pipes 20 and 22 are grounded at 68 and 70.

High frequency connectors 110 and 112 and transmission line conductors 224 and 226 can be conductors or cables formed by coiled tubing, other pipe strings, or a plurality of pipe sections as shown in FIGS. 11A to 12B. As shown in FIG. 14, when conductors or cable are used, the high frequency connectors 110 and 112 may be in direct contact with the hydrocarbon formation. While high frequency connectors 110 and 112 are shown in FIG. 14 as being substantially vertical (i.e., perpendicular to the surface), it will be understood that in some embodiments, any one or both of high frequency connectors 110 and 112 or sections thereof can be angled or curved with respect to the surface.

Alternatively, metal casings 166 and 168 may be provided to form non-radiating coaxial transmission lines and to prevent direct contact between the high frequency connectors 110 and 112 and the hydrocarbon formation along the vertical portion of the high frequency connectors 110 and 112. When metal casings 166 and 168 are used, the high frequency connectors 110 and 112 may be routed through the metal casings 166 and 168. Each metal casing 166 and 168 can be electrically grounded 116 and 118 to prevent or limit high frequency alternating current from returning to the surface along the outer surface of metal casings 166 and 168. In some embodiments, a choke can be provided at the distal end of each of the metal casings 166 and 168 to prevent or limit high frequency alternating current from returning to the surface along the outer surface of the metal casings 166 and 168. In some embodiments, metal casings 166 and 168 may be physically and electrically connected to prevent high frequency alternating current from returning to the surface along the outer surface of the casings (shown as casings 160 and 162 in FIG. 25B). In some embodiments, both high frequency connectors 110 and 112 may be routed through a single metal casing (shown in FIG. 24B). In some other embodiments, the single metal casings can be the result of casings 166 and 168 being welded together. In yet other embodiments, casings 166 and 168 can be welded together over a substantial portion of its length. In some cases in which the casings 166 and 168 is welded over a substantial portion of its length, the portion of the casings 166 and 168 not attached may be located at distal ends. In yet other embodiments, an electrical contact may be made between casings 166 and 168 by inserting into the casings 166 and 168 into a pipe of an appropriate size to provide sufficient force to squeeze the two casings together. In some cases, the pipe may further be provisioned to enhance electrical contact via inclusion of additional welded wedges or contact points inside the pipe.

As shown in FIG. 15, when other pipe strings are used, high frequency connectors 110 and 112 and transmission line conductors 224 and 226 can have a smaller diameter than typical of SAGD pipes 20 and 22. Using a smaller diameter can reduce drilling, development, and material costs. The location of the transmission line conductors 224 and 226 can be anywhere with respect to the pipes 20 and 22. That is, the transmission line conductor 224 can be located below, above, or in-between pipes 20 and 22.

In the example shown in FIG. 14, transmission line conductors 224 and 226 are located above pipes 20 and 22. In the example shown in FIG. 15, pipes 20 and 22 may be located above one another and transmission line conductors 224 and 226 can be located on either side of the pipes 20 and 22. The distance between the transmission line conductors 224 and 226 can be any practical distance that permits operation of the dynamic transmission line. In some embodiments, the distance between the transmission line conductors 224 and 226 is in the range of about 1 meter to about 20 meters.

Figure 16:
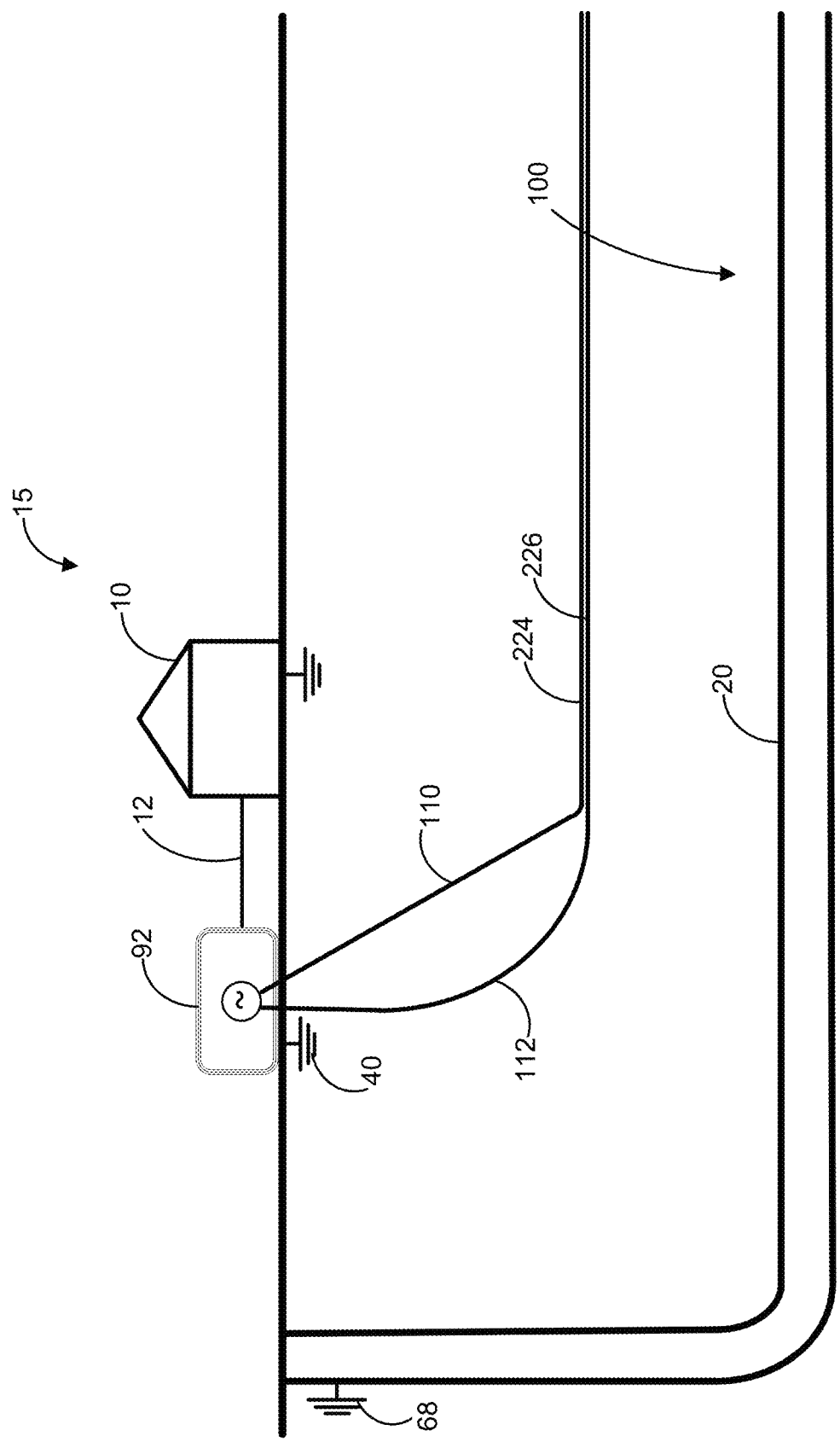
FIGS. 16 and 17 are profile and cross-sectional views of an apparatus for electromagnetic heating of formations according to another embodiment.
Figure 17:
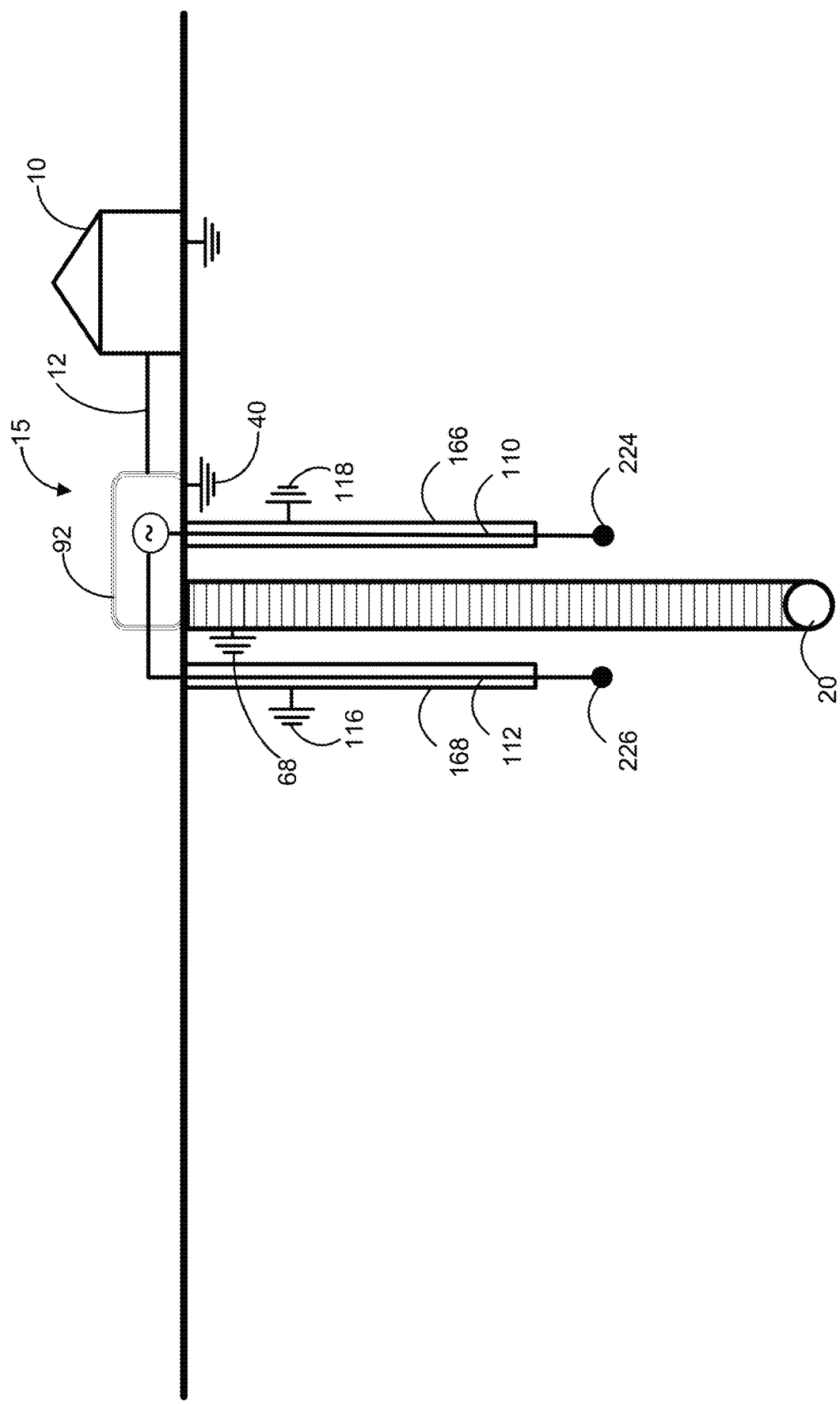

Referring to FIGS. 16 and 17, there is a profile view and a cross-sectional view of an apparatus 15 according to at least one example embodiment. Features common to apparatus 13 and 15 are shown using the same reference numbers. Similar to apparatus 13, apparatus 15 includes only one EM wave generator 92 located above ground, or at the surface. While apparatus 15 is shown as having one EM wave generator 92 located above ground, it will be understood that in some embodiments, apparatus 15 can have two EM wave generators 90 and 92, similar to apparatus 6.

Also similar to apparatus 9, high frequency connectors 110 and 112 can be used as waveguides for carrying high frequency alternating current from the EM wave generator 92 to transmission line conductors 224 and 226. As well, the high frequency connectors 110 and 112 are not located within pipe 20. While high frequency connectors 110 and 112 are respectively shown as being angled and curved in FIG. 16, it will be understood that in some embodiments, any one or both of high frequency connectors 110 and 112, or sections thereof, can be substantially vertical, angled, or curved.

It will be understood that where only two transmission line conductors are described in this description as forming a dynamic transmission line, any number of additional transmission line conductors can be added. As shown in FIGS. 16 and 17, one of the pipe strings of the SAGD well pair can be used to provide a third transmission line conductor with appropriate excitation. For example, pipe 20 may be electrically grounded at 68 to a common ground 40 with the EM wave generator 92. Both pipe strings of the SAGD well pair are not required. While FIGS. 16 and 17 show a third transmission line conductor being provided by the producer pipe 20, in other embodiments, a third transmission line conductor can be provided by the injector pipe 22.

In some embodiments, it is preferable to provide a third transmission line conductor 20 using the producer pipe of a SAGD well pair, which carries oil from production. The injector pipe, which normally provides steam to the SAGD system, is no longer required as the hydrocarbon formation can be heated using EM heating. The location of the transmission line conductors 224 and 226 can be above or parallel to pipe 20. In the example shown in FIG. 16, transmission line conductors 224 and 226 are located above pipe 20. In the example shown in FIG. 17, transmission line conductors 224 and 226 can be located on either side of pipe 20.

As illustrated in FIG. 17, in some embodiments, metal casings 168 and 166 can be physically separated. Each metal casing 166 and 168 can be electrically grounded 116 and 118 to prevent or limit high frequency alternating current from returning to the surface along the outer surface of casings 168 and 166. In some embodiments, a choke can be provided at the distal end of each metal casing 166 and 168 to prevent or limit high frequency alternating current from returning to the surface along the outer surface of the metal casings 166 and 168. In some embodiments, the metal casings 168 and 166 can be physically and electrically connected to prevent high frequency alternating current from returning to the surface along the outer surface of the casings (shown as casings 162 and 160 of FIG. 25B).

Figure 18:
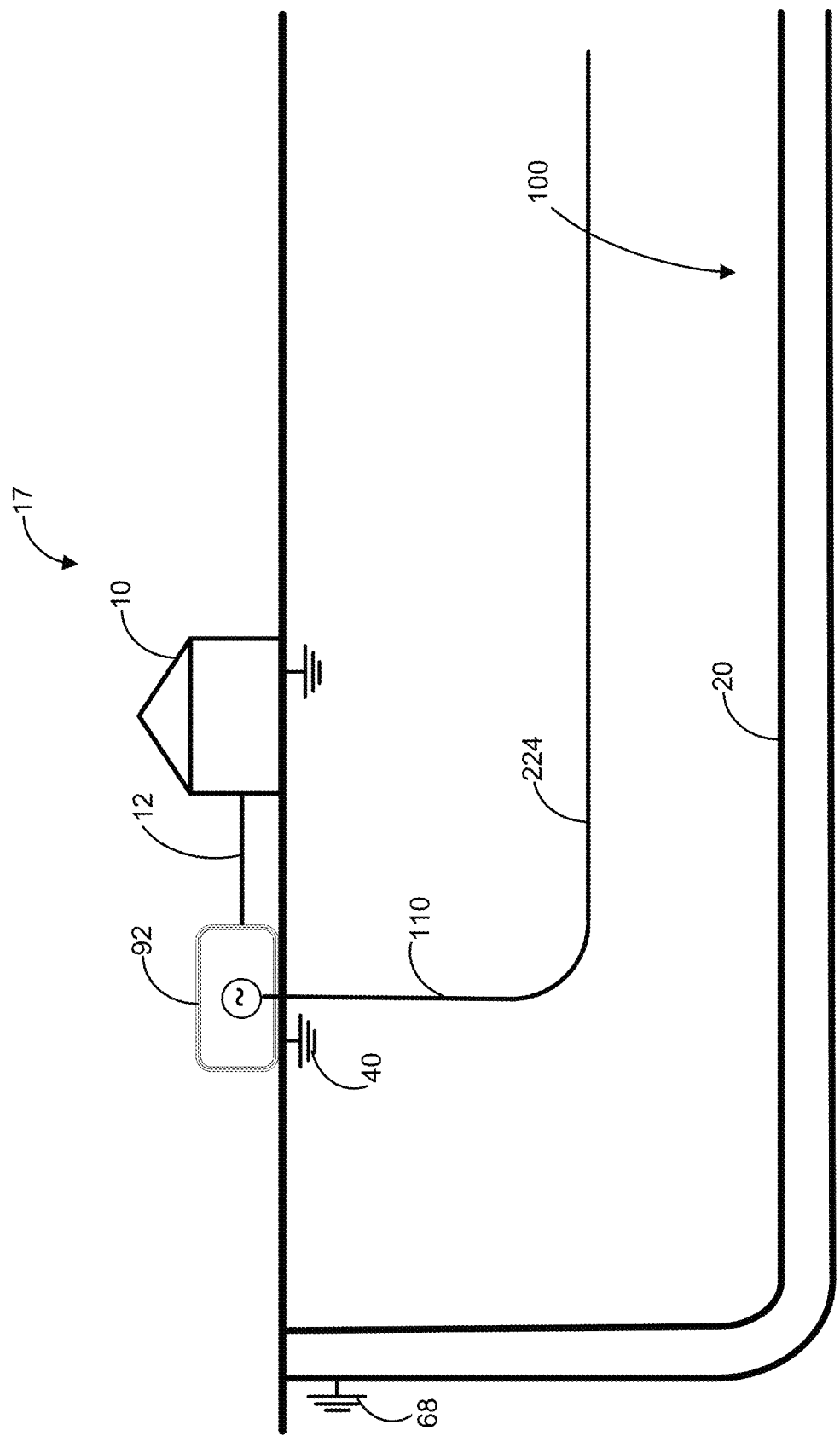
FIGS. 18 and 19 are profile and cross-sectional views of an apparatus for electromagnetic heating of formations according to another embodiment.
Figure 19:
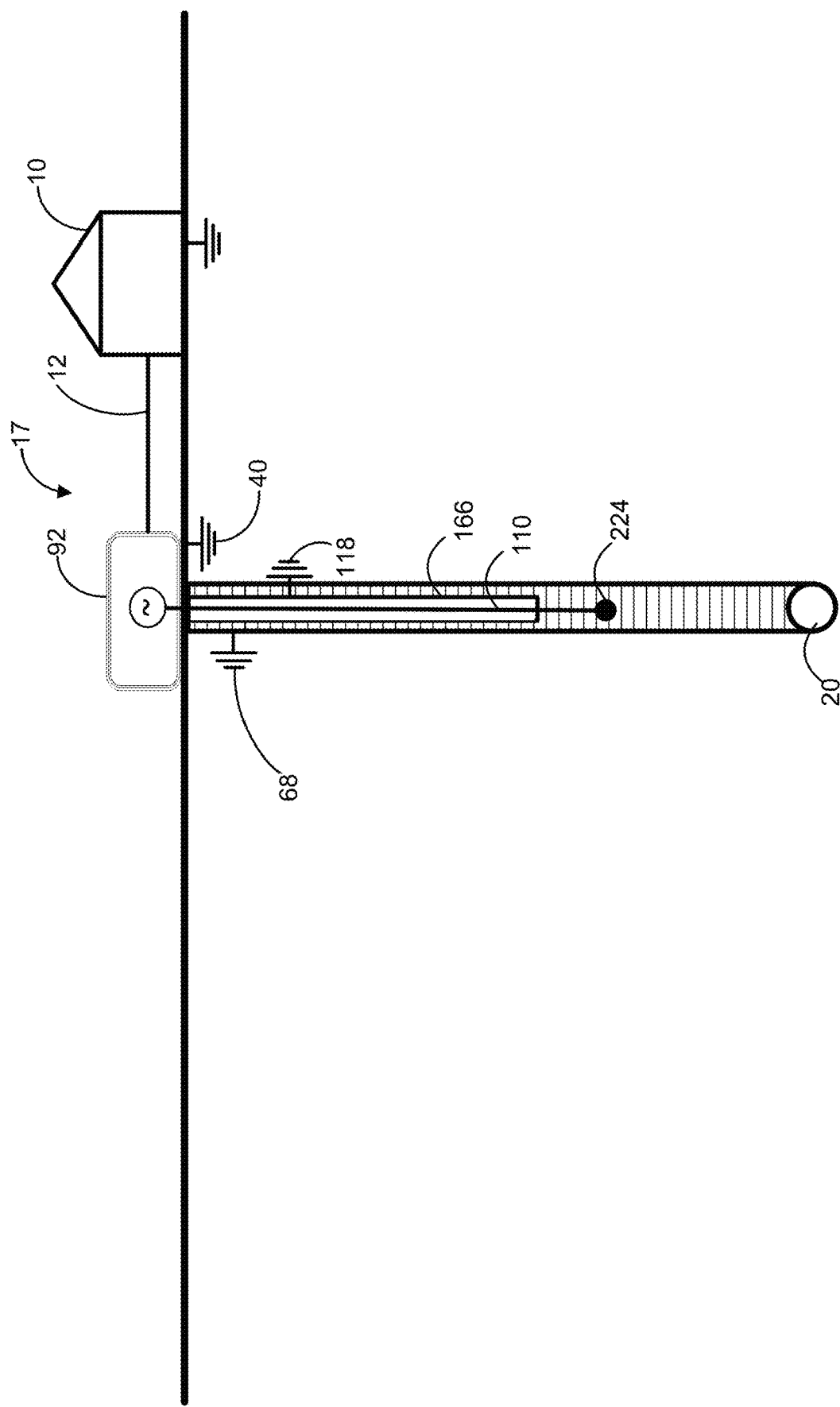

Referring to FIGS. 18 and 19, there is a profile view and a cross-sectional view of an apparatus 17 according to at least one example embodiment. Features common to apparatus 13 and 17 are shown using the same reference numbers. Similar to apparatus 13, apparatus 17 includes only one EM wave generator 92 located above ground, or at the surface. A high frequency connector 110 can be used as a waveguide for carrying high frequency alternating current from the EM wave generator 92 to transmission line conductor 224. As well, the high frequency connector 110 is not located within pipe 20. While high frequency connector 110 is shown in FIG. 18 as being substantially vertical (i.e., perpendicular to the surface), it will be understood that in some embodiments, high frequency connector 110, or sections thereof, can be angled or curved with respect to the surface.

One of the pipe strings of the SAGD well pair can be used to provide a second transmission line conductor with appropriate excitation. For example, pipe 20 may be electrically grounded at 68 to a common ground 40 with the EM wave generator 92. Similar to apparatus 15, apparatus 17 does not require both pipe strings of the SAGD well pair. The standard SAGD injector pipe can be omitted from apparatus 15 and heating of the hydrocarbon formation may be provided by EM heating using apparatus 15 which only includes a producer pipe. The location of the transmission line conductors 224 is typically above pipe 20, as shown in FIGS. 18 and 19. In the example shown in FIG. 19, transmission line conductor 224 can be located adjacent to pipe 20.

Figure 20:
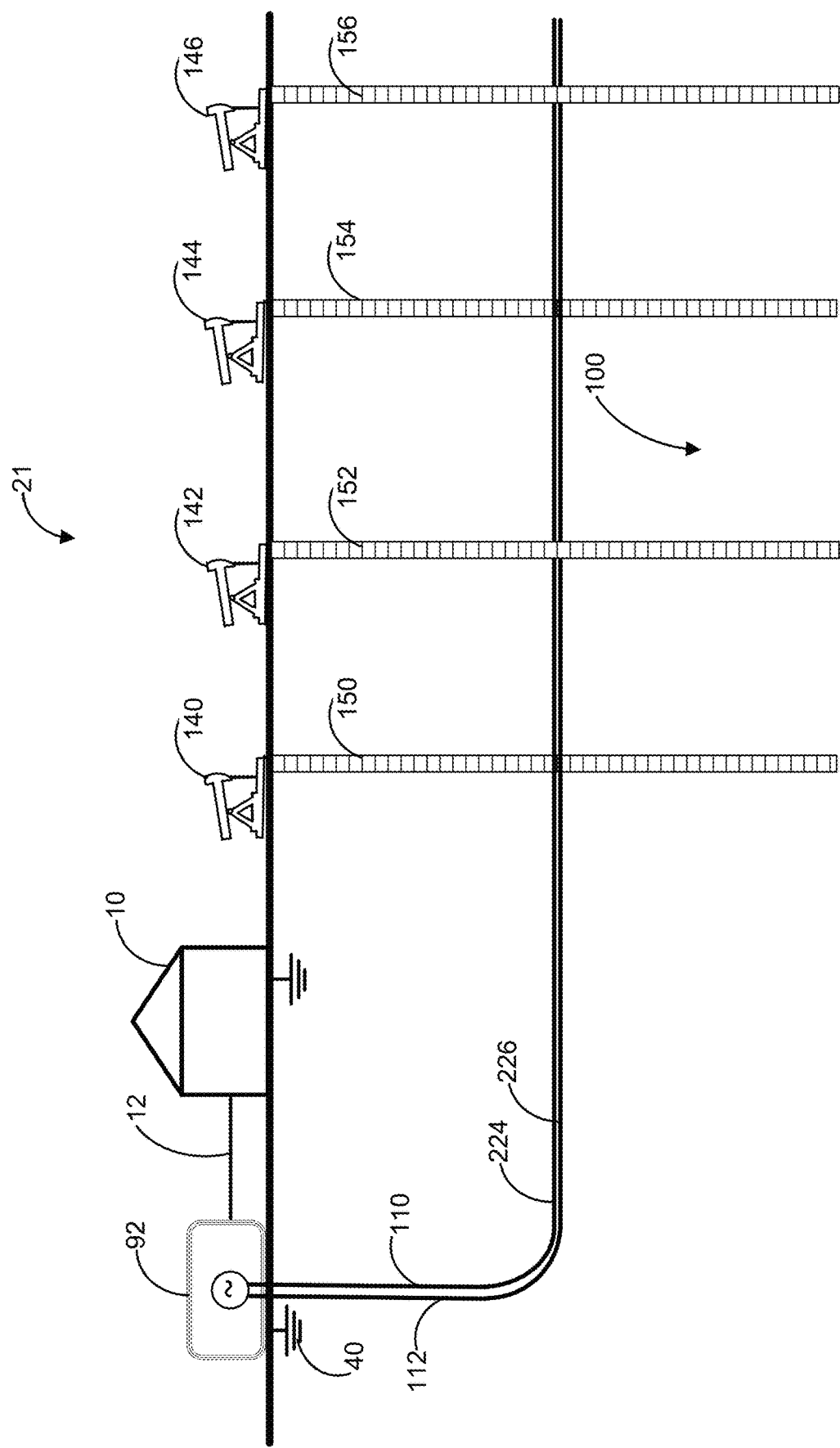
FIGS. 20 and 21 are profile and cross-sectional views of an apparatus for electromagnetic heating of formations according to another embodiment.
Figure 21:
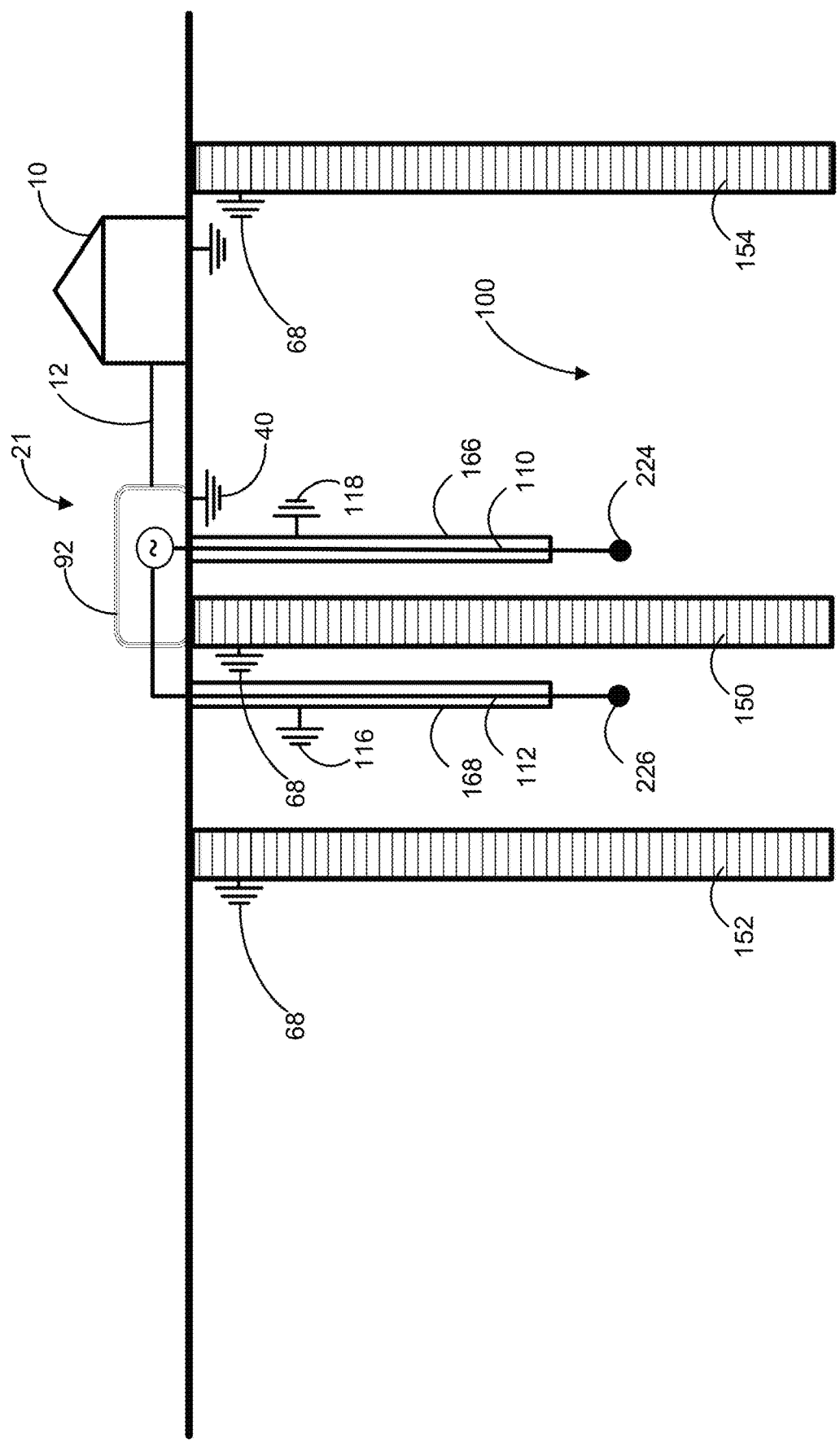

Referring to FIGS. 20 and 21, there is a profile view and a cross-sectional view of an apparatus 21 according to at least one example embodiment. Features common to apparatus 11 and 13 are shown using the same reference numbers. Similar to apparatus 13, apparatus 21 includes only one EM wave generator 92 located above ground, or at the surface. While apparatus 21 is shown as having one EM wave generator 92 located above ground, it will be understood that in some embodiments, apparatus 21 can have two EM wave generators 90 and 92, similar to apparatus 6.

Also similar to apparatus 13, a first high frequency connector 110 can be used as a waveguide for carrying high frequency alternating current from the EM wave generator 92 to transmission line conductor 224 and a second high frequency connector 112 can be used as a waveguide for carrying high frequency alternating current from the EM wave generator 92 to transmission line conductor 226. While high frequency connectors 110 and 112 are shown in FIG. 20 as being substantially vertical (i.e., perpendicular to the surface), it will be understood that in some embodiments, any one or both of high frequency connectors 110 and 112, or sections thereof, can be angled or curved with respect to the surface.

As shown in FIG. 20, vertical pipes 150, 152, 154, and 156 can be used instead of horizontal pipes 20 and 22 for conveying fluids, namely bitumen and heavy oil that have been mobilized by the application of heat. A pump jack 140, 142, 144, and 146 can be provided at each vertical pipe 150, 152, 154, and 156 to lift liquid out of the well.

Vertical pipes may be used for, but is not limited to, mine-face accessible hydrocarbon formations, formations that are too deep for mining but too shallow for steam operations such as SAGD or cyclic steam stimulation (CSS), or formations that are partially depleted and in need of further simulation. Mine-face accessible hydrocarbon formations can have a sloping mine wall that is difficult to deplete using SAGD. Furthermore, mine-face accessible hydrocarbon formations may not have the appropriate geology, such as cap rock to allow for the steam injection. Formations may be partially depleted because of limitations in technology at the time oil was initially extracted from the hydrocarbon formation.

In some embodiments, existing vertical pipes can be used without further modification. Alternatively, vertical pipes can be deployed along the length of formation 100. In some embodiments, the vertical pipes can have an electrical ground 68.

In the example shown in FIG. 21, vertical pipes do not need to be aligned along a single axis (i.e., a straight line). The transmission line conductors 224 and 226 are located symmetrically on either side of vertical pipe 150 but only on one side (i.e., offset) of vertical pipes 152 and 154. When transmission line conductors are offset from the vertical pipes 152 and 154, a common electrical ground for the vertical pipe 68 and the transmission line conductors 116 and 118 may be required.

The vertical pipes can be located at any distance from the transmission line conductors 224 and 226 that is practical for the hydrocarbon formation 100 to be heated by the interaction with the electromagnetic field. In some embodiments, the vertical pipes can be located within about 100 meters from at least one of the transmission line conductors 224 and 226. When the vertical pipes are located at a far distance from the transmission line conductors 224 and 226, the heating process takes more time. Preferably, the vertical pipes can be located within about 30 meters from at least one of the transmission line conductors 224 and 226. Further preferably, the vertical pipes can be located within about 5 to 20 meters from at least one of the transmission line conductors 224 and 226.

In the example shown in FIG. 21, transmission line conductors 224 and 226 are in approximately horizontal arrangement with one another. That is, transmission line conductors 224 and 226 are located at approximately the same depth from the surface. In some embodiments, transmission line conductors can be in approximately vertical arrangement with one another. That is, transmission line conductors 224 and 226 can be located at different depths. Also shown in FIG. 21, metal casings 166 and 168 may be provided to form non-radiating coaxial transmission lines to prevent direct contact between the high frequency connectors 110 and 112 and the hydrocarbon formation along the vertical portion of the high frequency connectors 110 and 112. While each metal casing 166 and 168 are depicted as being separated by the hydrocarbon formations, in some embodiments, the casings carrying high frequency connectors 110 and 112 can be joined together (e.g. via welding or some other known joining method) in a manner similar to casings 160 and 162 of FIGS. 23A, 24A and 24B.

Similar to the distance between the vertical pipes to the transmission line conductors 224 and 226, the transmission line conductors 224 and 226 can be located at any distance from one another that is practical for the hydrocarbon formation 100 to be heated by the interaction with the electromagnetic field. In some embodiments, the transmission line conductors 224 and 226 can be located within about 100 meters from one another. When the transmission line conductors 224 and 226 are located at a far distance from one another, the heating process takes more time. Preferably, the transmission line conductors 224 and 226 can be located within about 30 meters from one another. Further preferably, the transmission line conductors 224 and 226 can be located within about 3 to 25 meters from one another.

In addition, the distance between the transmission line conductors 224 and 226 can vary along the dynamic transmission line. A variation in the distance can be provided to increase the heating time in particular areas where hydrocarbon deposits are known, or to decrease the heating time in particular areas where hydrocarbon deposits are uncertain. A variation in the distance can also be required due to difficulties in the deployment process of maintaining a uniform distance.

Figure 22:
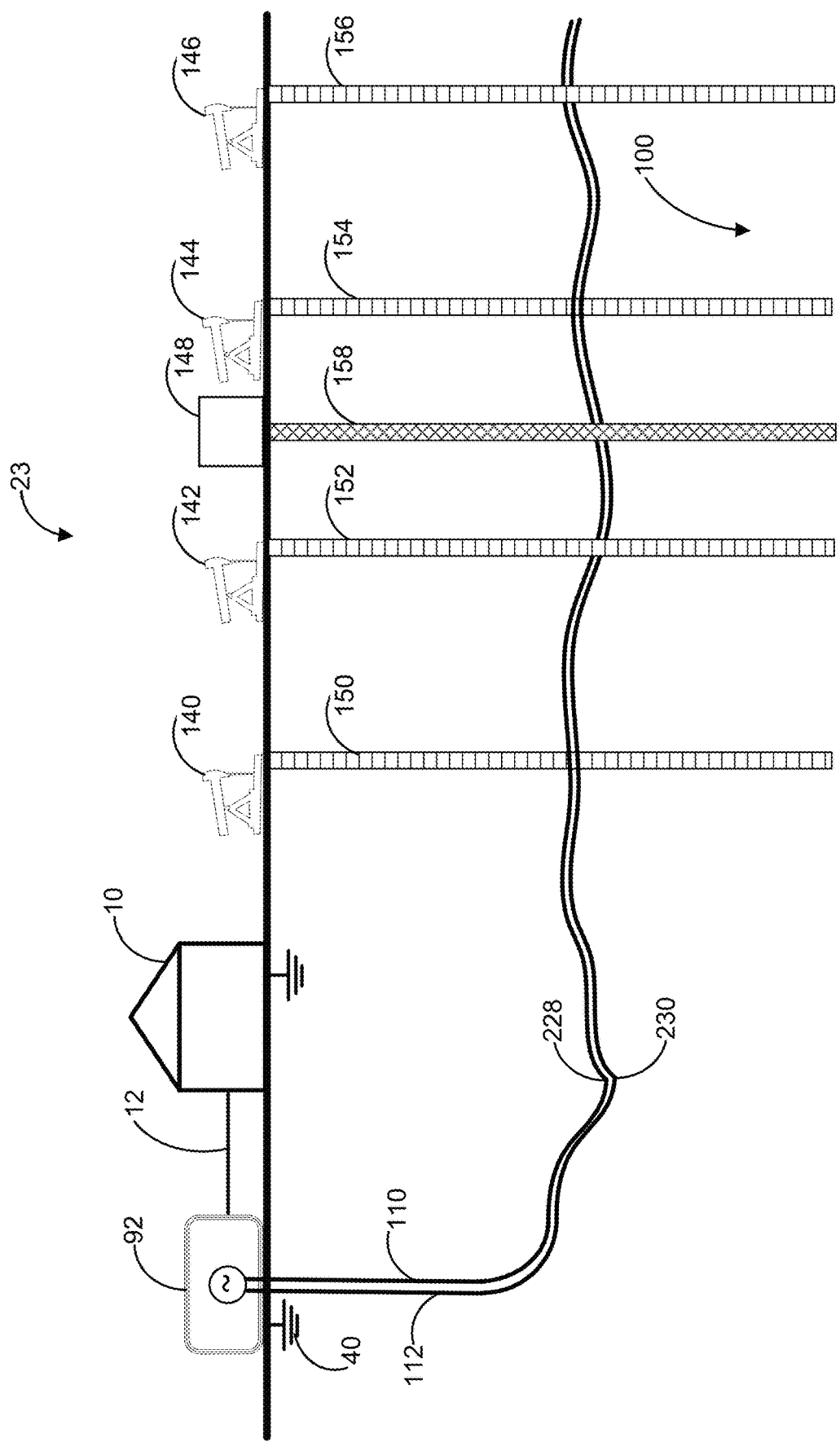
FIG. 22 is a profile view of an apparatus for electromagnetic heating of formations according to another embodiment.

Referring to FIG. 22, there is a profile view of an apparatus 23 according to at least one example embodiment. Features common to apparatus 21 are shown using the same reference numbers. As shown in FIG. 22, a first high frequency connector 110 can be used as a waveguide for carrying high frequency alternating current from the EM wave generator 92 to transmission line conductor 228 and a second high frequency connector 112 can be used as a waveguide for carrying high frequency alternating current from the EM wave generator 92 to transmission line conductor 230. While high frequency connectors 110 and 112 are shown in FIG. 22 as being substantially vertical (i.e., perpendicular to the surface), it will be understood that in some embodiments, any one or both of high frequency connectors 110 and 112, or sections thereof, can be angled or curved with respect to the surface.

In contrast to transmission line conductors 224 and 226 of apparatus 21, which have approximately consistent depths along the hydrocarbon formation 100, transmission line conductors 228 and 230 can have varying depths along the hydrocarbon formation 100. Varying depths along the hydrocarbon formation 100 can be beneficial to enhance production. For example, the transmission line conductors 228 and 230 may be positioned higher (i.e., less depth) between the vertical pipe and lower (i.e., greater depth) around the wells to take advantage of gravity or as a result of difficulties in the deployment process of maintaining a particular depth.

As shown in FIG. 22, at least one additional injecting well 158 can be provided to inject gaseous or liquid substances 148 into the hydrocarbon formation to enhance production. Although not shown, the transmission line conductors 228 and 230 can also be used to inject gaseous or liquid substances 148 into the hydrocarbon formation.

Figure 23A:
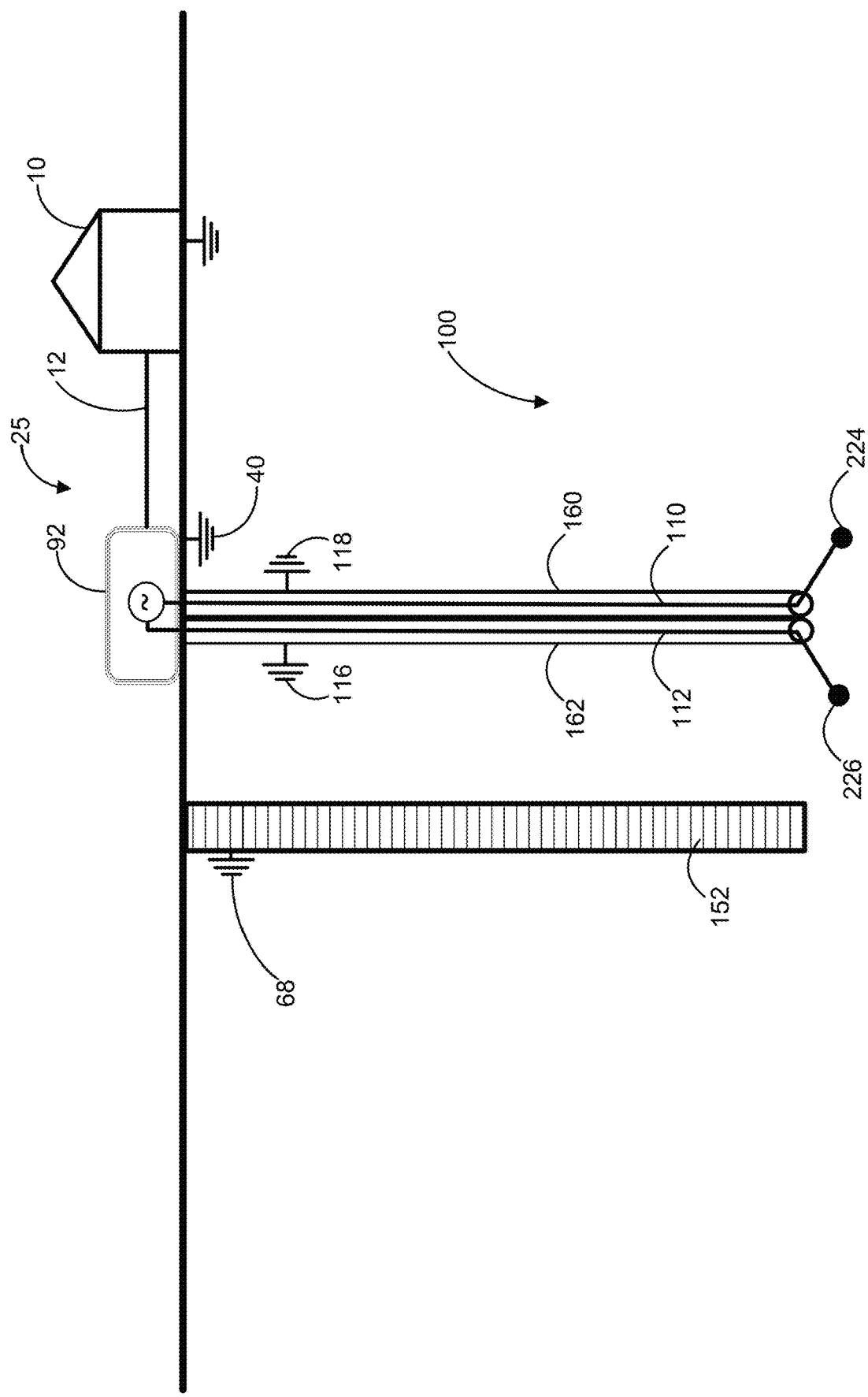
FIG. 23A is a cross-sectional view of an apparatus for electromagnetic heating of formations according to another embodiment.

Referring to FIG. 23A, there is a cross-sectional view of an apparatus 25 according to at least one example embodiment. Features common to apparatus 13 and 23 are shown using the same reference numbers. A first high frequency connector 110 can be used as a waveguide for carrying high frequency alternating current from the EM wave generator 92 to transmission line conductor 224 and a second high frequency connector 112 can be used as a waveguide for carrying high frequency alternating current from the EM wave generator 92 to transmission line conductor 226. As set out above, the high frequency connectors 110 and 112 can be routed through metal casings 160 and 162 to form non-radiating coaxial transmission lines and prevent direct contact between the high frequency connectors 110 and 112. Each metal casing can be electrically grounded 116 and 118 to prevent high frequency alternating current from returning to the surface along the outer surface of metal casings 166 and 168. Any one of high frequency connectors 110 and 112, or sections thereof, can be substantially vertical (i.e., perpendicular to the surface), angled or curved with respect to the surface (not shown). In some embodiment, the substantially vertically oriented high frequency connectors 110 and 112 can similarly be used in association with horizontally oriented producers (not shown).

In contrast to the metal casings 166 and 168 of FIG. 15, the metal casings 160 and 162 of FIG. 23A can be in electrical contact with one another to provide a balun. Although the electrical contact shown in FIG. 23A is continuous along the length of the high frequency connectors 110 and 112, it can also be a single point of contact. In some embodiments, the electrical contact can be intermittent with at least one point of contact near each end of the high frequency connectors 110 and 112 to form a closed circuit. Electrical contact between metal casings 160 and 162 can be provided by any appropriate means, including but not limited to, welding or conductive connectors between the metal casings, including metallic rings.

Figure 25B:
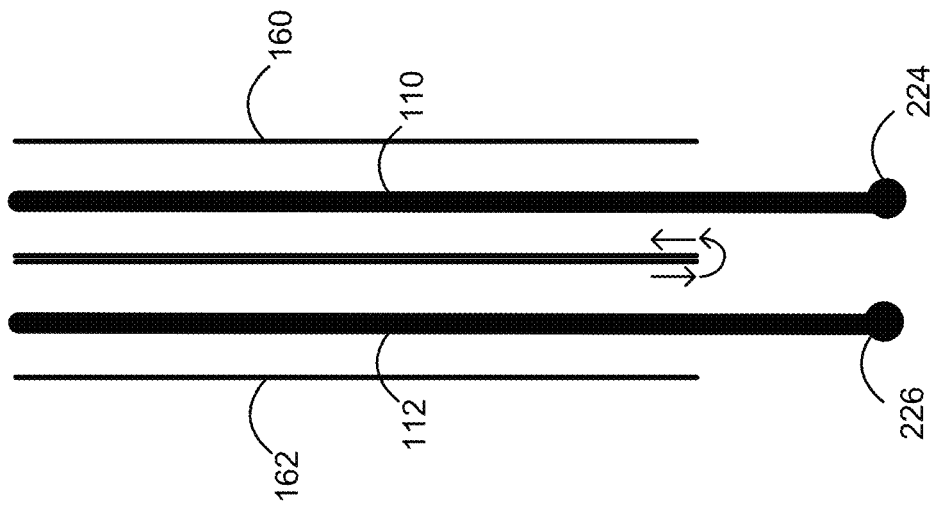
FIG. 25B is a magnified cross-sectional view of a portion of an apparatus for electromagnetic heating of formations according to the embodiments shown in FIGS. 23A, 23B, and 24.
Figure 25A:
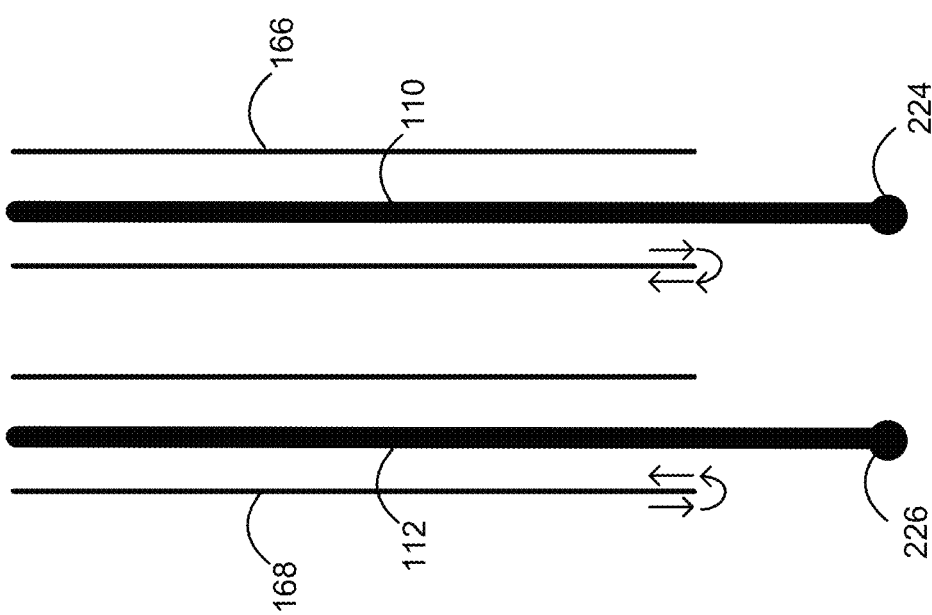
FIG. 25A is a magnified cross-sectional view of a portion of an apparatus for electromagnetic heating of formations according to the embodiments shown in FIGS. 15, 17, and 21.

Similar to electrical short 46 between metal casing 28 and 30 of apparatus 1 (as shown in FIG. 1), a balun provided by metal casings 160 and 162 in electrical contact with one another can eliminate the need for chokes. Referring to FIGS. 25A and 25B, there is a magnified cross-sectional view of a pair of metal casings 166 and 168 that are not in contact with one another, and a pair of metal casings 160 and 162 that are in contact with one another. As shown in FIG. 25A, when metal casings 166 and 168 are not in contact with one another, current on the inside surfaces of the metal casings 166 and 168 can, at the distal end of the metal casing, flow over to the outside surfaces of the metal casings 166 and 168. However, as shown in FIG. 25B, when metal casings 160 and 162 are in contact with one another, current on the inside surfaces of the metal casings 160 and 162 can flow to one another, eliminating current on the outside surface of the metal casings 160 and 162. Thus, a balun provided by metal casings 160 and 162 in electrical contact with one another can be more effective than the electrical short 46 of apparatus 1.

Figure 23B:
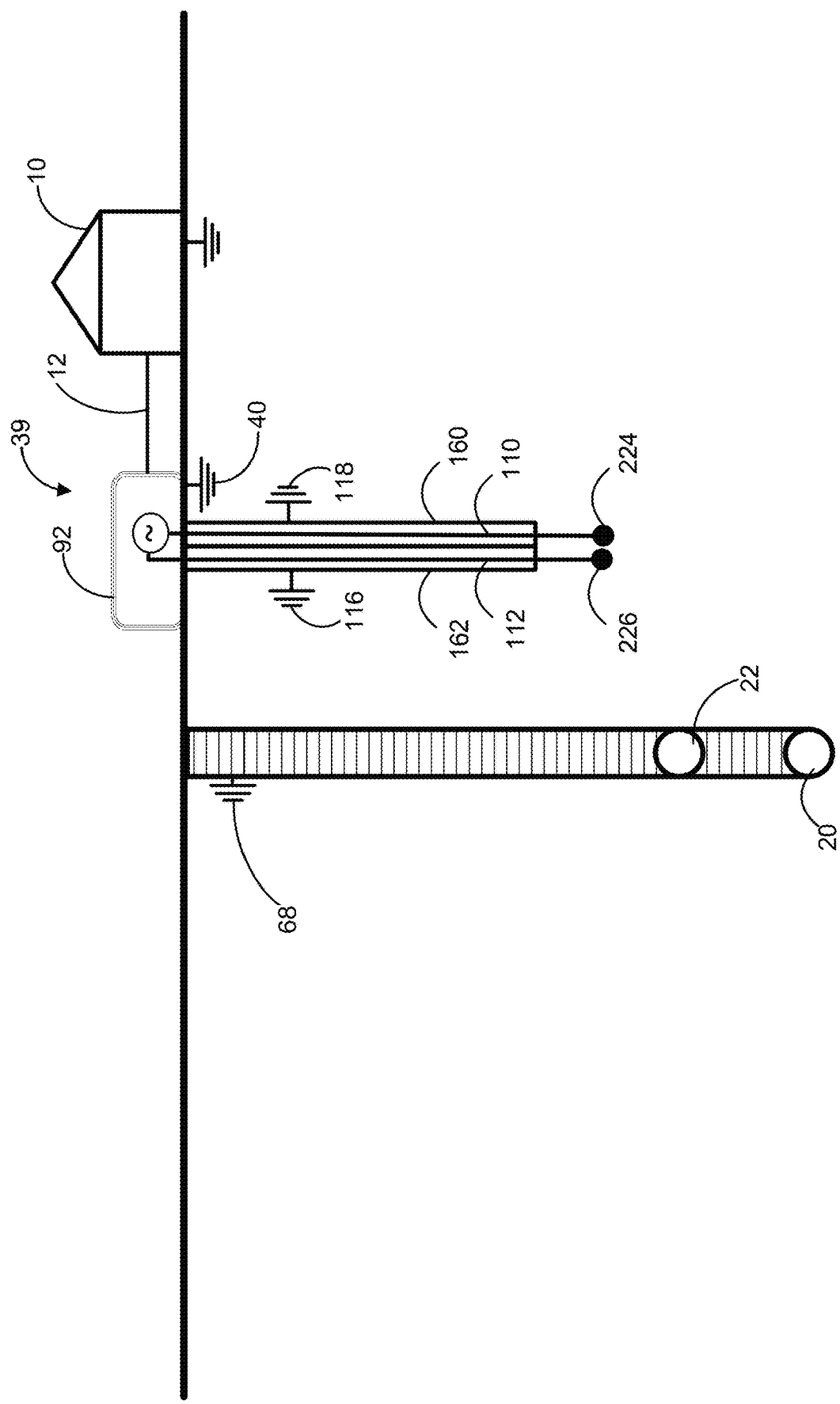
FIG. 23B is a cross-sectional view of an apparatus for electromagnetic heating of formations according to another embodiment.

Referring to FIG. 23B, there is a cross-sectional view of an apparatus 39 according to at least one example embodiment. Features common to apparatus 13 and 25 are shown using the same reference numbers. Similar to apparatus 25, high frequency connectors 110 and 112 in apparatus 39 can be routed through metal casings 160 and 162, which are in electrical contact with one another to provide a balun. Similar to apparatus 13, apparatus 39 is used with a pair of pipe strings that are substantially horizontal. In some embodiments, producer 20 may, in other cross-sectional views of apparatus 39, be located below and substantially symmetrically positioned between transmission line conductors 226 and 227. The transmission line conductors 226 and 227 in some cases may be horizontally separated by a distance between 1 meter and 25 meters. In some other embodiments, injector 22 may be excluded in apparatus 39.

Figure 24A:
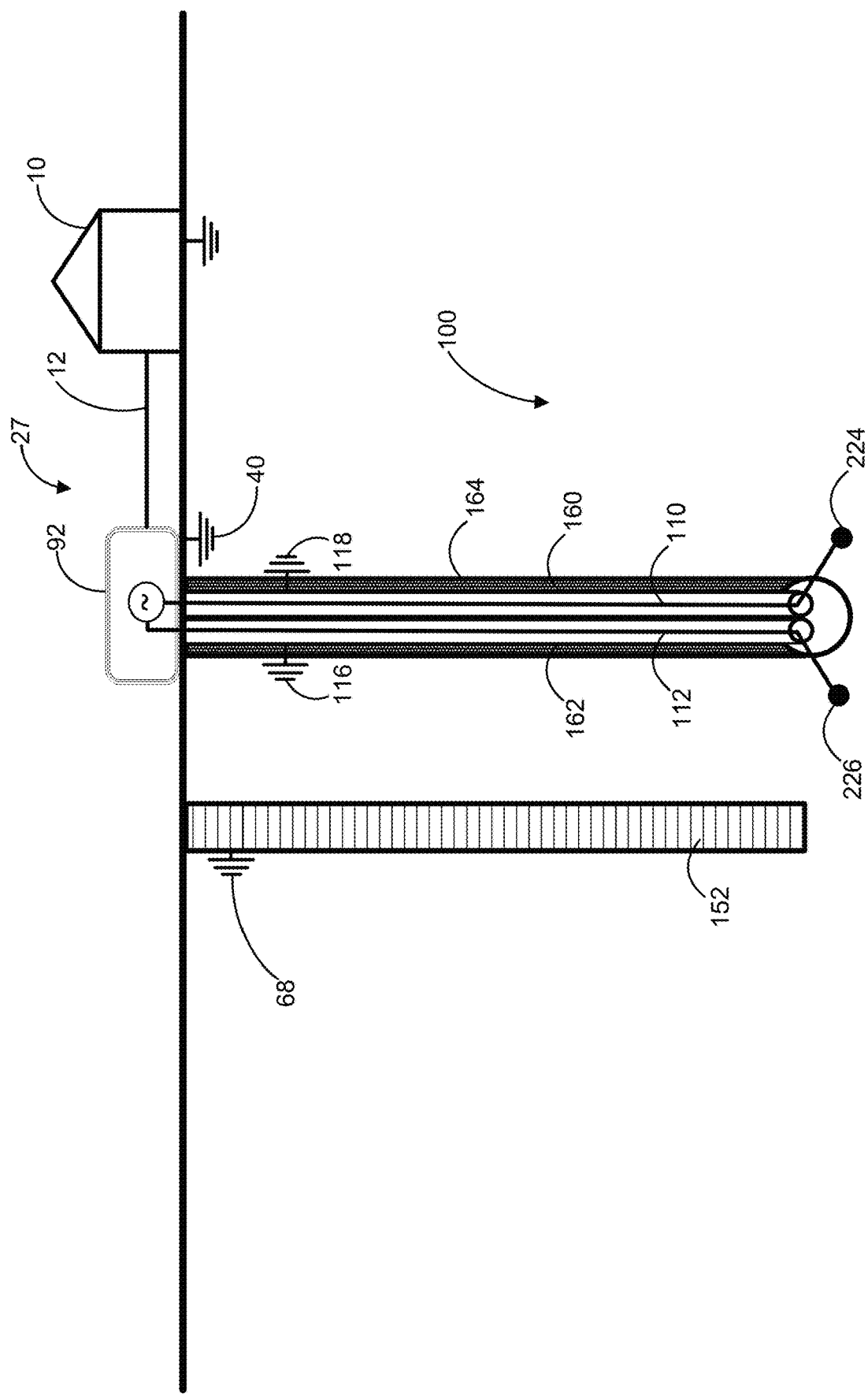
FIG. 24A is a cross-sectional view of an apparatus for electromagnetic heating of formations according to another embodiment.

Referring to FIG. 24A, there is a cross-sectional view of an apparatus 27 according to at least one example embodiment. Features common to apparatus 25 are shown using the same reference numbers. Metal casings 160 and 162 can be routed through an additional metal casing 164 to prevent direct contact with the hydrocarbon formation 100. In some embodiments, metal casings 160 and 162 can be routed through separate additional metal casings (shown in FIGS. 45 and 47). In some embodiments, the substantially vertically oriented high frequency connectors 110 and 112 can similarly be used in association with horizontally oriented producers (not shown).

Referring to FIG. 24B, there is a cross-sectional view of an apparatus 47 according to at least one example embodiment. Features common to apparatus 27 are shown using the same reference numbers. High frequency connectors 110 and 112 can be routed through a single metal casing 164 to prevent direct contact between the high frequency connectors 110 and 112 and the hydrocarbon formation 100. Metal casing 164 can be electrically grounded 242 to prevent high frequency alternating current from returning to the surface. In some embodiments, the substantially vertically oriented high frequency connectors 110 and 112 can similarly be used in association with horizontally oriented producers (not shown).

A shielded two-wire transmission line is formed when high frequency connectors 110 and 112 are routed through a single metal casing 164 as shown in FIG. 24B. The EM wave power can be carried in the annular space within the single metal casing 164 and between the high frequency connectors 110 and 112. However, the power capacity of the annular space can depend on the geometry and materials within the annular space. A dielectric breakdown can occur when the shielded two-wire transmission line is operated at voltages that exceed the dielectric breakdown voltage of the annular space between the high frequency connectors 110 and 112 and the metal casing 164. In some embodiments, the annular space can be filled with dielectric material 244 having a high dielectric breakdown voltage to allow the shielded two-wire transmission line to operate at higher voltages, thus increasing the power capacity of the annular space. It will be understood that for increased power capacity, such dielectric material 244 can be provided in the annulus of any waveguide formed by high frequency connectors 110 and 112 routed through metal casings 160, 162, 166, or 168 disclosed herein.

Any appropriate dielectric material 244 having a high dielectric breakdown voltage can be used. The dielectric material 244 can be gas, liquid, or solid including powders, or a combination of gas, liquid, and/or solid. However, an apparatus 47 having a gaseous dielectric material 244 can be simpler to operate than an apparatus 47 having a liquid dielectric material 244 due to the challenges of filling the annular space with a liquid and maintaining purity of the liquid. An example of a liquid dielectric material 244 is hydrocarbons.

In some embodiments wherein the dielectric material 244 is a gas, the gas can be pressurized to further provide a higher dielectric strength than that of gas at atmospheric pressure. As well, gas can have arc-quenching properties, particularly when it is mixed with electronegative gases. For example, gases having arc-quenching properties include carbon dioxide ($CO_2$) and nitrogen ($N_2$). Electronegative gases can absorb free electrons, thereby extinguishing current carried through an arc. Examples of electronegative gases include, but are not limited to, Sulfur hexafluoride ($SF_6$), 1,1,1,2-Tetrafluoroethane ($C_2H_2F_4$), Octafluorocyclobutane ($C_4F_8$), a mixture of any one of $SF_6$, $C_2H_2F_4$, and $O_4F_8$. Electronegative gases can also be used on their own, without being mixed with other gases such as nitrogen and/or carbon dioxide. The gas used in the annulus can also be a mixture of fluoroketone ($C_5F_{10}O$), oxygen ($O_2$), and one of $CO_2$ or $N_2$.

As shown in FIG. 24B, spacers or centralizers 174 can be provided along the metal casing 164 to prevent direct contact between the high frequency connectors 110 and 112 with metal casing 164 and to prevent or limit appreciable movement of high frequency connectors 110 and 112 from designated locations.

Furthermore, spacers or centralizers 174 can be formed of materials having high thermal conductivity to act as a thermal bridge, or a heat spreader for the high frequency connectors 110 and 112. Any appropriate material having a thermal conductivity between 0.5 and 2000 Watts per meter Kelvin (W/m·K) may be used. Examples of materials having high thermal conductivity include ceramics (e.g., alumina and zirconia), reinforced ceramics, and a combination of different ceramics. As well, spacers or centralizers 174 can be formed of high resistivity carbides. High frequency connectors 110 and 112 can become very hot as they carry high frequency alternating current from the EM wave generator 92 to transmission line conductors 224 and 226. Such heat is generally not dissipated by the annular space, especially when the annular space is filled with a non-circulating gaseous dielectric material 244 having low thermal conductivity. Even if the annular space is filled with circulating gaseous dielectric material 244 having low thermal conductivity, circulation of the gaseous dielectric material 244 must be provided at a sufficient volume, temperature, and/or or speed to maintain the temperature of the high frequency connectors 110 and 112 at appropriate levels.

Furthermore, spacers or centralizers 174 formed of material having high thermal conductivity can lower the temperature of the high frequency connectors 110 and 112 by conducting heat from the high frequency connectors 110 and 112 to the metal casing 164. In turn, the metal casing can dissipate the heat.

Apparatus 47 can include a seal 184 at a distal end of the metal casing 164 to prevent fluids from entering the coaxial transmission line formed by the high frequency connectors 110 and 112 and the metal casings 164. Seal 184 can be a dielectric shoe joint or a packer. Furthermore, seal 184 can include a balancing and/or a matching network to prevent current on the interior of the metal casings 166 and 168 from flowing to the exterior of the metal casings 166 and 168, and/or to match the impedance in the system thus ensuring that the power flows to the transmission line conductors 224 and 226.

Figure 26:
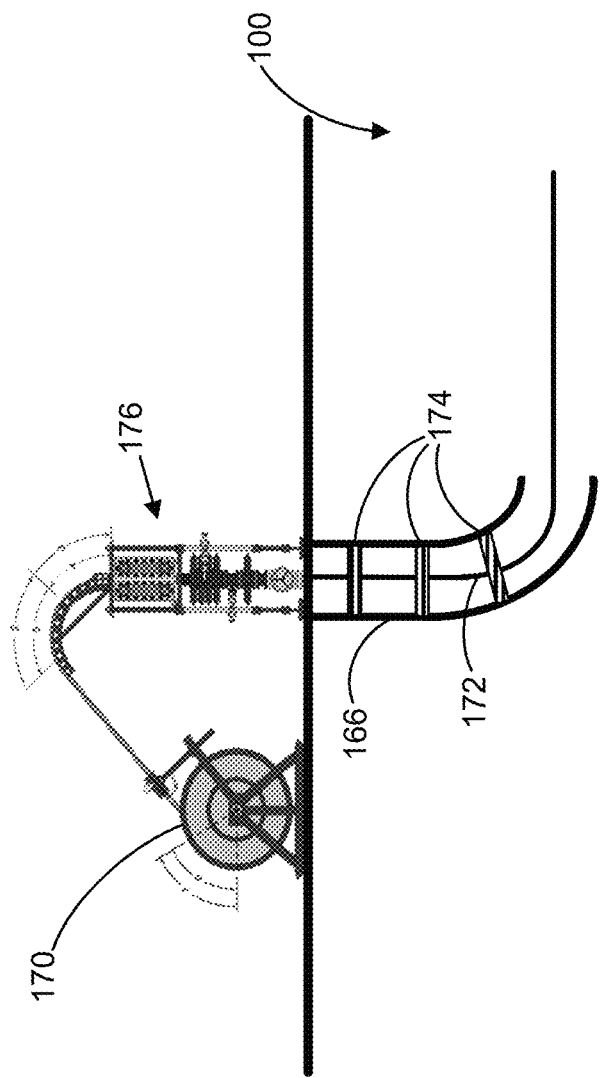
FIG. 26 is a profile view of the deployment of coiled tubing for an apparatus for electromagnetic heating of formations according to at least one embodiment.

Referring to FIG. 26, there is a profile view of the deployment of coiled tubing for an apparatus for electromagnetic heating of formations according to at least one embodiment. As set out above, high frequency connectors 110 and 112 and transmission line conductors 224 and 226 can be in the form of coiled tubing 172, as shown in FIG. 26. Coiled tubing 172 is a very long metal pipe, supplied on a large spool 170. A coiled tubing injector head 176 can be used to dispense coiled tubing 172 from spool 170.

As a high frequency connector, coiled tubing 172 is routed through metal casing 166. Similar to apparatus 47, spacers or centralizers 174 can be provided along the routing to mechanically and electrically isolate the coiled tubing 172 from the metal casing 166.

Coiled tubing 172 is typically made of steel, which is an inferior electrical conductor compared to other materials such as copper and aluminum. In some embodiments, coiled tubing 172 can be modified. More specifically, cladding can be provided along the outer surface of the coiled tubing 172 to reduce electrical power losses. The term "cladding", as used herein, broadly refers to one or more layers of highly conductive material provided by cladding, electroplating, or any other appropriate means. Cladding may cover a portion of or the entire coiled tubing 172. Cladding may be highly conductive metal with low magnetic permeability. Any appropriate material may be used to provide cladding. For example, cladding may be copper or aluminum.

In addition, an insulating dielectric coating can be applied to the surface of the coiled tubing or the cladding. The insulating dielectric coating can prevent the hydrocarbon formation of a carbon path between the high frequency connector and the metal casing, that is, between inner and outer conductors of the coaxial transmission line, in the event of a partial or full dielectric breakdown in the coaxial transmission line. A dielectric breakdown can occur when the coaxial transmission line is operated at voltages that exceed the dielectric breakdown voltage of the insulation between the inner and outer conductors. In some embodiments, gases or liquids with a high dielectric breakdown voltage can be used as insulation between the inner and outer conductors to allow the coaxial transmission line to operate at higher voltages. For example, hydrocarbons or mixtures of electronegative gases can provide a higher dielectric breakdown voltage as set out above.

Similar to cladding, insulating dielectric coating may cover a portion of or the entire coiled tubing 172. In some embodiments, insulating dielectric coating can be applied to a select portion or the entire length to achieve a predetermined impedance or temperature on the surface of the coiled tubing 172. The insulating dielectric coating can be a dielectric paint or a wrapping tape. Any appropriate material may be used to provide the insulating dielectric coating. For example, wrapping tape may be formed of Mylar.

Whether used as high frequency connectors or as transmission line conductors, the interior of coiled tubing 172 is not used for the transmission of RF or AC/DC power. In some embodiments, the interior of coiled tubing 172 can be utilized for other purposes. For example, sensors can be distributed along the transmission line and within coiled tubing 172 for monitoring conditions including, but not limited to temperature, pressure, petro-physical, and steam properties.

In another example, fluids can be conveyed through the interior of the coiled tubing 172. For example, fluids can serve as coolants in critical sections of the transmission line. Fluids can also fill or circulate the interior of the coiled tubing 172 to purge the transmission line and increase the safety of the coiled tubing 172. Furthermore, portions of, or the entire coiled tubing 172 can be a slotted line so that fluids conveyed in the interior of the coiled tubing 172 can be injected into the hydrocarbon formation 100 to enhance hydrocarbon production or to establish particular properties of the transmission line. For example, in some cases, gas injection through the coiled tubing 172 can increase the pressure of the transmission line and/or maintain control of the temperature of the coiled tubing 172

Figure 27:
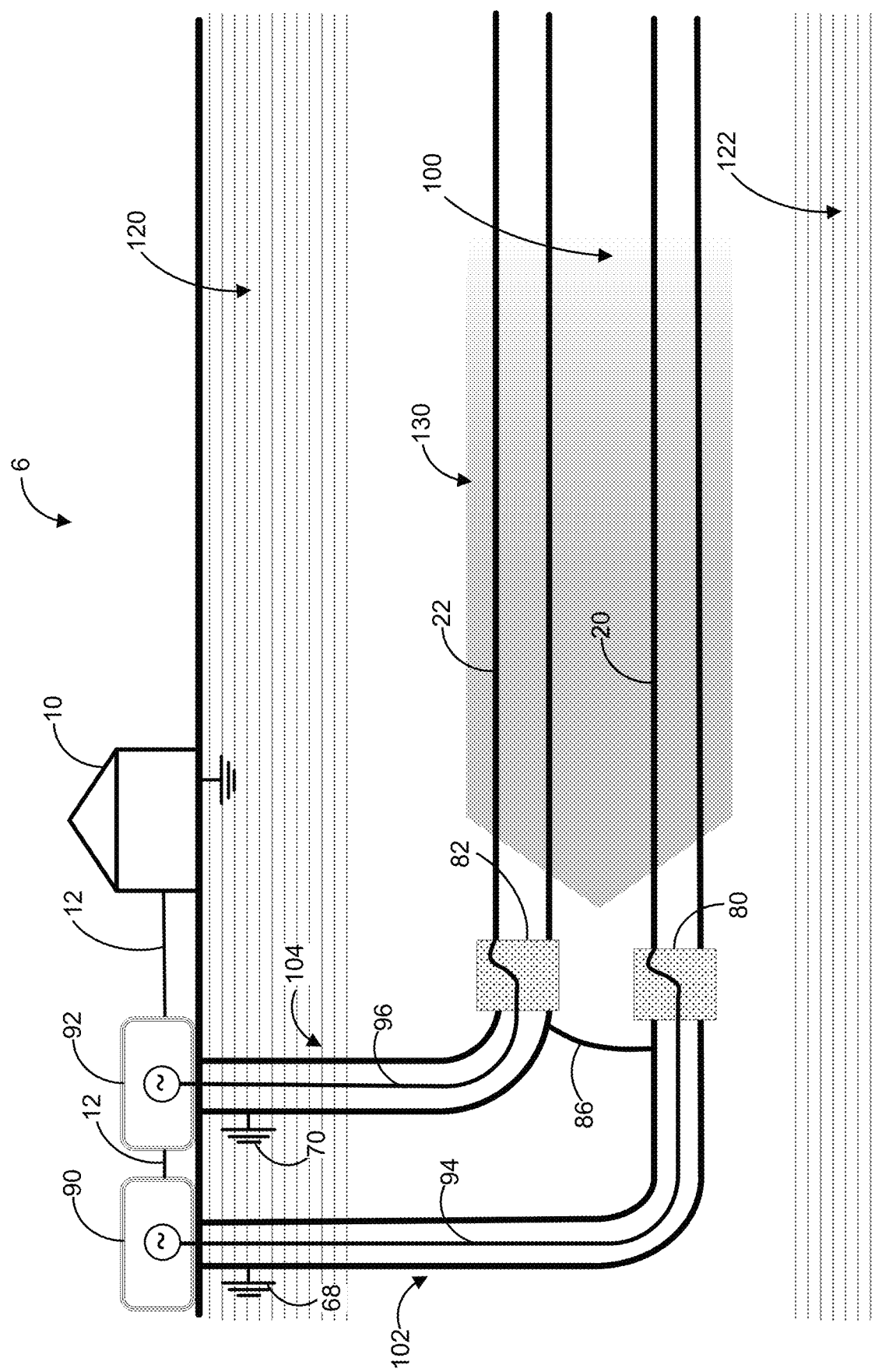
FIG. 27 is a profile view of an apparatus with exposed transmission line conductors operating as an open transmission line according to at least one example embodiment.
Figure 28:
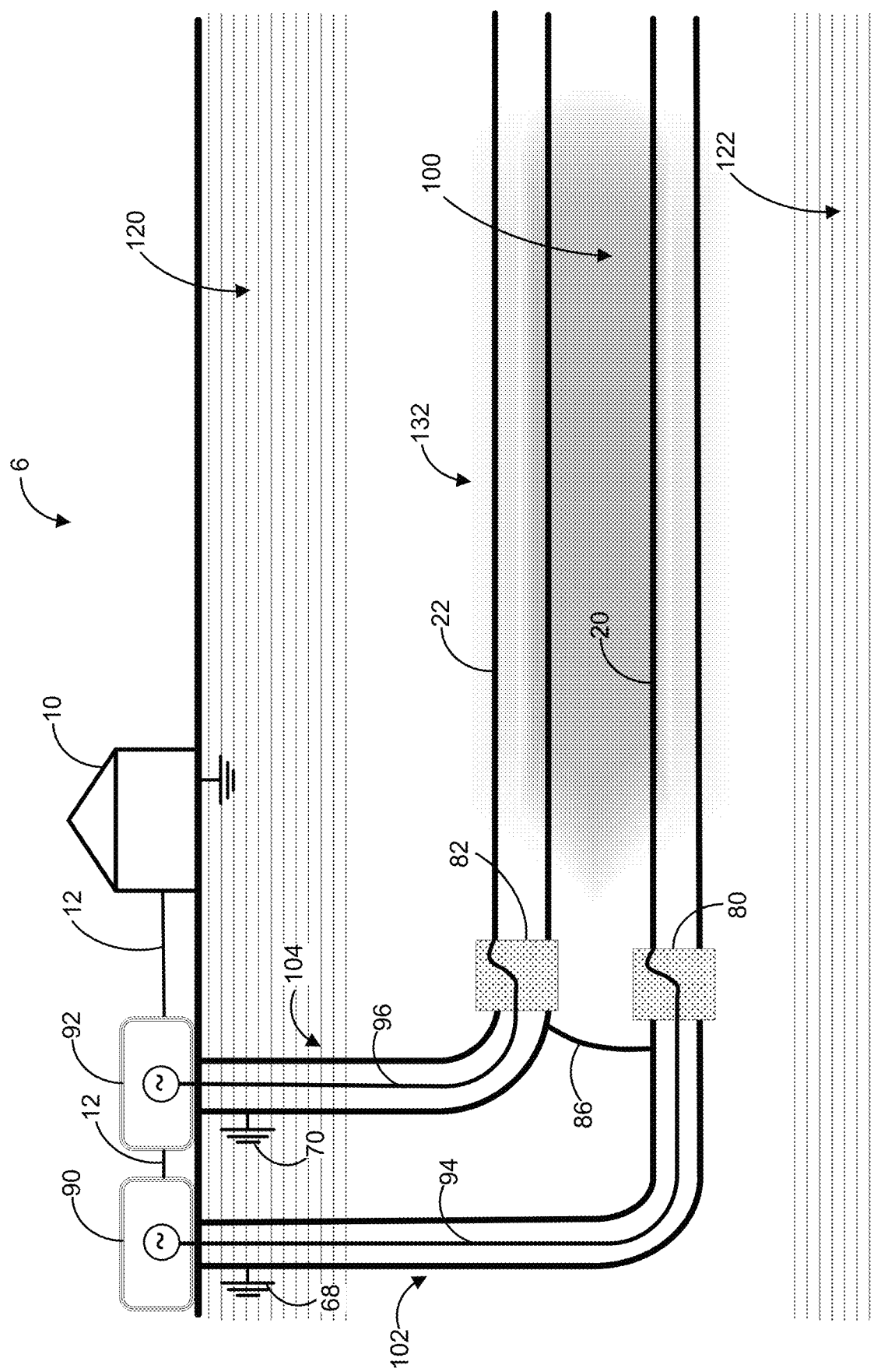
FIG. 28 is a profile view of an apparatus with insulated transmission line conductors operating as an open transmission line according to at least one example embodiment.

Referring to FIG. 27, there is a profile view of an apparatus 6 with the exposed, or partially exposed, or partially insulated, transmission line conductors 20 and 22 according to at least one example embodiment. Referring to FIG. 28, there is a profile view of an apparatus 6 with fully exposed transmission line conductors 20 and 22 according to at least one example embodiment. Partially exposed, or partially insulated transmission line conductors 20 and 22 would also have a similar profile view as that shown in FIG. 28 after operation for some time.

Whether the transmission line conductors 20 and 22 are insulated or non-insulated, the hydrocarbon formation 100 around the transmission line conductors 20 and 22 is heated 130 and 132 and can eventually desiccate. Water within the hydrocarbon formation 100 can be heated to steam and hydrocarbons can be released. These changes can cause a change in the dielectric parameters of the hydrocarbon formation 100 acting as the core of the dynamic transmission line. More specifically, these changes can lower the permittivity and conductivity of the hydrocarbon formation 100, resulting in significantly a lower complex dielectric constant around the transmission line with respect to that of the hydrocarbon formation 100.

As a result, the EM signal carried by the dynamic transmission line can travel faster in the dynamic transmission line than in the surrounding medium, which can still be colder and rich in water. This can lead to an electromagnetic phenomenon known as a fast wave, in which the phase velocity in the transmission line is faster than in the surrounding medium.

Figure 29:
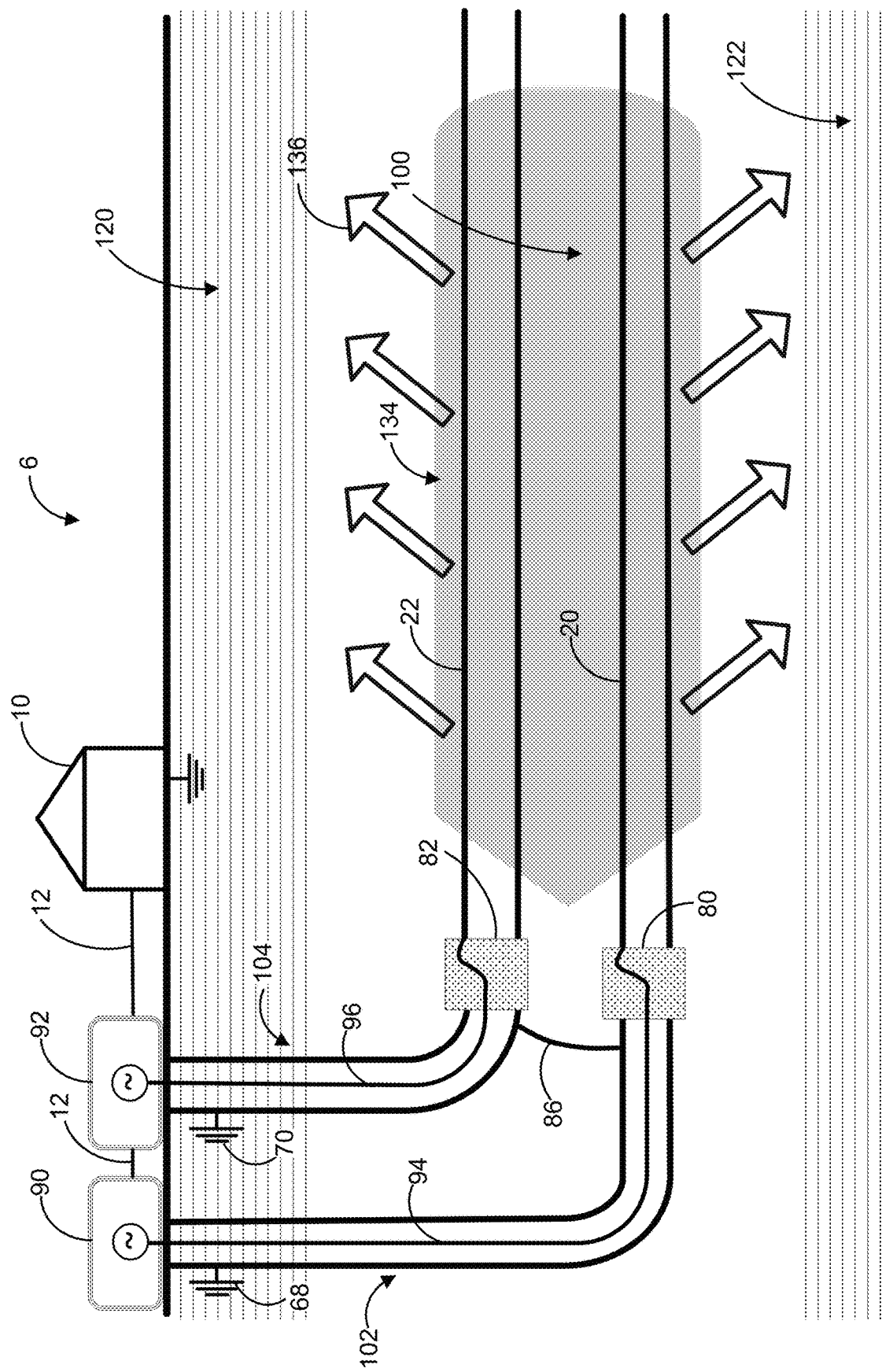
FIGS. 29 and 30 are profile views of an apparatus operating as an open transmission line and a leaky wave antenna according to at least one example embodiment.
Figure 30:
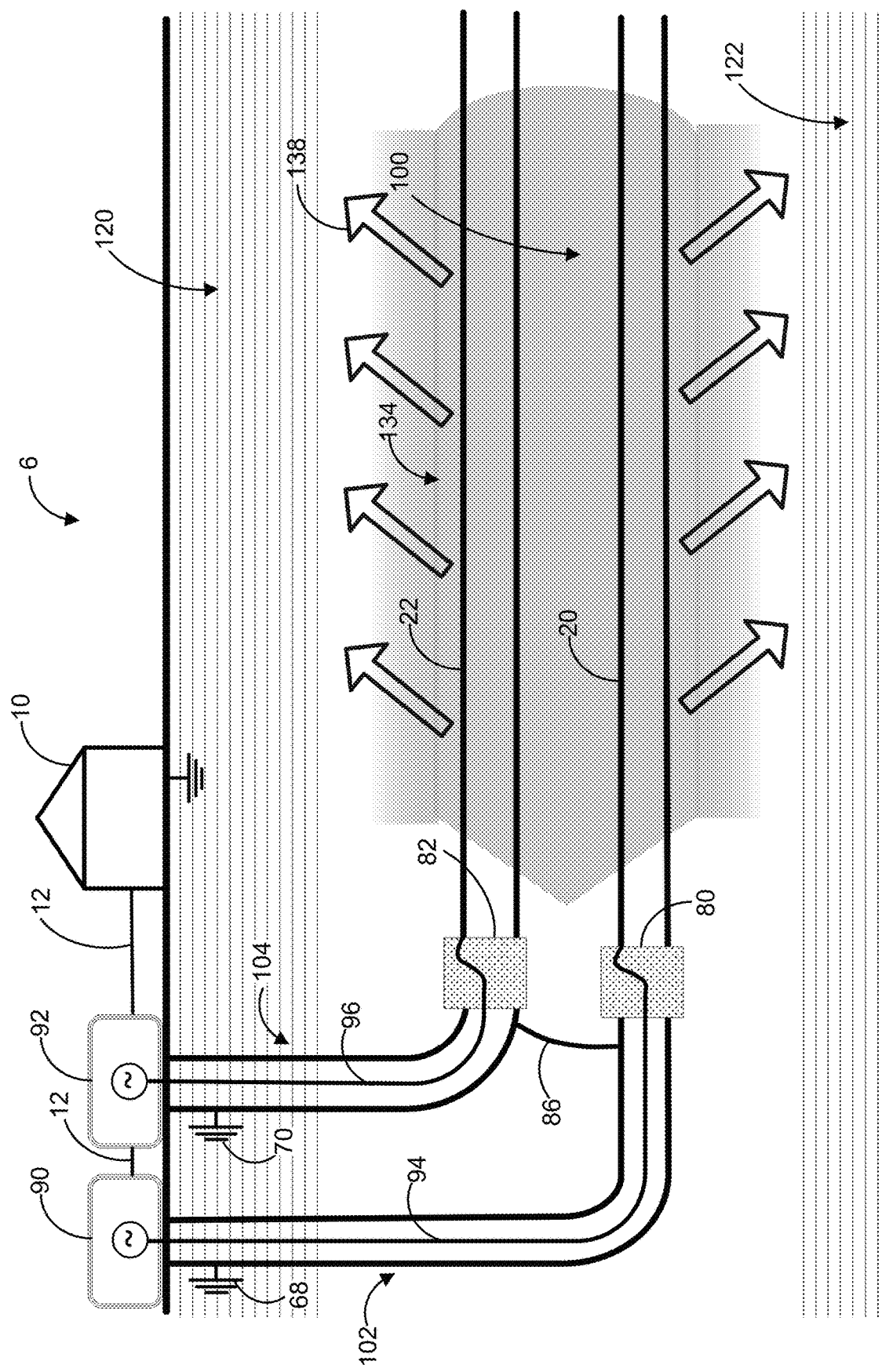

When a fast wave occurs, and the transmission line is open, the radiation process that occurs is generally known as leaky wave radiation. Thus, the dynamic transmission line can operate as an open transmission line as well as a radiating antenna. After initially operating as a simple, lossy transmission line propagating an electromagnetic wave in the hydrocarbon formation, the dynamic transmission line transitions to a leaky wave antenna radiating EM waves into the hydrocarbon formation. FIGS. 29 and 30 illustrate leaky wave radiation can develop 136 and further enhance 138 the heat penetration 134 of the wave into the hydrocarbon formation 100.

Depending on the stage of operation, the apparatus may be operated at different frequencies to achieve particular heating patterns. For example, in some embodiments, the apparatus may be operated at lower frequencies early in the heating process to accelerate the hydrocarbon formation of a desiccated region between the transmission line conductors or to maintain a more homogenous heating pattern along the length of the dynamic transmission line. However, in some embodiments, the apparatus may be operated at higher frequencies later in the heating process to promote more efficient leaky wave radiation, to increase the electrical length (i.e., the length in relation to wavelength), or to periodically change the frequency. Periodically changing the frequency can be performed to address potential standing wave issues. More specifically, in certain stages of the heating process, not all of the power of the traveling wave will be absorbed by or radiated into the hydrocarbon formation before the traveling wave reaches the distal end of the dynamic transmission line. Instead, a certain fraction of the traveling wave may reach the distal end of the dynamic transmission line and reflect back from it, creating a standing wave. The standing wave is typically visible only in a section of the dynamic transmission line, close to its distal end. However, it may also occupy a larger portion of the dynamic transmission line, especially when a significant portion of the hydrocarbon formation around the dynamic transmission line is desiccated. Standing waves can cause non-homogenous heating along the length of the dynamic transmission line. Changing the frequency can move the standing wave nodes along the length of the dynamic transmission line. Alternatively, more than one signals having different frequencies can be used. As well, non-sinusoidal signals that have harmonics, such as square waveform, can be used. Higher order harmonics may operate better as a leaky wave antenna.

Figure 31A:
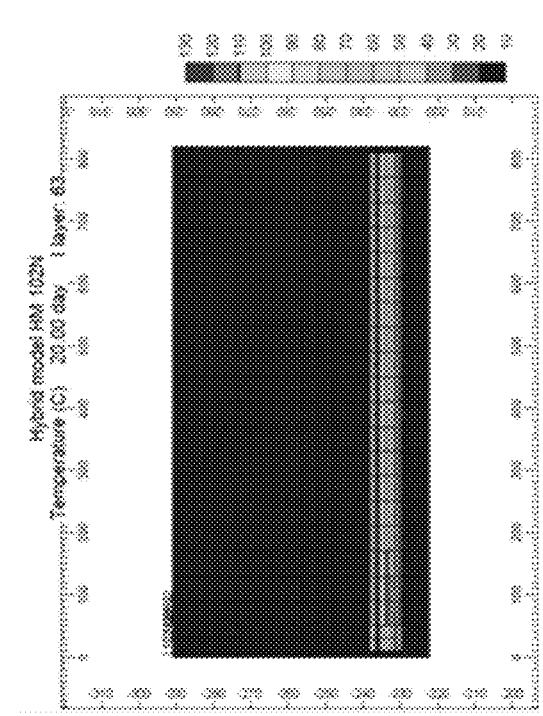
FIGS. 31A to 31C are temperature distributions of an insulated dynamic transmission line after 20, 50, and 90 days.
Figure 31B:
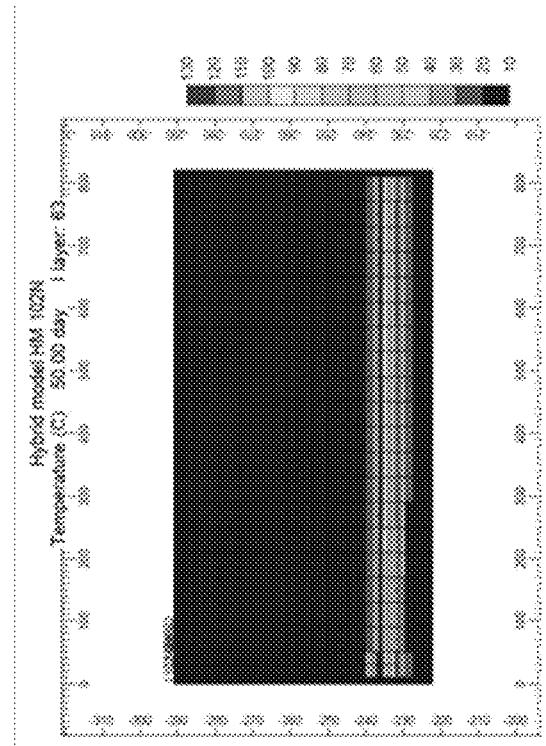
Figure 31C:
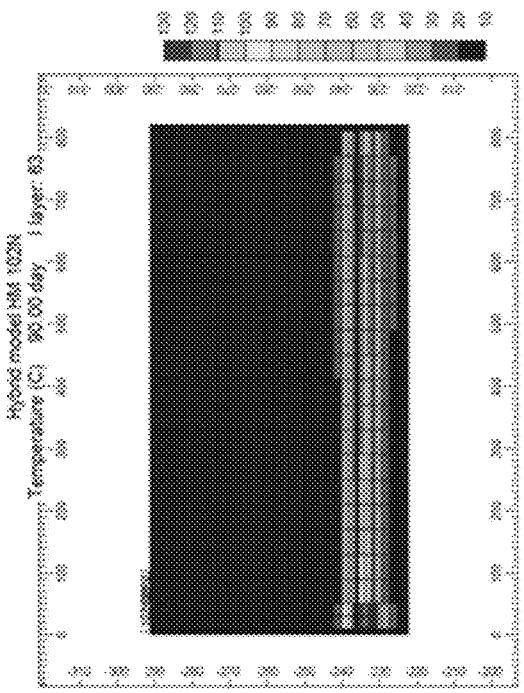

Referring to FIGS. 31A to 31C, there shown is a temperature distribution of a fully insulated dynamic transmission line. As set out above, pipe sections can be fully insulated as shown in FIGS. 11D, 12A, and 12B. Relatively lower power may be used when the dynamic transmission line is fully insulated. However, high power can accelerate the heating process. As shown in FIGS. 31A to 31C, heating develops uniformly along the fully insulated dynamic transmission line. The uniform heating achieved by a fully insulated dynamic transmission line may be useful for SAGD preheating applications.

Figure 32B:
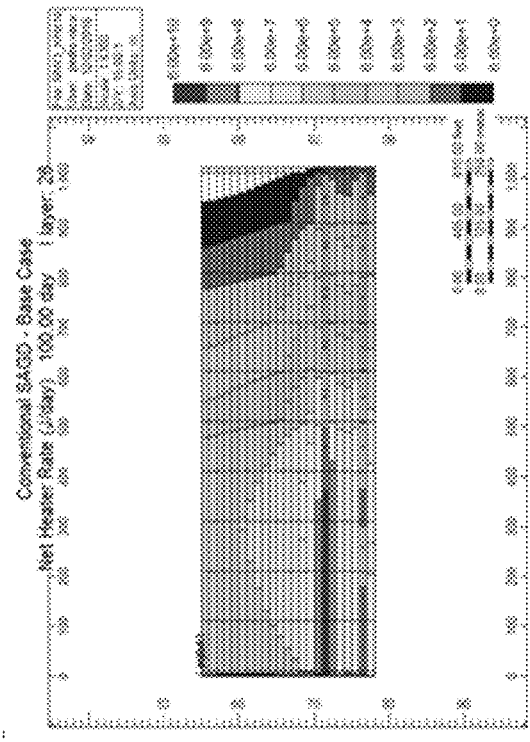
FIGS. 32A to 32C are heat delivery distributions of a non-insulated dynamic transmission line after 1, 100, and 200 days.
Figure 32A:
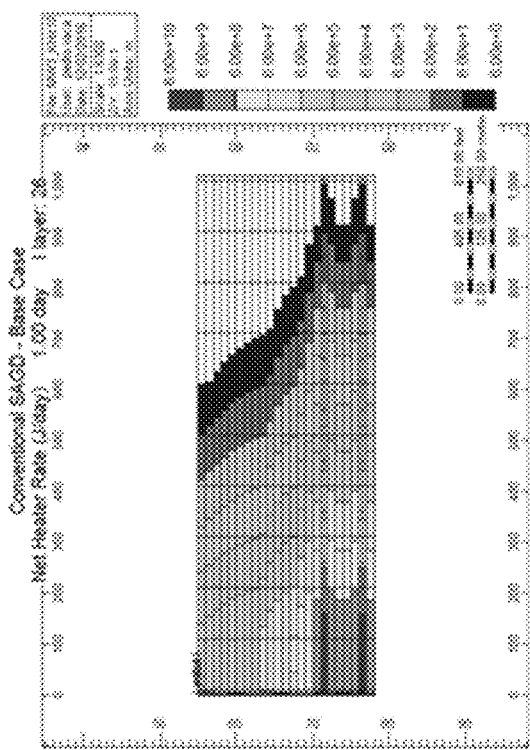
Figure 32C:
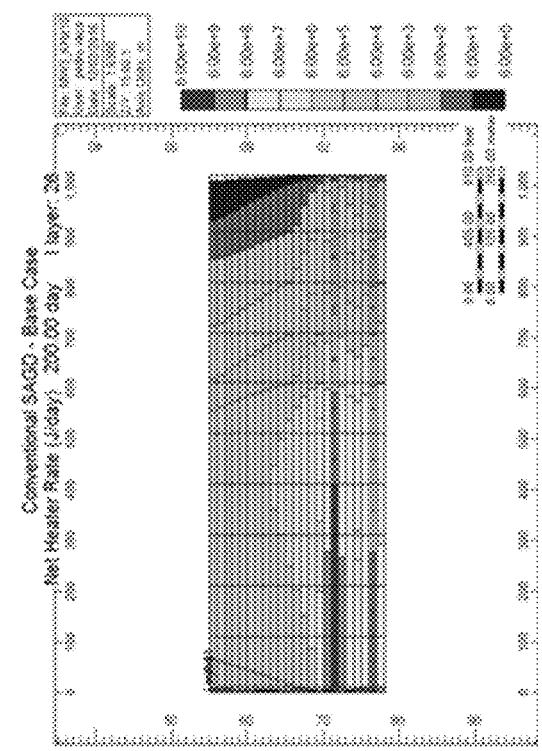

Referring to FIGS. 32A to 32C, there shown is a heat delivery distribution of a non-insulated dynamic transmission line. With a non-insulated dynamic transmission line, transmission line conductors 20 and 22 are not insulated. The dynamic transmission line forms a highly lossy transmission line, characterized by a significant attenuation constant. Initially, at day 1 (shown in FIG. 32A), EM energy dissipates rapidly at the proximal end of the transmission line conductors 20 and 22, which quickly desiccates the hydrocarbon formation at the proximal end of the transmission line conductors 20 and 22. The desiccation creates a low loss layer, which lowers the attenuation constant. The lower attenuation constant allows the electromagnetic wave to propagate further down the dynamic transmission line and towards the distal end of the transmission line conductors 20 and 22.

As time progress, as shown after 100 days of operation in FIG. 32B, the heated area progresses further along the dynamic transmission line. After 200 days of operation (shown in FIG. 32C), most areas along the transmission line conductors 20 and 22 are heated. Although heat is dissipated along the entire length of the transmission line conductors 20 and 22, a standing wave pattern can develop and reduce the heat at the distal end of the transmission line conductors 20 and 22.

Figure 33B:
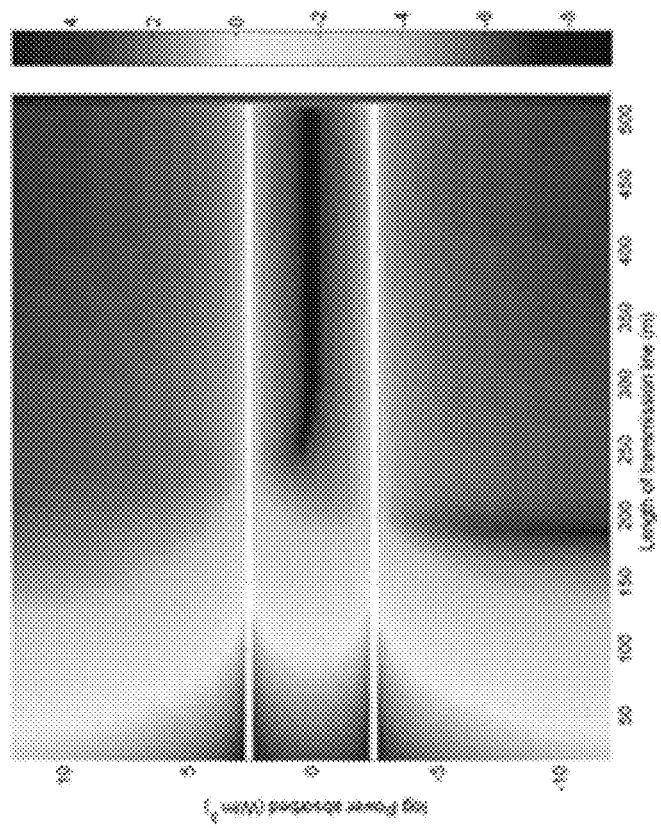
FIGS. 33A and 33B are electric fields of an insulated and non-insulated dynamic transmission line on a first day.
Figure 33A:
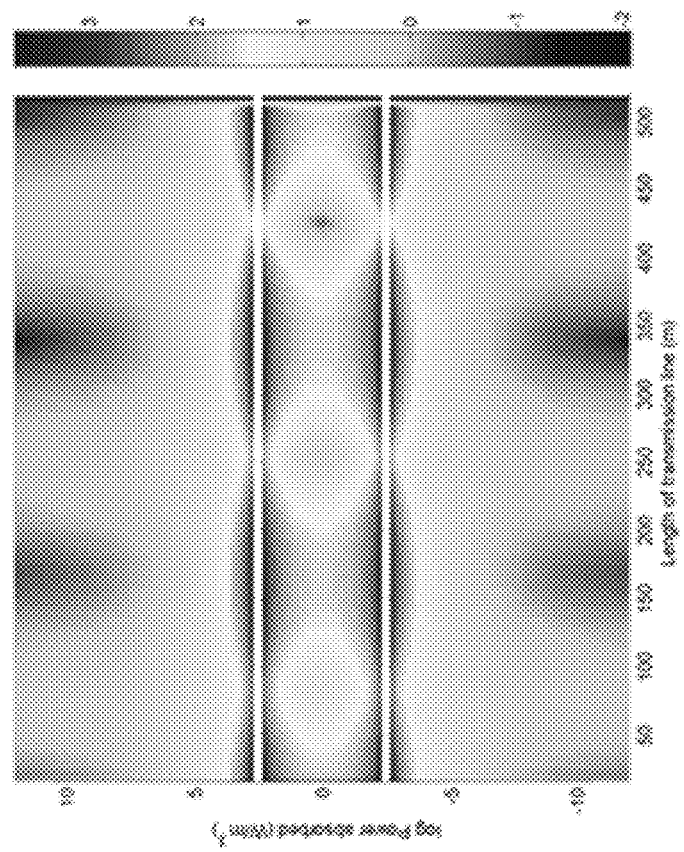

Referring to FIGS. 33A to 33B, there shown is the electric field on the first day of operation of a dynamic transmission line. As shown in FIG. 33A, the electric field is carried along the length of a fully-insulated dynamic transmission line. In contrast, the electric field of a non-insulated dynamic transmission line is shown in FIG. 33B.

Figures 34A, 34B:
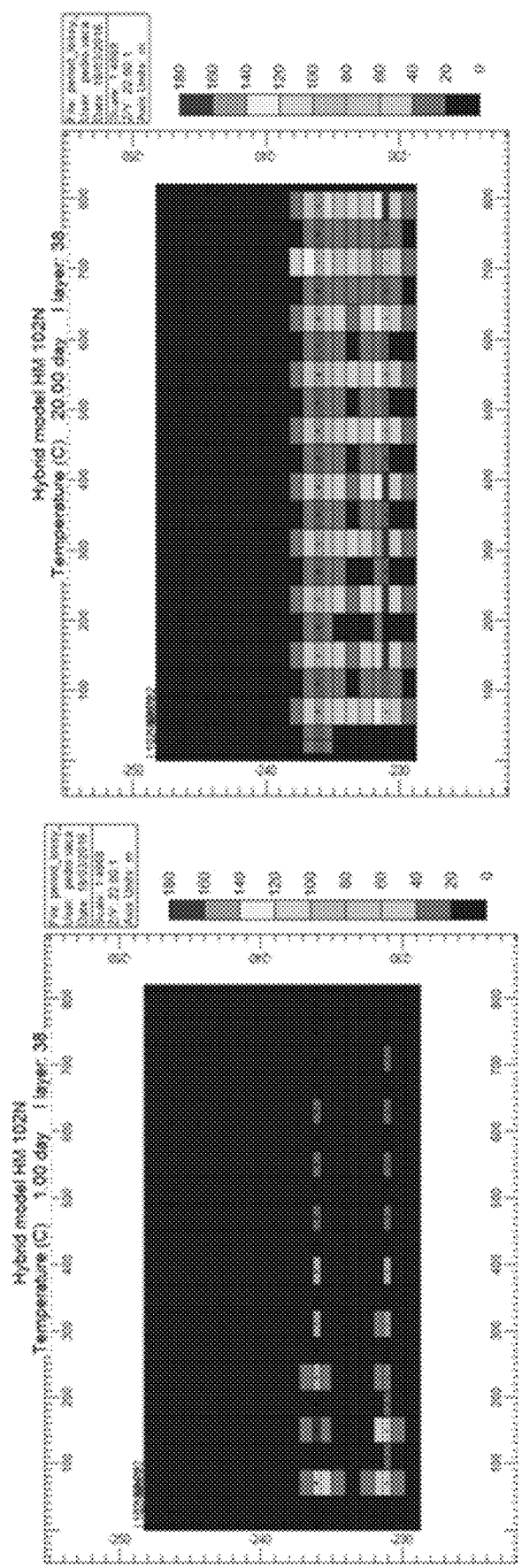
FIGS. 34A and 34B are temperature distributions of a partially insulated dynamic transmission line after 1 and 20 days.

Referring to FIGS. 34A to 34B, the temperature distribution of a semi-insulated dynamic transmission line after 1 and 20 days of EM heating is shown. As set out above, pipe sections can be partially insulated as shown in FIG. 11B. In this simulation, the length of exposed portions of the metallic pipe sections was longer than typical. Initially, at day 1 (shown in FIG. 34A), the temperature distribution can be similar to that of a non-insulated dynamic transmission line. At approximately day 20 (shown in FIG. 34B), the EM power can propagate to the entire length of the transmission line conductor. As a result, the temperature distribution can be similar to that of an insulated dynamic transmission line.

Figure 35A:
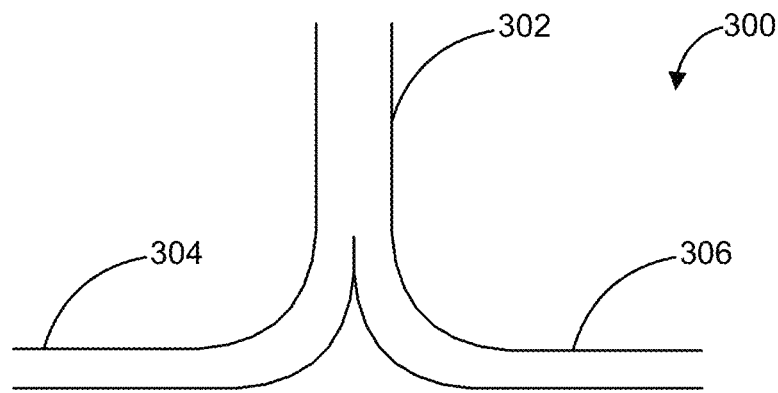
FIGS. 35A to 35F are schematic views of pipe configurations that may be used in an apparatus for electromagnetic heating of formations, according to one embodiment.

Referring to FIGS. 35A to 35F, various pipe configurations are shown that can be utilized in the present apparatus. The various pipe configuration examples can be used for at least one of the dynamic transmission line conductors to improve the heating coverage of the present apparatus. FIG. 35A shows pipe configuration 300 having an inverted "T" junction. Configuration 300 includes a vertical pipe portion 302 and two horizontal pipe portions 304 and 306 that extend from the vertical pipe portion 302 in opposite directions.

Figure 35B:
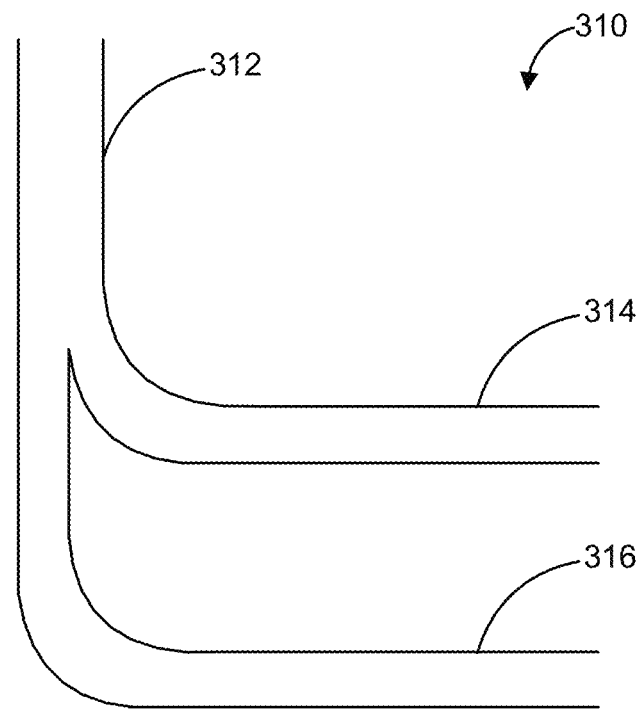

FIG. 35B shows pipe configuration 310 having an inverted "F" junction. Configuration 310 includes a vertical pipe portion 312 and two horizontal pipe portions 314 and 316 that extend from the vertical pipe portion 312 in the same direction. Horizontal pipe portions 314 and 316 can be located above one another.

Figure 35C:
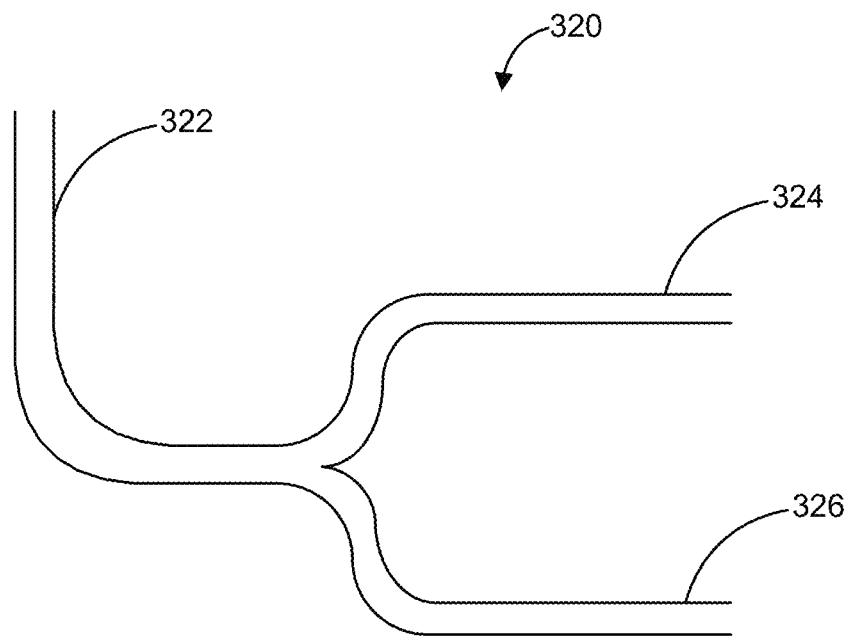

FIG. 35C shows pipe configuration 320 having a vertical pipe portion 322. Two horizontal pipe portions 324 and 326 can extend from the vertical pipe portion 322 in the same direction. Horizontal pipe portions 324 and 326 can be located at the same height and parallel to one another.

Figure 35D:
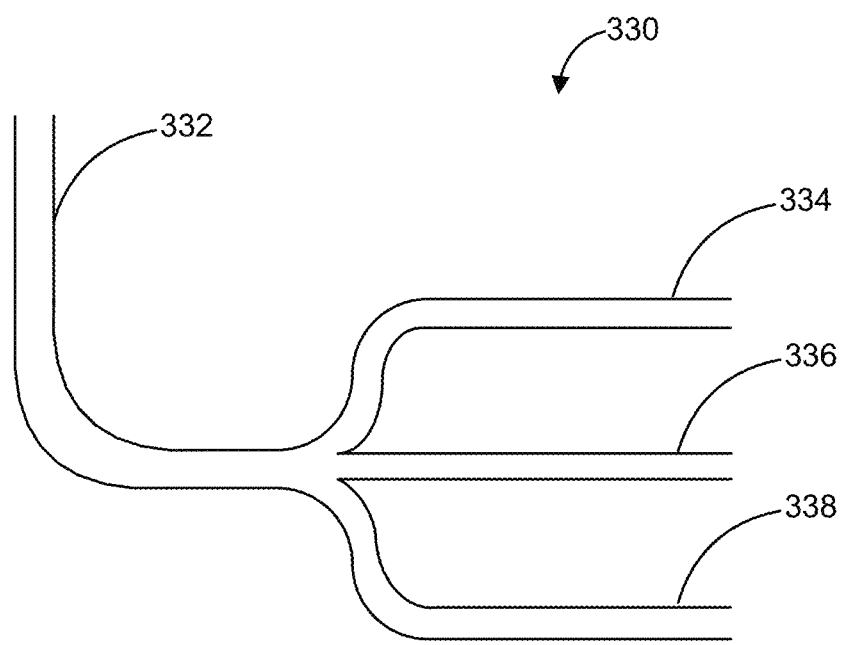

FIG. 35D shows pipe configuration 330 having a vertical pipe portion 332. Three horizontal pipe portions 334, 336, and 338 can extend from the vertical pipe portion 332 in the same direction. Similar to FIG. 35C, horizontal pipe portions 334, 336, and 338 can be located at the same height and parallel to one another.

Figure 35E:
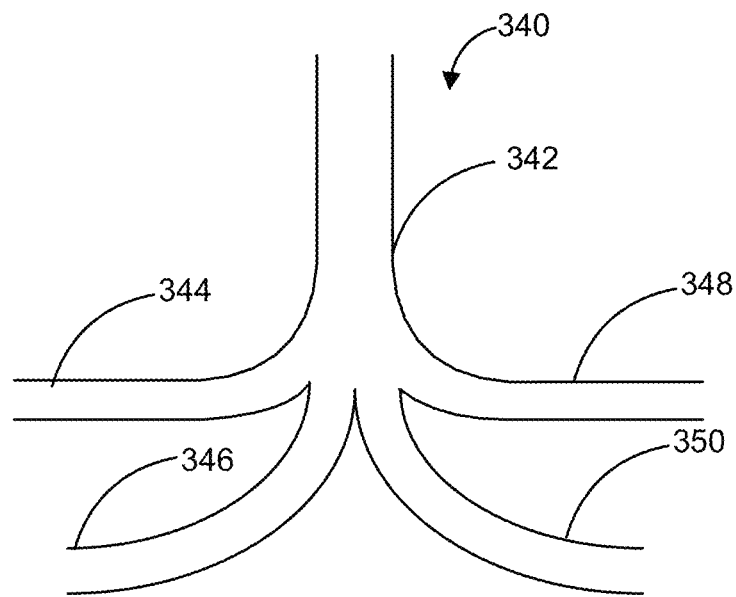

FIG. 35E shows pipe configuration 340 having a vertical pipe portion 342. Four horizontal pipe portions 344, 346, 348, and 350 can extend from the vertical pipe portion 342 in opposite directions. Horizontal pipe portions 344, 346, 348, and 350 can be located at the same height as one another.

Figure 35F:
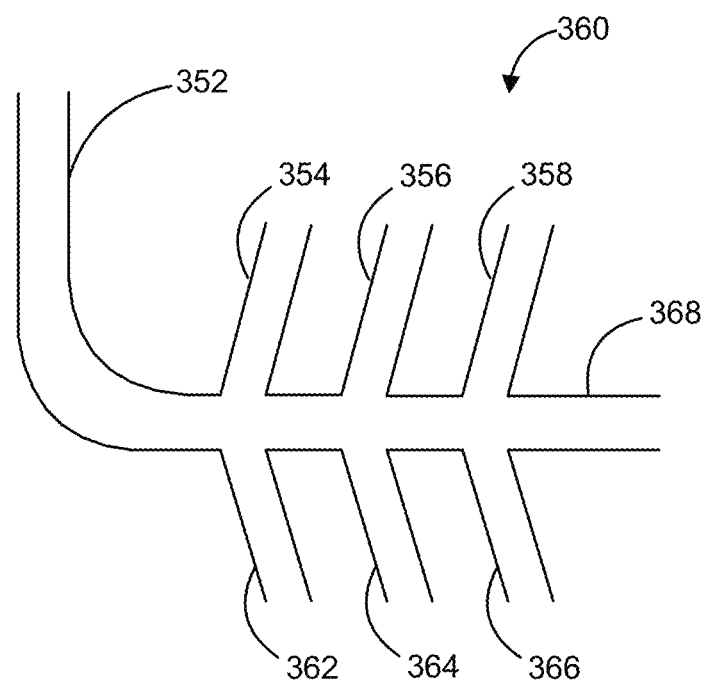

FIG. 35F shows pipe configuration 360 having fishbone junction. Configuration 360 includes a vertical pipe portion 352 that transitions to a horizontal pipe portion 368. Six horizontal pipe portions 354, 356, 358, 362, 364, and 366 can extend at an angle from the horizontal pipe portion 368.

Figure 36:
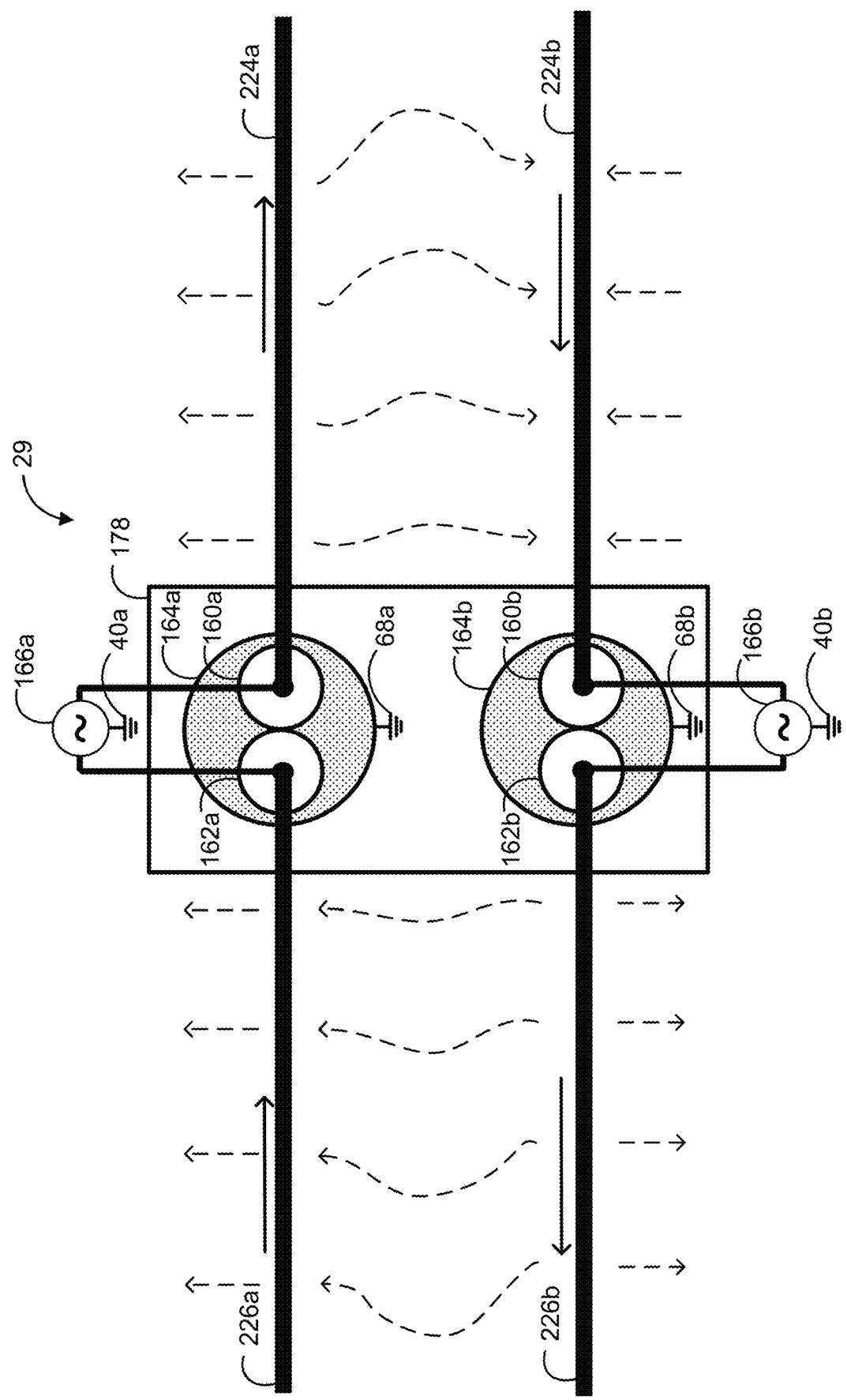
FIGS. 36 and 37 are schematic and perspective views of an apparatus for electromagnetic heating of formations according to another embodiment.
Figure 37:
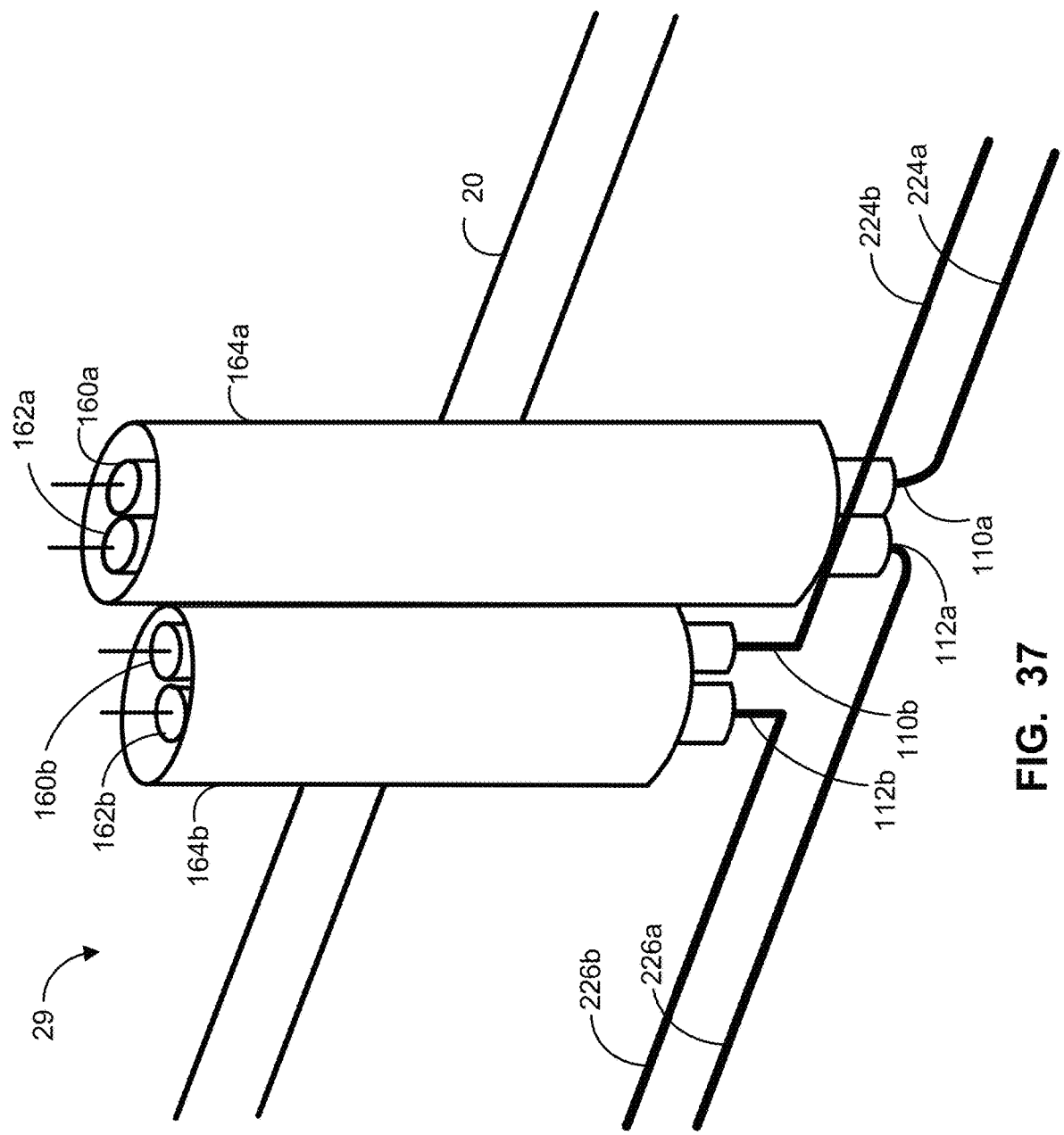

Referring to FIGS. 36 and 37, there is a schematic and perspective view of an apparatus 29 according to at least one example embodiment. As shown in FIG. 36, apparatus 29 includes a pair of apparatus 27 (shown in FIG. 24A). Features of each apparatus 27 are shown using the same reference numbers and indicated by the letter suffix 'a' for the first apparatus and the letter suffix 'b' for the second apparatus 27. Metal casings 160a and 162a of the first apparatus 27 are in electrical contact and metal casings 160b and 162b of the second apparatus 27 are in electrical contact. Well platform 178 can be one or more platforms located at the surface, or above ground and at the proximal end of metal casings 160a, 162a, 160b, and 162b. While apparatus 29 is described as being a pair of apparatus 27, it will be understood that any one or both apparatus 27 can also be apparatus 25 (shown in FIG. 23A), apparatus 39 (shown in FIG. 23B), or apparatus 47 (shown in FIG. 24B).

As shown in FIG. 36, apparatus 29 includes two EM wave generators 166a and 166b. In some embodiments, EM wave generator 166a can generate a sinusoidal signal and EM wave generator 166b can generate a sinusoidal signal that is a 180° phase-shifted version of the sinusoidal signal generated by EM wave generator 166a. In some embodiments, only one EM wave generator can be provided to excite the first apparatus 27 and the second apparatus 27. The EM wave generators 166a and 166b can be located above ground (not shown). The EM wave generators 166a and 166b can each include an inverter, a pulse synthesizer, a transformer, one or more switches, a low-to-high frequency converter, an oscillator, an amplifier, or any combination of one or more thereof.

In FIG. 36, current at a time instant is illustrated by solid arrows and the electric field at a time instant is illustrated by dashed arrows. As shown in FIG. 36, current travels along transmission line conductor 224a in a direction opposite to that of transmission line conductor 224b and together, transmission line conductors 224a and 224b form a first dynamic transmission line. Similarly, current travels along transmission line conductor 226a in a direction opposite to that of transmission line conductor 226b and together, transmission line conductors 226a and 226b form a second dynamic transmission line.

Different materials can exist in a hydrocarbon formation. For example, there can an interface or boundary between wet and dry materials or when the hydrocarbon formation is stratified. As shown in FIG. 36, electric fields between the dynamic transmission lines are generally in a direction that is normal to the direction of current travelling along each transmission line conductor. However, when electric fields penetrate an interface between two different materials at an angle that is perpendicular to the interface, power transmission can be diminished, resulting in less heating of the hydrocarbon formation.

Apparatus 29 includes at least one producer pipe. As shown in FIG. 37, the at least one producer pipe can be an SAGD pipe, similar to pipe 20 and 22 of apparatus 13 in FIGS. 14 and 15. As shown in FIG. 37, pipe 20 can be situated substantially parallel to the dynamic transmission lines. Furthermore, the pipe 20 can be located below, above, or in between the transmission line conductors of the dynamic transmission lines. In some embodiments, the at least one producer pipe of apparatus 29 can be a vertical pipes, similar to pipes 150, 152, 154, and 156 of apparatus 21 in FIGS. 20 and 21.

As shown in FIG. 37, the dynamic transmission lines can be arranged in an approximately vertical arrangement. That is, transmission line conductors 224a and 226a can be located at different depths from 224b and 226b, respectively. In some embodiments, the dynamic transmission lines can be arranged in an approximately horizontal arrangement. That is, transmission line conductors 224a and 226a can be located at approximately the same depth from the surface as transmission line conductors 224b and 226b, respectively. It will be understood that transmission line conductors 224b and 226b can have any other appropriate arrangement as disclosed herein. For example, the distance between transmission line conductors 224b and 226b can be varying.

The transition between the distal end of the high frequency connectors and the transmission line conductors can be any appropriate angle. The angle can depend on the drilling technology. As shown in FIG. 37, the transition between high frequency connectors 110b and 112b to transmission line conductors 224b and 224b is a 90° bend while the transition between high frequency connectors 110a and 112a to transmission line conductors 224b and 224b is an arch.

Figure 38:
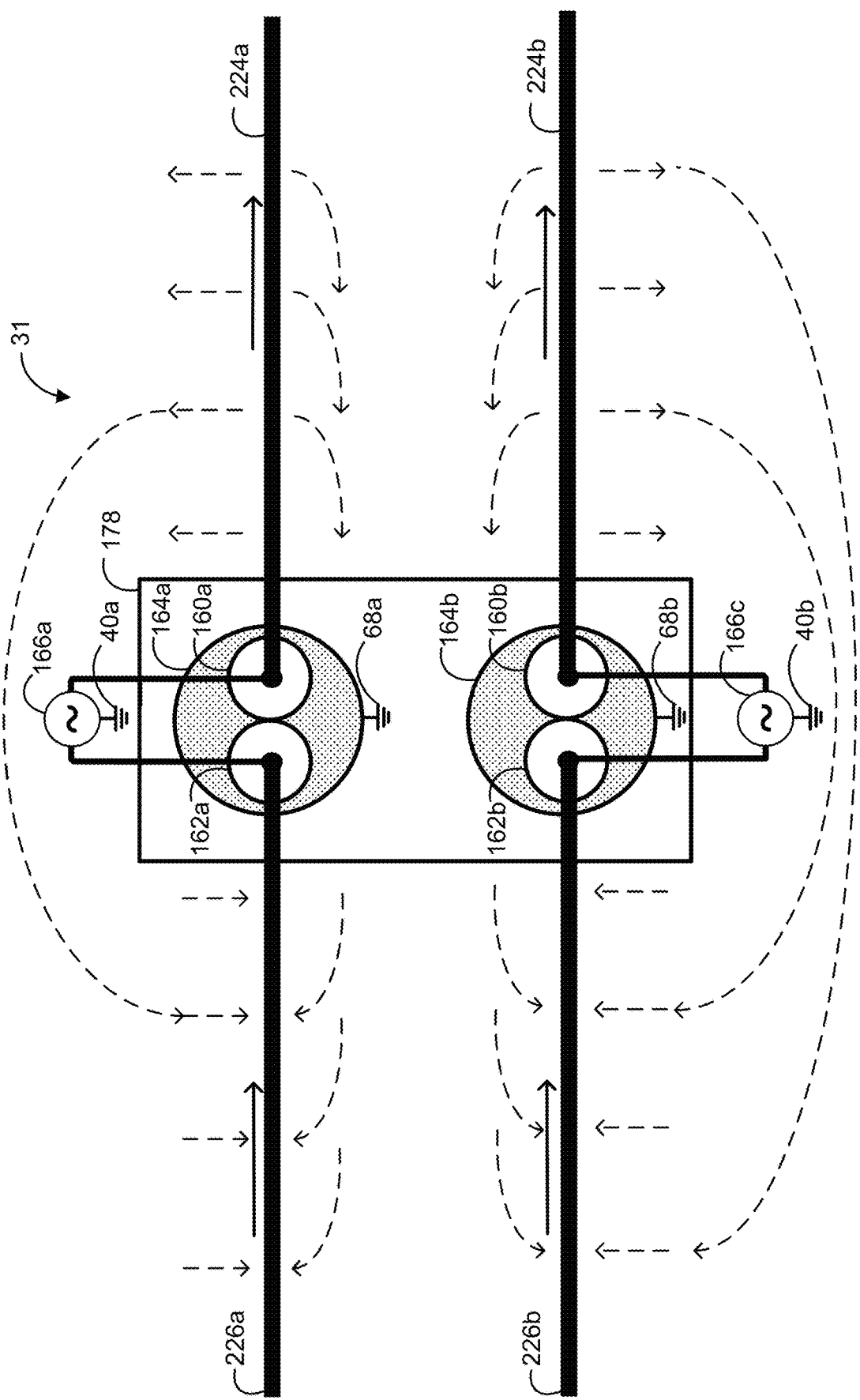
FIG. 38 is a schematic view of an apparatus for electromagnetic heating of formations according to another embodiment.

Referring to FIG. 38, there is a schematic view of an apparatus 31 according to at least one example embodiment. Features common to apparatus 29 are shown using the same reference numbers. Apparatus 31 includes two EM wave generators that can generate identical signals which are substantially in phase (i.e., phase difference of 0°), or have no appreciable delay between the signals.

Similar to FIG. 36, current at a time instant is illustrated by solid arrows and the electric field at a time instant is illustrated by dashed arrows in FIG. 38. Current travels along transmission line conductor 224a in a direction that is the same as that of transmission line conductor 224b. As well, current travels along transmission line conductor 226a in a direction that is the same as that of transmission line conductor 226b. Hence, apparatus 31 can operate as a dipole antenna with transmission line conductors 224a and 224b forming a first arm of the dipole antenna and transmission line conductors 226a and 226b forming a second arm of the dipole antenna. Apparatus 31 can also be viewed as a system of two dipole antennas in which transmission line conductors 224a and 226b form a first dipole antenna and transmission line conductors 224b and 226b form a second dipole antenna. When operating as a single or double dipole antenna, apparatus 31 can resonate a standing wave within the hydrocarbon formation 100.

Since transmission line conductors of each arm are symmetrically excited, the dipole antenna does not require chokes or additional baluns to eliminate unwanted or common mode currents. Producer pipes (not shown), such as SAGD pipes 20 and 22 of apparatus 13 of FIGS. 14 and 15, can be situated substantially parallel to the dipole antenna. Furthermore, the producer pipes can be located below, above, or in between the transmission line conductors of the dipole antenna.

As shown at a time instant in FIG. 38, when operating as a dipole antenna, electric fields between the transmission line conductors are generally in a direction that is parallel to the direction of current travelling along each transmission line conductor. As set out above, when electric fields penetrate an interface between two different materials at an angle that is perpendicular to the interface, power transmission can be diminished, resulting in less heating of the hydrocarbon formation. Such power losses can be reduced if electric fields penetrate an interface between two different materials at an angle that is substantially parallel to the interface, allowing for better heating.

EM wave generator 166b of FIG. 36 can be converted to EM wave generator 166c of FIG. 38 by switching the terminals that each transmission line conductor is connected to. The terminals can be switched at the surface, that is, above ground. The ease of conversion between EM wave generator 166b and 166c can allow apparatuses 29 and 31 to be used interchangeably, depending on the structure of the hydrocarbon formation. It may be desirable to change the operation from apparatus 29 to apparatus 31 or vice versa as the heating process progresses. For example, it may be desirable to initially use apparatus 29 to initiate production and evaporate water from between the transmission line conductors 224 and 226 and then change to apparatus 31 to achieve radiation characteristic typical of a dipole antenna.

Referring to FIG. 39, there is a schematic view of an apparatus 33 according to at least one example embodiment. Features common to apparatus 29 are shown using the same reference numbers.

As shown in FIG. 39, apparatus 33 includes two EM wave generators that are out of phase. The phase difference between EM wave generator 92a and 92b is not limited to 180° (similar to apparatus 29 in FIG. 36) or 0° (similar to apparatus 31 in FIG. 38). The phase difference between EM wave generator 92a and 92b can be any phase between 0° to 360°±(n×360°), where n is any integer. For example, EM wave generator 92a and 92b can be 90° out of phase and apparatus 33 will not operate as dynamic transmission line nor a dipole antenna.

FIGS. 40A to 40H show cross-sectional views of the electric field of apparatus 31 along cross-section A-A' in FIG. 39 at sequential time instants, namely at 45° phase shift increments. As shown in FIGS. 40A to 40H, the electric field rotates as the phase shifts.

The rotation of the electric field depends on the EM waves provided by EM wave generators 92a and 92b. Since the EM waves generated by EM wave generators 92a and 92b are 90° out of phase, the vector amplitude of each waveform is different at any time instant. The amplitude of the EM waves can also be different at any time instant due to different waveforms generated by EM wave generators 92a and 92b. Furthermore, the amplitude can also diminish as the EM wave propagates in the hydrocarbon formation. Thus, the relative amplitude of the EM waves can vary due to the spatial geometry of the transmission line conductors.

The electric field shown in FIGS. 40A to 40H can be characterized as having an elliptical polarization. Such an elliptical polarization of the electric field can at least occur in some location within the hydrocarbon formation. An elliptical polarization can be suitable for heating formation that is stratified because the electric field can better penetrate interfaces between different materials.

Figure 41:
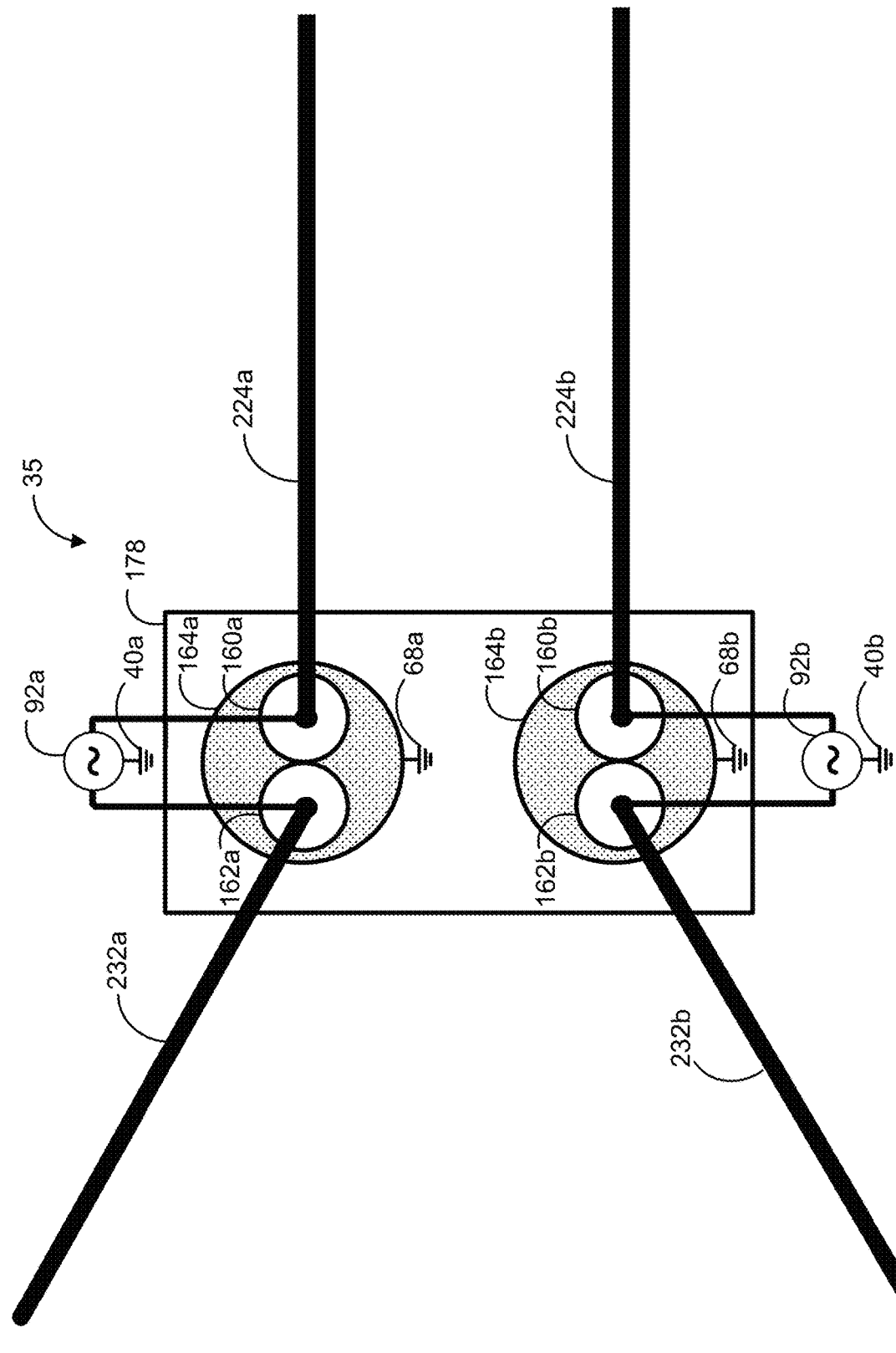
FIG. 41 is a schematic view of an apparatus for electromagnetic heating of formations according to another embodiment.

Referring to FIG. 41, there is a schematic view of an apparatus 35 according to at least one example embodiment. Features common to apparatus 29 and 33 are shown using the same reference numbers. The EM wave generators 92a and 92*b* of apparatus 35 in FIG. 41 can generate EM waves that are 180° out of phase, similar to EM wave generators 166*a* and 166*b* of apparatus 29, substantially in phase, similar to EM wave generators 166*a* and 166*c* of apparatus 31, or have any other phase difference. The apparatus can operate as a dipole antenna, as a dynamic transmission line, or combination of the dipole antenna and the dynamic transmission line.

While transmission line conductors 224*a* and 224*b* are shown in FIG. as being substantially parallel to one another, in some embodiments, transmission line conductors 224*a* and 224*b* can diverge from each other at any angle. Similarly, while transmission line conductors 232*a* and 232*b* are shown in FIG. 41 as diverging from each other, in some embodiments, transmission line conductors 232*a* and 232*b* can be substantially parallel to one another. It can be preferable for the transmission line conductors to diverge from one another in order to heat a larger volume of the hydrocarbon formation.

Figure 42:
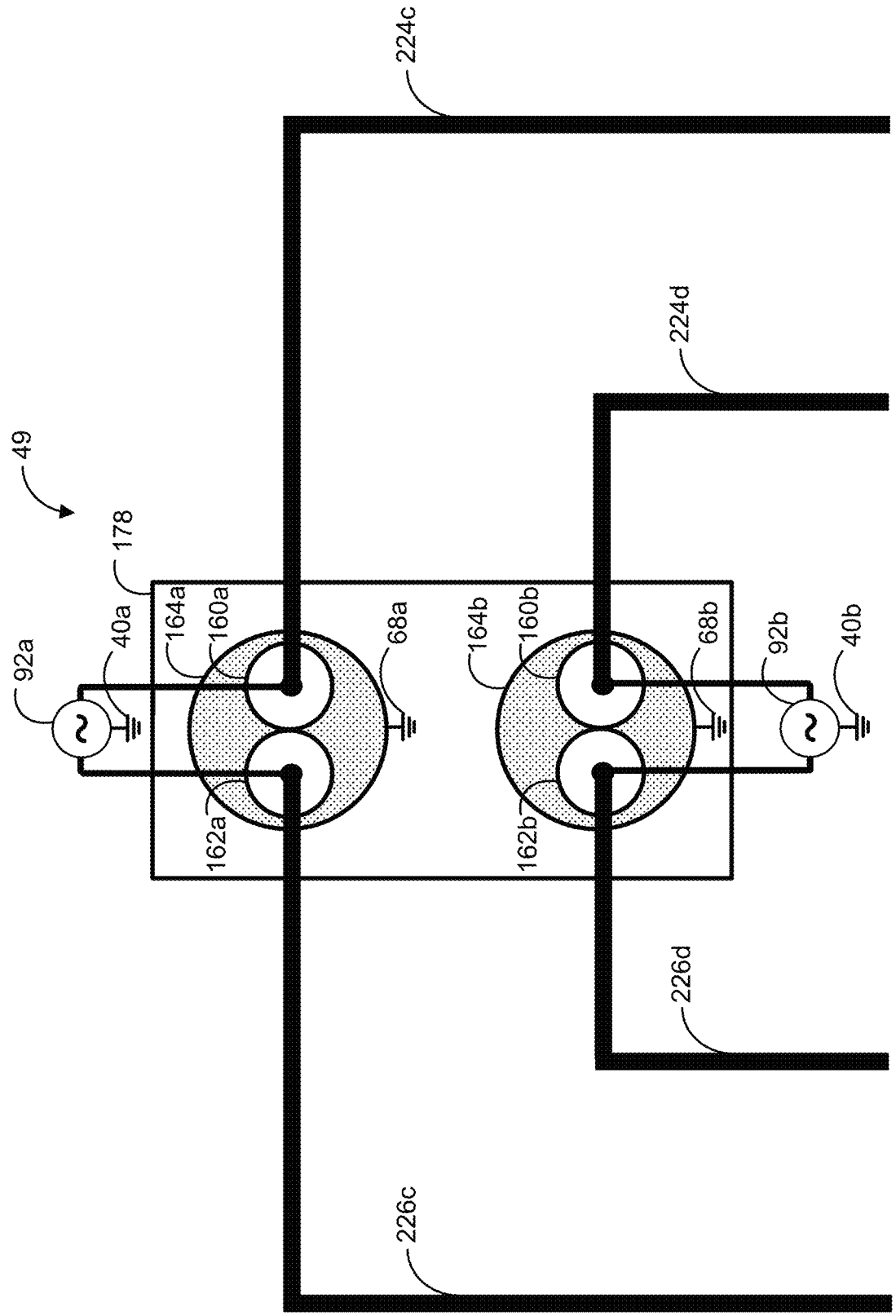
FIG. 42 is a schematic view of an apparatus for electromagnetic heating of formations according to another embodiment.

Referring to FIG. 42, there is a schematic view of an apparatus 49 according to at least one example embodiment. Features common to apparatus 29 and 33 are shown using the same reference numbers. Similar to the transmission line conductors of apparatus 29 and 33, transmission line conductors 224*c* and 224*d* as well as 226*c* and 226*d* are substantially parallel to one another. It may be noted that the difference between apparatus 49 and apparatus 29 and 33 is that in the present case, the two arms of the two arms of the transmission lines 224*c*, 224*d*, 226*c*, 226*d* are parallel to each other as opposed to pointing away from each other. Generally, such a configuration is not likely to be operational in free space. However, when deployed within a hydrocarbon formation, the formation can sufficiently attenuate the irradiated power such that the transmission line pairs 226*c* and 226*d*, and 224*c* and 224*d* do not couple. In this case, the transmission line pairs can behave as if they are in a straight configuration similar to the apparatus of FIG. 39. In some embodiments, the present apparatus can be applied in normal wells, in which creation of the well involves drilling from the surface first vertical holes and then directional vertical holes (e.g. for deployment of transmission line conductors). In this case, the sections of the transmission line conductors which are depicted as horizontally oriented in FIG. 42 can be curved and partially vertical.

In order for apparatus 49 to operate as a dipole antenna with transmission line conductors 224*c* and 224*d* forming a first arm of the dipole antenna and transmission line conductors 226*c* and 226*d* forming a second arm of the dipole antenna, sufficient distance between the first and second arms of the dipole is required to ensure that interaction between the first and second arms is weak. A dipole antenna with substantially horizontal dipole arms can be suitable for mine-face accessible hydrocarbon formation. In the case of mine-face accessible hydrocarbon formation, where drilling can be done from the side into the hydrocarbon formation, then the orientation of the transmission line pairs can be horizontal.

Figure 43:
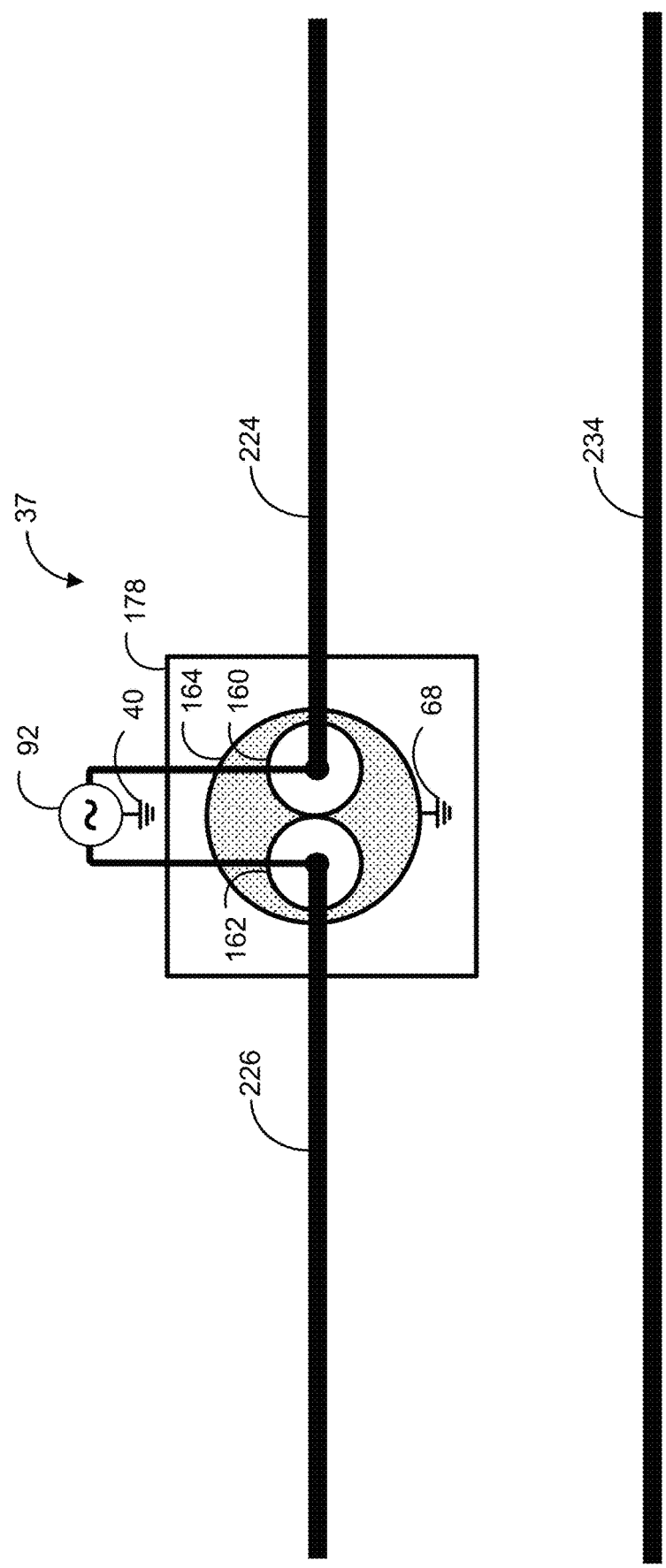
FIG. 43 is a schematic view of an apparatus for electromagnetic heating of formations according to another embodiment.

Referring to FIG. 43, there is a schematic view of an apparatus 37 according to at least one example embodiment. Features common to apparatus 27 are shown using the same reference numbers. Similar to apparatus 27, apparatus 37 includes only one EM wave generator 92 located above ground, or at the surface. The deployment of apparatus 37 is simpler than apparatuses with two EM wave generators, such as apparatuses 29, 31, 33, and 35.

Transmission line conductor 234 can be a producer pipe. Similar to pipe 20 of apparatus 17 in FIGS. 18 and 19, transmission line conductor 234 is not connected to EM wave generator 92. EM wave generator 92 is connected to and excites transmission line conductors 224 and 226, which can in turn, induce a current on transmission line conductor 234. The excitation of apparatus 37 can be characterized as a combined dipole/transmission line excitation.

The operation of apparatus 37 is similar to a folded dipole with the exception that in a folded dipole, suppression of the transmission line mode is typically preferred. When heating formations, it is desirable for the transmission line mode to propagate.

Figure 44:
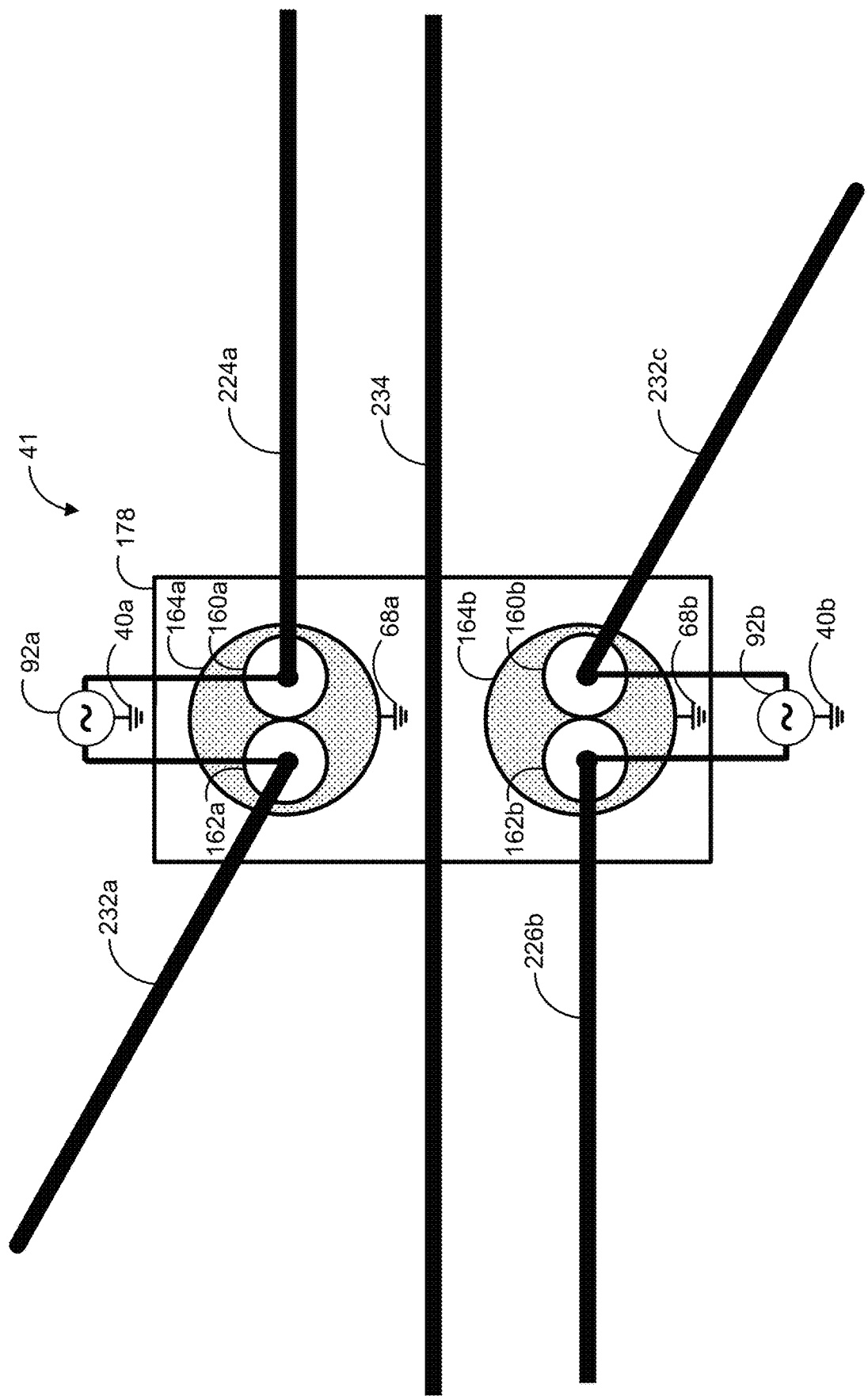
FIG. 44 is a schematic view of another transmission line conductor arrangements that may be used in an apparatus for electromagnetic heating of formations, according to one embodiment.

Referring to FIG. 44, another transmission line conductor arrangement is shown. Depending on the excitation of the transmission line conductors, different transmission line conductor arrangements can operate in different dipole configurations.

FIG. 44 shows a schematic view of an apparatus 41 according to at least one example embodiment. Features common to apparatus 35 and 37 are shown using the same reference numbers. Similar to apparatus 35, apparatus 41 can include two EM wave generators 92*a* and 92*b*. EM wave generator 92*a* can excite transmission line conductors 232*a* and 224*a* while second EM wave generator 92*b* can excite transmission line conductors 226*b* and 232*b*.

Similar to apparatus 37, apparatus 41 can include transmission line conductor 234 which is not connected to EM wave generators 92*a* or 92*b*. Transmission line conductor 234 can be situated between the transmission line conductors of each arm, namely between 224*a* and 232*c* of a first arm and between 232*a* and 226*b* of a second arm. With transmission line conductor 234 situated between the transmission line conductors of each arm, the excitation of the first and second arms can induce a current on transmission line conductor 234.

As shown in FIG. 44, the pair of transmission line conductors forming an arm of the dipole antenna can be oriented in different directions. Transmission line conductors 224*a* and 232*c* forming the first arm of the dipole antenna are not substantially parallel. Likewise, transmission line conductors 232*a* and 226*b* forming the second arm of the dipole antenna are not substantially parallel.

Figure 45:
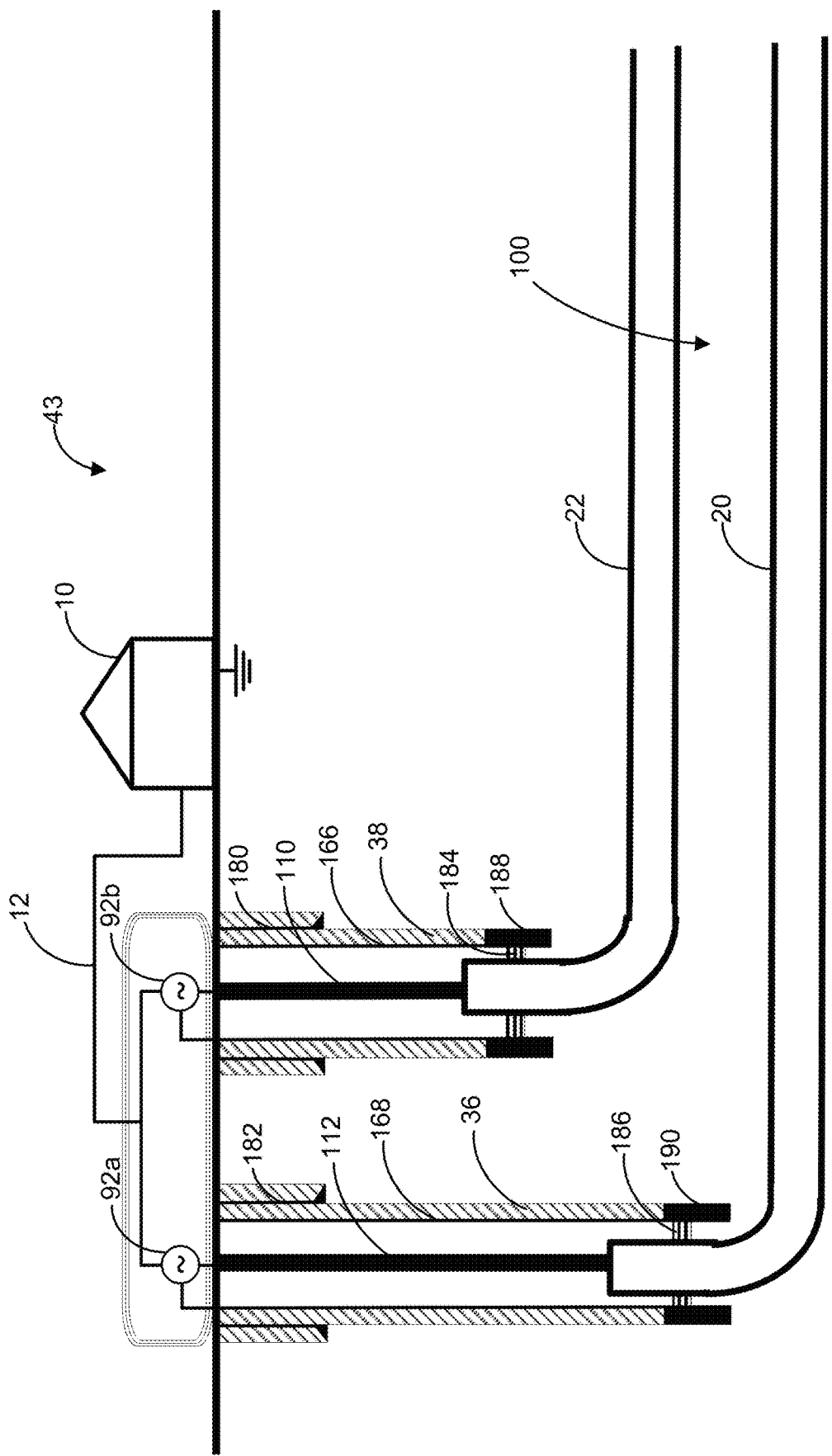
FIG. 45 is a profile view of an apparatus for electromagnetic heating of formations according to another embodiment.

Referring to FIG. 45, there is a profile view of an apparatus 45 according to at least one example embodiment. Features common to apparatus 1, 21, 33, and 47 are shown using the same reference numbers.

Similar to apparatus 33, apparatus 45 includes two EM wave generators 92*a* and 92*b* located above ground, or at the surface. EM wave generators 92*a* and 92*b* can be in phase or out of phase, with any appropriate phase difference. Each EM wave generator 92*a* and 92*b* can excite a high frequency connector 110 and 112.

Each high frequency connector 110 and 112 can be situated within a metal casing 166 and 168 to prevent direct contact between the high frequency connectors 110 and 112 and the hydrocarbon formation 100. Each metal casing 166 and 168 can be electrically grounded (not shown) to prevent high frequency alternating current from returning to the surface. Optionally, each metal casing 166 and 168 can be concentrically surrounded by a separation medium 36 and 38, similar to FIG. 1.

As well, an additional casing 180 and 182 that further concentrically surrounds the separation medium 36 and 38 can be provided. As shown in FIG. 45, the additional casing 180 and 182 can surround only a portion of the length of the metal casing 166 and 168. In some embodiments, casings 180 and 182 can be approximately 50 meters to 60 meters in length. Casings 180 and 182 can be provided to allow for easier drilling of SAGD wells. When casings 180 and 182 are used, they are typically drilled and cemented first, and then used to direct drill bits for drilling smaller wellbores for metal casings 168 and 166. While the additional casings 180 and 180 do generally not regarded as having significance electrically, in some embodiments, however, these casings may be utilized as a safety chokes, if needed.

Since metal casings 166 and 168 are not in electrical contact with one another (as shown in FIG. 25A), common mode currents can occur. To eliminate the common mode currents, chokes 188 and 190 are provided. As shown in FIG. 45, chokes 188 and 190 can be situated at the distal end of metal casings 166 and 168. When chokes 188 and 190 are sleeve type chokes and situated at the distal end of metal casings 166 and 168, the upper end of the choke, that is, the end that interfaces with separation medium 36 and 38 is the point at which current terminates. Such chokes that terminate current at an upper end of the choke are herein referred to as "inverted chokes".

When EM wave generators 92a and 92b are in phase, apparatus 43 can operate as a dipole antenna wherein pipes 20 and 22 form a first arm and the external surfaces of chokes 188 and 190 form a second arm. When EM wave generators 92a and 92b are 180° out of phase, apparatus 43 can operate as a dynamic transmission line. Apparatus 43 can operate as a combination of a dipole antenna and as a dynamic transmission line when EM wave generators 92a and 92b have a phase difference other than 180°.

As shown in FIG. 45, apparatus 43 can include seals 184 and 186 to prevent fluids from entering the coaxial transmission line formed by the high frequency connectors 110 and 112 and the metal casings 166 and 168. Seals 184 and 186 can be provided to plug the coaxial transmission line and block substances from entering the coaxial transmission line, to keep pressurized fluids provided inside the transmission line from leaking out, or both. More specifically, seals 184 and 186 can block solids, liquids, and gases from the hydrocarbon formation from entering metal casings 166 and 168. Seals 184 and 186 can be inert, or not chemically reactive, to such solids, liquids and gases from the hydrocarbon formation. If seals 184 and 186 are chemically reactive to solids, liquids and gases from the hydrocarbon formation, the seals 184 and 186 may disintegrate over time. Seals 184 and 186 are generally formed of insulating material to avoid a short-circuit between the inner and outer conductors of the coaxial transmission line.

Figure 46:
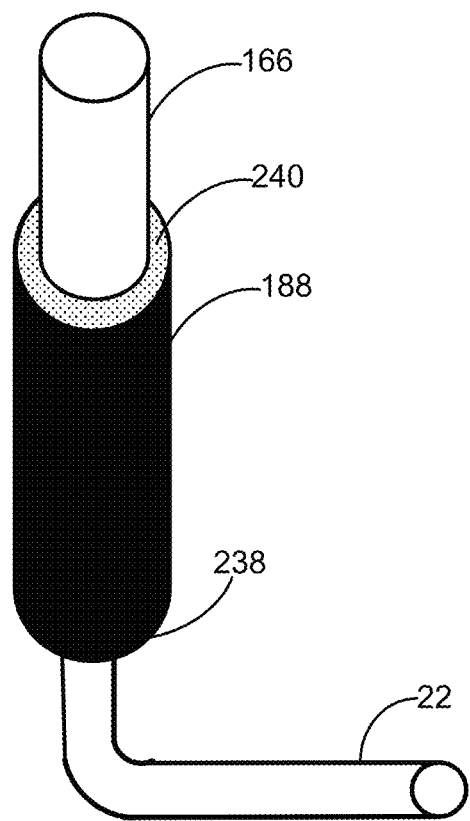
FIG. 46 is a perspective view of a choke for an apparatus for electromagnetic heating of formations according to the embodiment shown in FIG. 45.

FIG. 46 is a perspective view of an inverted sleeve choke 188 of apparatus 43 according to at least one example embodiment. As a sleeve choke, choke 188 can be a metal pipe that concentrically surrounds the metal casing 166. Choke 188 can form a short-circuited coaxial transmission line, wherein metal casing 166 is the inner conductor of the coaxial transmission line and the choke is the outer conductor of the coaxial transmission line. The lower end 238 of the choke can be short circuited. That is, metal casing 166 can be in electrical contact with choke 188 at the lower end 238.

The electrical length of the choke can be characterized in terms of the wavelength of the EM wave inside the choke ($\lambda_{in}$) or the wavelength of the EM wave outside the choke ($\lambda_{out}$). In terms of the wavelength of the EM wave inside the choke, the electrical length of the choke is approximately an odd multiple of $\lambda_{in}/4$. In terms of the wavelength of the EM wave outside the choke, the electrical length of the choke is approximately in the range of about $\lambda_{out}/50$ to about Lout.

To achieve the appropriate electrical length, space 240 between the metal casing 166 and choke 188 may be filled with different dielectric and magnetic materials. Dielectric materials can be liquids, such as hydrocarbon liquids (e.g., saraline, toluene, benzene, etc.) or solids, such as glass or ceramic balls made of zirconia or alumina. Magnetic materials can be various ferrite ceramics or powders, etc.

In some embodiments, the appropriate electrical length can also be achieved by providing corrugations on the inner and/or outer conductors of the coaxial cable. More specifically, the inner surface of the outer conductor and/or outer surface of the inner conductor can be engraved with teeth to extend the path of the current. The teeth can have any appropriate shape, for example, rectangular or triangular.

Figure 47:
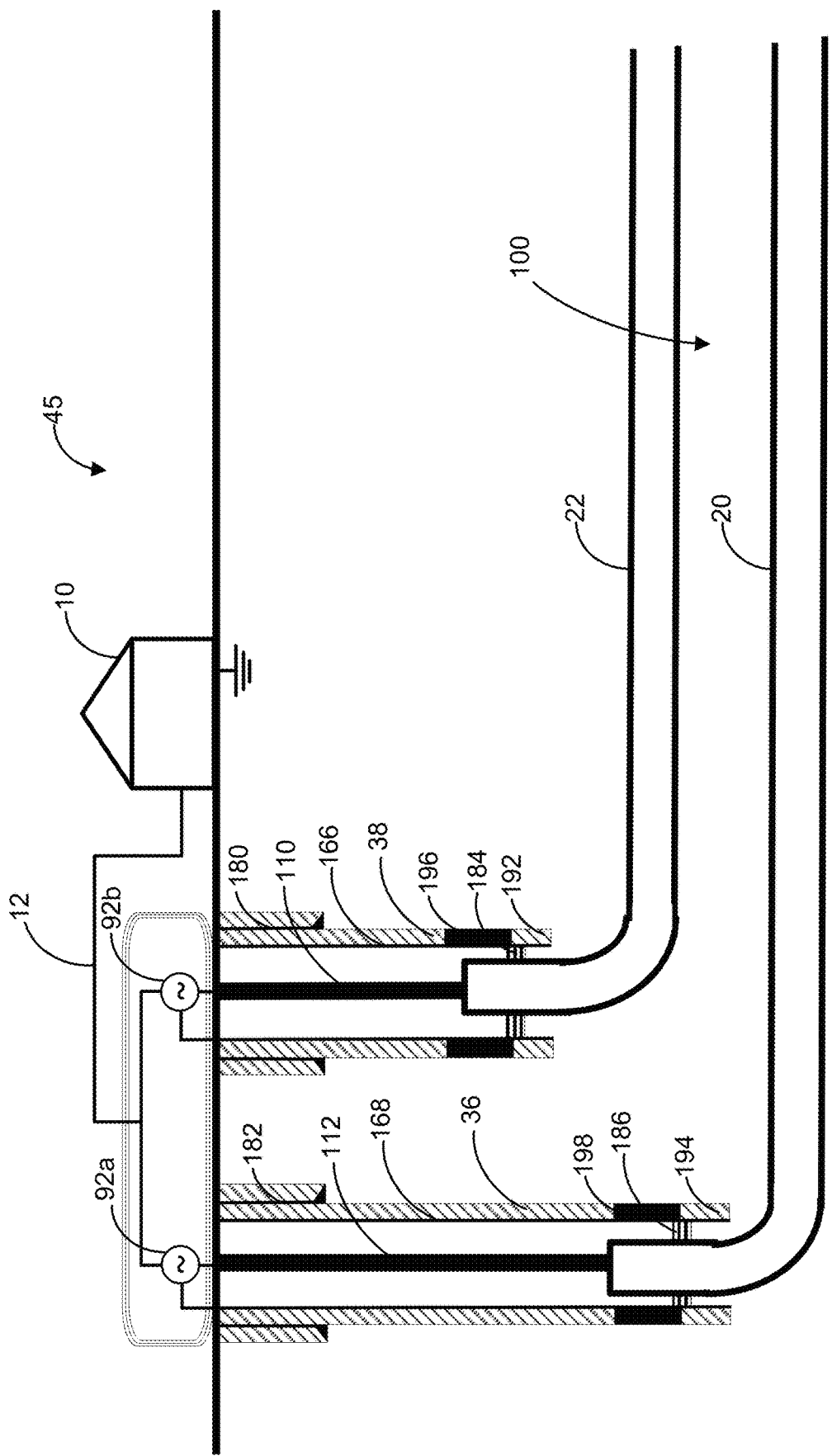
FIG. 47 is a profile view of an apparatus for electromagnetic heating of formations according to another embodiment.

Referring to FIG. 47, there is a profile view of an apparatus 45 according to at least one example embodiment. Features common to apparatus 43 are shown using the same reference numbers. As shown in FIG. 47, chokes 196 and 198 can be situated along the metal casings 166 and 168, providing choke shifts 192 and 194 at the distal end of metal casings 166 and 168. When choke shifts 192 and 194 are provided, current can terminate at the upper ends and the lower ends of chokes 196 and 198. Hence, chokes 196 and 198 can be other types of chokes besides inverted chokes. For example, chokes 196 and 198 can be regular bazooka chokes. Furthermore, choke shifts 192 and 194 can be a part of the radiating structure.

Figure 48A:
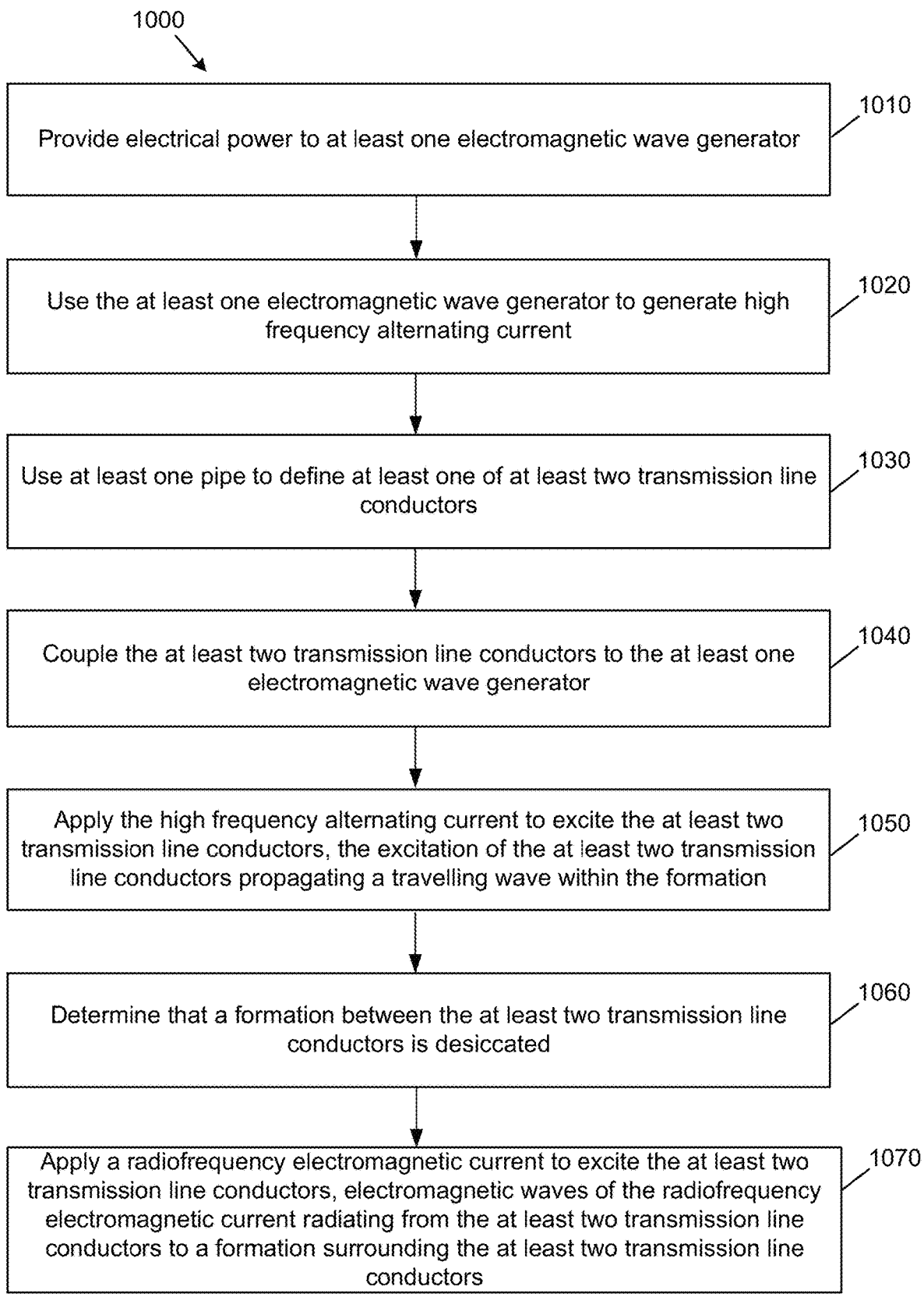
FIGS. 48A and 48B are methods for electromagnetic heating of formations according to one embodiment.

Referring to FIG. 48A, there is shown a method 1000 for electromagnetic heating of a hydrocarbon formation in accordance with some example embodiments. Method 1000 begins with providing electrical power to at least one EM wave generator at 1010. At 1020, the at least one EM wave generator can be used to generate high frequency alternating current. At 1030, at least one pipe can be used to define at least one of at least two transmission line conductors. At 1040, the at least two transmission line conductors can be coupled to the at least one EM wave generator.

Figure 48B:
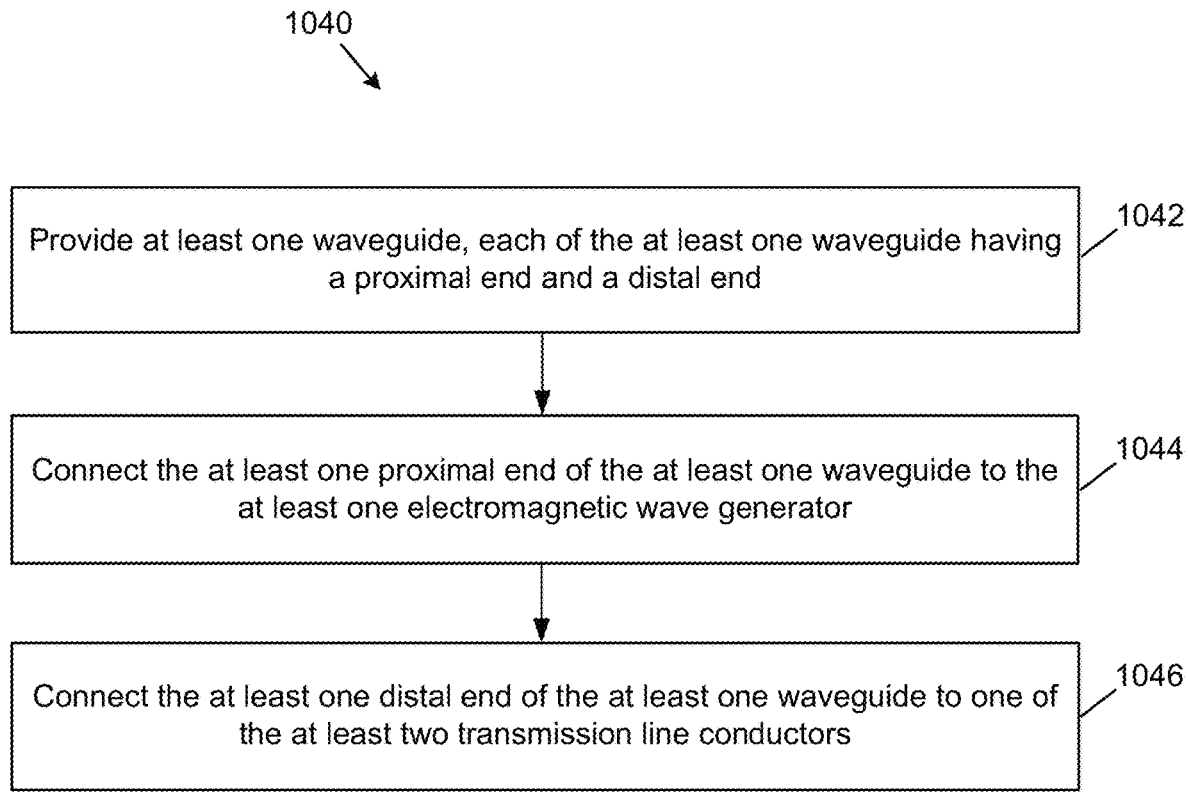

Referring to FIG. 48B, there is shown a method 1040 for coupling the at least two transmission line conductor to the at least one EM wave generator in accordance with some example embodiments. Method 1040 begins with providing at least one waveguide at 1042. Each of the at least one waveguide can have a proximal end and a distal end. At 1044, the at least one proximal end of the at least one waveguide can be connected to the at least one EM wave generator. At 1046, the at least one distal end of the at least one waveguide can be connected to one of the at least two transmission line conductors.

Returning to FIG. 48A, at 1050, the high frequency alternating current is applied to the at least two transmission line conductors to excite the at least two transmission line conductors. The excitation of the at least two transmission line conductors propagates an electromagnetic wave within the hydrocarbon formation.

At 1060, the method involves determining that a hydrocarbon formation between the at least two transmission line conductors is desiccated. A hydrocarbon formation can be determined to be desiccated by measuring impedance at the proximal end of the at least one waveguide. If the impedance is within a threshold impedance, the hydrocarbon formation between the at least two transmission line conductors can be determined to be desiccated; otherwise the hydrocarbon formation between the at least two transmission line conductors can be determined to not be desiccated. In some embodiments, the threshold impedance represents 60% desiccation. The threshold impedance is determined based on the material of the hydrocarbon formation and the electrical length of the dynamic transmission line. The threshold impedance may be determined based on the impedance initially measured before operation of the dynamic transmission line. In some embodiments, the threshold impedance represents a 50% reduction in the imaginary part of the characteristic impedance of the dynamic transmission line. In some embodiments, the threshold impedance represents a 100% increase in the reactive part of the measured impedance.

In some embodiments, a hydrocarbon formation can be determined to be desiccated by measuring the temperature along at least two transmission line conductors and at multiple points between the at least two transmission line conductors. If the temperatures at these points are above the steam saturation temperature in the hydrocarbon formation, the hydrocarbon formation at these points, located between the at least two transmission line conductors, can be determined to be desiccated; otherwise, the hydrocarbon formation between the at least two transmission line conductors can be determined to not be desiccated. Given the heterogeneity of the hydrocarbon formation and the nature of the heating process, generally not all points become desiccated at the same time. However, when the measured temperatures at all the points between the transmission line conductors are above the steam saturation temperature, it may then be said that the area becomes desiccated.

At 1070, a radiofrequency electromagnetic current is applied to the at least two transmission line conductors to excite the at least two transmission line conductors. Electromagnetic waves of the radiofrequency electromagnetic current radiates from the at least two transmission line conductors to a hydrocarbon formation surrounding the at least two transmission line conductors. The radiofrequency electromagnetic current comprises an electromagnetic power having a frequency between about 1 kilohertz (kHz) to about 10 megahertz (MHz). Any appropriate frequency between 1 kHz and 10 MHz may be used.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for electromagnetic heating of a hydrocarbon formation, the apparatus comprising:
   an electrical power source;
   at least one electromagnetic power source for generating at least a first and a second time-varying current or voltage, each of the first and the second time-varying current or voltage; the at least one electromagnetic power source being powered by the electrical power source;
   at least a first and a second transmission line coupled to the at least one electromagnetic power source, each of the first and the second transmission lines having at least a first and a second transmission line conductor, each of the first and the second transmission line conductors of the first and the second transmission lines having a proximal end and a distal end, the first and the second transmission line conductors of the first and the second transmission lines being excitable by the first and the second time-varying current or voltage to propagate electromagnetic waves from the proximal ends of the transmission line conductors toward the distal ends of the transmission line conductors within the hydrocarbon formation.

2. The apparatus of claim 1, wherein the second time-varying current or voltage comprises the first time-varying current or voltage with a phase-shift.

3. The apparatus of claim 1, wherein the at least one electromagnetic power source comprises:
   a first electromagnetic power source for generating the first time-varying current or voltage; and
   a second electromagnetic power source for generating the second time-varying current or voltage, the first and the second electromagnetic power sources being connected to a common ground.

4. The apparatus of claim 1, wherein:
   the first and the second transmission line conductors of the first transmission line being excitable by the first time-varying current or voltage; and
   the first and the second transmission line conductors of the second transmission line being excitable by the second time-varying current or voltage.

5. The apparatus of claim 4, wherein the distal ends of the first transmission line conductors of the first transmission line and the second transmission line are adjacent.

6. The apparatus of claim 5, wherein:
   the second time-varying current or voltage is 180° out of phase with the first time-varying current or voltage; and
   the first transmission line conductor of the first transmission line and the first transmission line conductor of the second transmission line propagate a first electromagnetic wave within the hydrocarbon formation.

7. The apparatus of claim 4, wherein the distal ends of the second transmission line conductors of the first transmission line and the second transmission line are adjacent.

8. The apparatus of claim 7, wherein:
   the second time-varying current or voltage is 180° out of phase with the first time-varying current or voltage; and
   the second transmission line conductor of the first transmission line and the second transmission line conductor of the second transmission line propagate a second electromagnetic wave within the hydrocarbon formation.

9. The apparatus of claim 4, wherein the proximal end to the distal end of the first transmission line defines a direction that is opposite to a direction defined by the proximal end to the distal end of the second transmission line.

10. A method for electromagnetic heating of a hydrocarbon formation comprising:
    providing electrical power to at least one electromagnetic power source for generating a first and a second time-varying current or voltage, each of the first and the second time-varying current or voltage comprising at least one of a time-varying current or a time-varying voltage;
    providing at least a first and a second transmission line, each of the first and the second transmission lines having at least a first and a second transmission line conductor, each of the first and the second transmission line conductors of the first and the second transmission lines having a proximal end and a distal end;
    coupling the first and the second transmission lines to the at least one electromagnetic power source;
    using the at least one electromagnetic power source to generate the first and the second time-varying current or voltage; and
    applying the first and the second time-varying current or voltage to excite the first and the second transmission lines conductors of the first and the second transmission lines, the excitation of the first and the second transmission lines conductors of the first and the second transmission lines being capable of propagating electromagnetic waves from the proximal ends of the transmission line conductors toward the distal ends of the transmission line conductors within the hydrocarbon formation.

11. The method of claim 10, wherein using the at least one electromagnetic power source to generate the first and the second time-varying current or voltage comprises:
using a first electromagnetic power source to generate the first time-varying current or voltage; and
applying a time delay to the first time-varying current or voltage to provide the second time-varying current or voltage.

12. The method of claim 10 wherein using the at least one electromagnetic power source to generate the first and the second time-varying current or voltage comprises:
using a first electromagnetic power source to generate the first time-varying current or voltage; and
using a second electromagnetic power source to generate the second time-varying current or voltage.

13. The method of claim 10, wherein applying the first and the second time-varying current or voltage to excite the first and the second transmission lines conductors of the first and the second transmission lines comprises:
applying the first time-varying current or voltage to the first and the second transmission line conductors of the first transmission line; and
applying the second time-varying current or voltage to the first and the second transmission line conductors of the second transmission line.

14. The method of claim 13, wherein the distal ends of the first transmission line conductors of the first transmission line and the second transmission line are adjacent.

15. The method of claim 14, wherein:
the second time-varying current or voltage is 180° out of phase with the first time-varying current or voltage; and
the first transmission line conductor of the first transmission line and the first transmission line conductor of the second transmission line propagate an electromagnetic wave within the hydrocarbon formation.

16. The method of claim 13, wherein the distal ends of the second transmission line conductors of the first transmission line and the second transmission line are adjacent.

17. The method of claim 16, wherein:
the second time-varying current or voltage is 180° out of phase with the first time-varying current or voltage; and
the second transmission line conductor of the first transmission line and the second transmission line conductor of the second transmission line propagate an electromagnetic wave within the hydrocarbon formation.

18. The method of claim 13, wherein:
the proximal end to the distal end of the first transmission line defines a direction that is opposite to a direction defined by the proximal end to the distal end the second transmission line; and
the method further comprising, subsequent to applying the first and the second time-varying current or voltage to excite the first and the second transmission lines conductors of the first and the second transmission lines,
discontinuing generation of the second time-varying current or voltage;
using the at least one electromagnetic power source to generate a third time-varying current or voltage, the third time-varying current or voltage comprising at least one of a time-varying current or a time-varying voltage, the third time-varying current or voltage being substantially in phase with the first time-varying current or voltage; and
applying the third time-varying current or voltage to the first and the second transmission line conductors of the second transmission line.

19. The method of claim 18 wherein:
the second time-varying current or voltage is 180° out of phase with the first time-varying current or voltage; and
using the at least one electromagnetic power source to generate a third time-varying current or voltage comprises:
decoupling the first transmission line conductor from a first terminal of the at least one electromagnetic power source used to generate the second time-varying current or voltage;
decoupling the second transmission line conductor from a second terminal of the at least one electromagnetic power source used to generate the second time-varying current or voltage;
coupling the first transmission line conductor to the second terminal of the at least one electromagnetic power source; and
coupling the second transmission line conductor to the first terminal of the at least one electromagnetic power source.

20. The method of claim 13, wherein:
the proximal end to the distal end of the first transmission line defines a direction that is opposite to a direction defined by the proximal end to the distal end the second transmission line; and
the method further comprising, prior to applying the first and the second time-varying current or voltage to excite the first and the second transmission lines conductors of the first and the second transmission lines,
using the at least one electromagnetic power source to generate a third time-varying current or voltage, the third time-varying current or voltage comprising at least one of a time-varying current or a time-varying voltage, the third time-varying current or voltage being substantially in phase with the first time-varying current or voltage; and
applying the third time-varying current or voltage to the first and the second transmission line conductors of the second transmission line; and
discontinuing generation of the third time-varying current or voltage.

21. The method of claim 10, further comprising:
determining that the hydrocarbon formation between the transmission line conductors of one or more of the first or the second transmission lines is at least substantially desiccated; and
applying the first and the second time-varying current or voltage to excite the transmission line conductors of the one or more of the first or the second transmission lines, the excitation of the transmission line conductors of the one or more of the first or the second transmission lines being capable of inducing electromagnetic waves to radiate from the transmission line conductors of the first or the second transmission lines to a hydrocarbon formation surrounding the transmission line conductors of the one or more of the first or the second transmission lines.

22. The method of claim 21, wherein the determining that a hydrocarbon formation between the transmission line conductors of the one or more of the first or the second transmission lines is at least substantially desiccated comprises:
　　defining at least one temperature measurement location within the hydrocarbon formation between the transmission line conductors of the one or more of the first or the second transmission lines;
　　obtaining at least one temperature measurement at each of the at least one temperature measurement locations; and
　　for each of the at least one temperature measurement locations, if the temperature at that temperature measurement location is greater than a steam saturation threshold temperature, determining that the hydrocarbon formation at that temperature measurement location is desiccated; otherwise determining that the hydrocarbon formation at that temperature measurement location is not desiccated.

23. The method of claim 21, wherein:
　　coupling the first and the second transmission lines to the at least one electromagnetic power source comprises using at least one waveguide to couple the first and the second transmission lines to the at least one electromagnetic power source; and
　　determining that a hydrocarbon formation between the transmission line conductors of the one or more of the first or the second transmission lines is at least substantially desiccated comprises:
　　　　obtaining one or more impedance measurements along the at least one waveguide;
　　　　if the impedance measurement is within a threshold impedance, determining that the hydrocarbon formation between the transmission line conductors is desiccated; otherwise determining that the hydrocarbon formation between the at least two transmission line conductors is not desiccated.

* * * * *